United States Patent
Wagner et al.

(10) Patent No.: US 12,138,781 B2
(45) Date of Patent: Nov. 12, 2024

(54) SYSTEMS AND METHODS FOR EFFICIENTLY EXCHANGING END EFFECTOR TOOLS

(71) Applicant: Berkshire Grey Operating Company, Inc., Bedford, MA (US)

(72) Inventors: Thomas Wagner, Concord, MA (US); John Richard Amend, Jr., Belmont, MA (US); William Farmer, Bolton, MA (US); Andrew Gauthier, Somerville, MA (US); Victoria Hinchey, Winchester, MA (US); Kyle Maroney, North Attleboro, MA (US); Matthew T. Mason, Pittsburgh, PA (US); Richard Musgrave, Sewickley, PA (US); Samuel Naseef, Medford, MA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 0 days.

(21) Appl. No.: 18/384,923

(22) Filed: Oct. 30, 2023

(65) Prior Publication Data

US 2024/0173872 A1 May 30, 2024

Related U.S. Application Data

(63) Continuation of application No. 16/523,245, filed on Jul. 26, 2019, now Pat. No. 11,865,700.
(Continued)

(51) Int. Cl.
B25J 15/04 (2006.01)

(52) U.S. Cl.
CPC ....... B25J 15/0408 (2013.01); B25J 15/0441 (2013.01); B25J 15/0491 (2013.01); G05B 2219/39468 (2013.01)

(58) Field of Classification Search
CPC ................ B25J 15/0408; B25J 15/0441; B25J 15/0491; G05B 2219/39468; B05B 2219/39468
(Continued)

(56) References Cited

U.S. PATENT DOCUMENTS 3,637,249 A   1/1972  Kuhl et al.
3,656,794 A   4/1972  McCord
(Continued)

FOREIGN PATENT DOCUMENTS

CN   1367729 A    9/2002
CN   101925959 A  12/2010
(Continued)

OTHER PUBLICATIONS

Communication pursuant to Article 94(3) EPC issued by the European Patent Office in related European Patent Application No. 19752776.5 on Jan. 25, 2023, 7 pages.
(Continued)

Primary Examiner — Paul T Chin
(74) Attorney, Agent, or Firm — Gesmer Updegrove LLP

(57) ABSTRACT

A method is disclosed of changing a tool on a programmable motion device. The method includes the steps of moving an attachment portion of an end effector of the programmable motion device in a continuous motion; while the attachment portion of the end effector moves in the continuous motion, engaging one of: the attachment portion of the end effector with the tool, or the tool attached to the attachment portion of the end effector with an exchange system, and continuing to move the attachment portion of the end effector in the continuous motion to change a connection status of the
(Continued)

attachment portion of the end effector while the attachment portion of the end effector moves in the continuous motion.

28 Claims, 42 Drawing Sheets

Related U.S. Application Data

(60) Provisional application No. 62/739,562, filed on Oct. 1, 2018, provisional application No. 62/711,087, filed on Jul. 27, 2018.

(58) Field of Classification Search
USPC .................................................. 294/185, 189
See application file for complete search history.

(56) References Cited

U.S. PATENT DOCUMENTS

| | | | |
|---|---|---|---|
| 3,720,433 A | 3/1973 | Rosfelder | |
| 4,266,905 A * | 5/1981 | Birk | B65G 47/1485 294/189 |
| 4,389,064 A | 6/1983 | Laverriere | |
| 4,561,686 A | 12/1985 | Atchley | |
| 4,578,013 A | 3/1986 | Barillec et al. | |
| 4,600,229 A | 7/1986 | Oten | |
| 4,604,787 A | 8/1986 | Sievers, Jr. | |
| 4,621,398 A | 11/1986 | Kleiman | |
| 4,635,985 A | 1/1987 | Rooke | |
| 4,653,793 A | 3/1987 | Guinot et al. | |
| 4,677,778 A | 7/1987 | Sorimachi et al. | |
| 4,828,304 A | 5/1989 | No et al. | |
| 4,850,627 A | 7/1989 | Franklin | |
| 4,858,974 A | 8/1989 | Stannek | |
| 4,913,617 A | 4/1990 | Nicholson | |
| 5,044,063 A | 9/1991 | Voellmer | |
| 5,190,332 A | 3/1993 | Nagai et al. | |
| 5,207,465 A | 5/1993 | Rich | |
| 5,219,318 A | 6/1993 | Vranish | |
| 5,253,858 A | 10/1993 | Grieve | |
| 5,860,900 A | 1/1999 | Dunning et al. | |
| 5,993,365 A | 11/1999 | Stagnitto et al. | |
| 6,015,174 A | 1/2000 | Raes et al. | |
| 6,135,522 A | 10/2000 | Su et al. | |
| 6,193,291 B1 | 2/2001 | Morroney | |
| 6,213,528 B1 | 4/2001 | Hufken et al. | |
| 6,244,640 B1 | 6/2001 | Le Bricquer et al. | |
| 6,382,692 B1 | 5/2002 | Schmalz et al. | |
| 6,454,333 B2 | 9/2002 | Portal | |
| 6,554,337 B2 | 4/2003 | Kazerooni et al. | |
| 6,817,639 B2 | 11/2004 | Schmalz et al. | |
| 8,132,835 B2 | 3/2012 | Ban et al. | |
| 8,267,386 B2 | 9/2012 | Schaaf et al. | |
| 9,266,237 B2 | 2/2016 | Nomura | |
| 9,486,926 B2 | 11/2016 | Kawano | |
| 9,623,570 B1 | 4/2017 | Krahn et al. | |
| 9,656,813 B2 | 5/2017 | Dunkmann et al. | |
| 9,687,983 B1 | 6/2017 | Prats | |
| 9,757,863 B2 | 9/2017 | Suzuki | |
| 9,981,379 B1 | 5/2018 | Youmans et al. | |
| 9,999,977 B2 | 6/2018 | Wagner et al. | |
| 10,011,020 B2 | 7/2018 | Wagner et al. | |
| 10,086,519 B2 | 10/2018 | Wagner et al. | |
| 10,118,300 B2 | 11/2018 | Wagner et al. | |
| 10,300,612 B2 | 5/2019 | Wagner et al. | |
| 10,335,956 B2 | 7/2019 | Wagner et al. | |
| 10,357,883 B1 | 7/2019 | O'Connor et al. | |
| 10,500,735 B1 | 12/2019 | Menon et al. | |
| 10,576,641 B2 | 3/2020 | Wagner et al. | |
| 10,618,177 B2 | 4/2020 | Wagner et al. | |
| 10,647,005 B2 | 5/2020 | Wagner et al. | |
| 10,723,019 B2 | 7/2020 | Wagner et al. | |
| 10,850,402 B2 | 12/2020 | Wagner et al. | |
| 10,857,682 B2 | 12/2020 | Wagner et al. | |
| 10,913,159 B2 | 2/2021 | Wagner et al. | |
| 11,185,996 B2 | 11/2021 | Wagner et al. | |
| 11,426,882 B2 | 8/2022 | Takahashi et al. | |
| 11,633,864 B2 * | 4/2023 | Poteet | B25J 15/0683 294/183 |
| 11,772,281 B1 * | 10/2023 | Wieckowski | B25J 15/0616 294/183 |
| 2001/0013434 A1 | 8/2001 | Hopkins | |
| 2002/0011735 A1 | 1/2002 | Nagai et al. | |
| 2002/0185575 A1 | 12/2002 | Kalb | |
| 2003/0038491 A1 | 2/2003 | Schmalz et al. | |
| 2006/0131905 A1 | 6/2006 | Mazzucchelli | |
| 2006/0267360 A1 | 11/2006 | Kiaie et al. | |
| 2007/0006940 A1 | 1/2007 | Perlman et al. | |
| 2007/0287884 A1 | 12/2007 | Schena | |
| 2010/0040450 A1 | 2/2010 | Parnell | |
| 2010/0078953 A1 | 4/2010 | Ban et al. | |
| 2010/0109360 A1 | 5/2010 | Meisho | |
| 2012/0025053 A1 | 2/2012 | Tell | |
| 2013/0129464 A1 | 5/2013 | Regan et al. | |
| 2013/0147101 A1 | 6/2013 | Cho | |
| 2015/0306770 A1 | 10/2015 | Mittal et al. | |
| 2015/0328779 A1 | 11/2015 | Bowman et al. | |
| 2015/0375401 A1 | 12/2015 | Dunkmann et al. | |
| 2016/0096278 A1 * | 4/2016 | Cho | B25J 15/0616 294/185 |
| 2016/0207202 A1 | 7/2016 | Lee et al. | |
| 2016/0214143 A1 | 7/2016 | Nagatsuka | |
| 2016/0221196 A1 | 8/2016 | Suzuki | |
| 2016/0271805 A1 | 9/2016 | Kuolt et al. | |
| 2017/0050315 A1 | 2/2017 | Henry et al. | |
| 2017/0062263 A1 | 3/2017 | Kesil et al. | |
| 2017/0076251 A1 | 3/2017 | Simske et al. | |
| 2017/0080571 A1 | 3/2017 | Wagner et al. | |
| 2017/0080579 A1 | 3/2017 | Wagner et al. | |
| 2017/0106532 A1 | 4/2017 | Wellman et al. | |
| 2017/0120454 A1 | 5/2017 | Ferguson et al. | |
| 2017/0120455 A1 | 5/2017 | Wagner et al. | |
| 2017/0197316 A1 | 7/2017 | Wagner et al. | |
| 2017/0197318 A1 | 7/2017 | Takebayashi et al. | |
| 2017/0225341 A1 | 8/2017 | Kerestes et al. | |
| 2017/0276472 A1 | 9/2017 | Becker et al. | |
| 2018/0117773 A1 | 5/2018 | Odhner et al. | |
| 2018/0250811 A1 | 9/2018 | Wagner et al. | |
| 2018/0281202 A1 | 10/2018 | Brudniok et al. | |
| 2019/0039240 A1 | 2/2019 | Wagner et al. | |
| 2019/0054634 A1 | 2/2019 | Haddadin | |
| 2019/0255713 A1 * | 8/2019 | Churchill | B25J 15/0416 |
| 2020/0017317 A1 | 1/2020 | Yap et al. | |
| 2020/0070361 A1 | 3/2020 | Menon et al. | |
| 2020/0189105 A1 | 6/2020 | Wen et al. | |
| 2021/0016454 A1 | 1/2021 | Jeong et al. | |
| 2021/0053216 A1 | 2/2021 | Diankov et al. | |
| 2021/0053230 A1 | 2/2021 | Mizoguchi et al. | |
| 2021/0129354 A1 | 5/2021 | Wilson, II et al. | |
| 2021/0260775 A1 | 8/2021 | Mizoguchi | |
| 2021/0308874 A1 | 10/2021 | Gealy et al. | |
| 2021/0308875 A1 | 10/2021 | Gealy et al. | |
| 2021/0323144 A1 | 10/2021 | Jeremiah | |
| 2021/0339403 A1 | 11/2021 | Menon et al. | |
| 2022/0072719 A1 | 3/2022 | Stuckey et al. | |
| 2022/0118629 A1 | 4/2022 | Payton et al. | |
| 2022/0135346 A1 | 5/2022 | Matsuoka et al. | |
| 2022/0219318 A1 | 7/2022 | Jeong et al. | |
| 2022/0241962 A1 | 8/2022 | Nguyen et al. | |
| 2022/0266458 A1 | 8/2022 | Fofonoff et al. | |
| 2022/0314460 A1 | 10/2022 | Sun et al. | |
| 2023/0089400 A1 | 3/2023 | Jeremiah | |

FOREIGN PATENT DOCUMENTS

| | | |
|---|---|---|
| CN | 203680306 U | 7/2014 |
| CN | 103987637 A | 8/2014 |
| CN | 104057460 A | 9/2014 |
| CN | 104415868 A | 3/2015 |
| DE | 3810989 A1 | 8/1989 |
| DE | 10121344 A1 | 11/2002 |
| DE | 102011115951 A1 | 4/2013 |
| DE | 102016004087 A1 | 8/2017 |
| EP | 2708335 A1 | 3/2014 |

(56) References Cited

FOREIGN PATENT DOCUMENTS

| | | |
|---|---|---|
| EP | 3520973 A1 | 8/2019 |
| JP | H01220636 A | 9/1989 |
| JP | 2010201536 A | 9/2010 |
| WO | 2008005060 A2 | 1/2008 |
| WO | 2014040843 A1 | 3/2014 |
| WO | 2017025076 A1 | 2/2017 |
| WO | 2017035466 A1 | 3/2017 |
| WO | 2017044632 A1 | 3/2017 |
| WO | 2018034978 A1 | 2/2018 |

OTHER PUBLICATIONS

Communication pursuant to Rules 161(1) and 162 EPC issued by the European Patent Office in related European Patent Application No. 19752776.5 on Mar. 10, 2021, 3 pages.

Examiner's Report issued by the Innovation, Science and Economic Development Canada (Canadian Intellectual Property Office) in related Canadian Patent Application No. 3,107,825 on Mar. 18, 2022, 4 pages.

International Search Report and Written Opinion of the International Searching Authority issued in related International Application No. PCT/US2019/043637 on Nov. 13, 2019, 14 pages.

Non-Final Office Action issued by the United States Patent and Trademark Office in related U.S. Appl. No. 16/523,245 on Mar. 29, 2023, 12 pages.

Notice on the First Office Action, along with its English translation, issued by the China National Intellectual Property Administration in related Chinese Patent Application No. 201980049469.5 on Mar. 31, 2023, 31 pages.

Notice on the Second Office Action, along with its English translation, issued by the China National Intellectual Property Administration in related Chinese Patent Application No. 201980049469.5 on Oct. 20, 2023, 7 pages.

\* cited by examiner

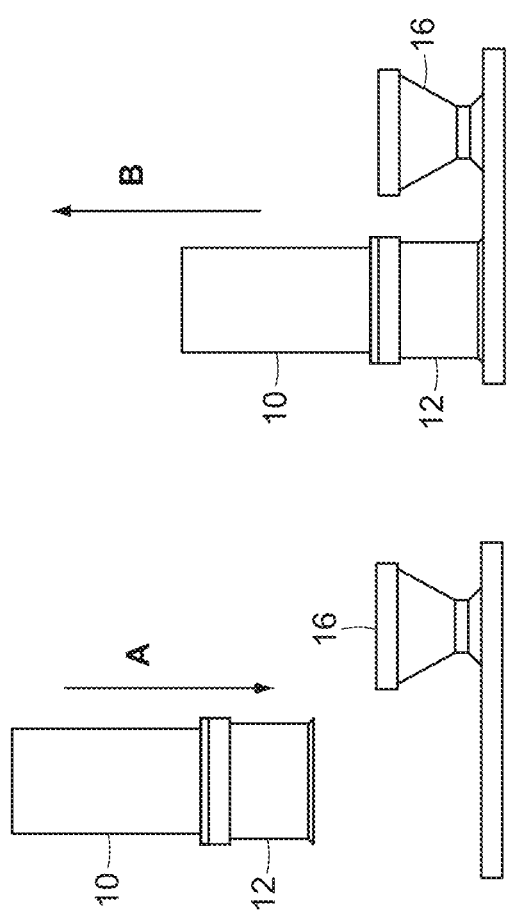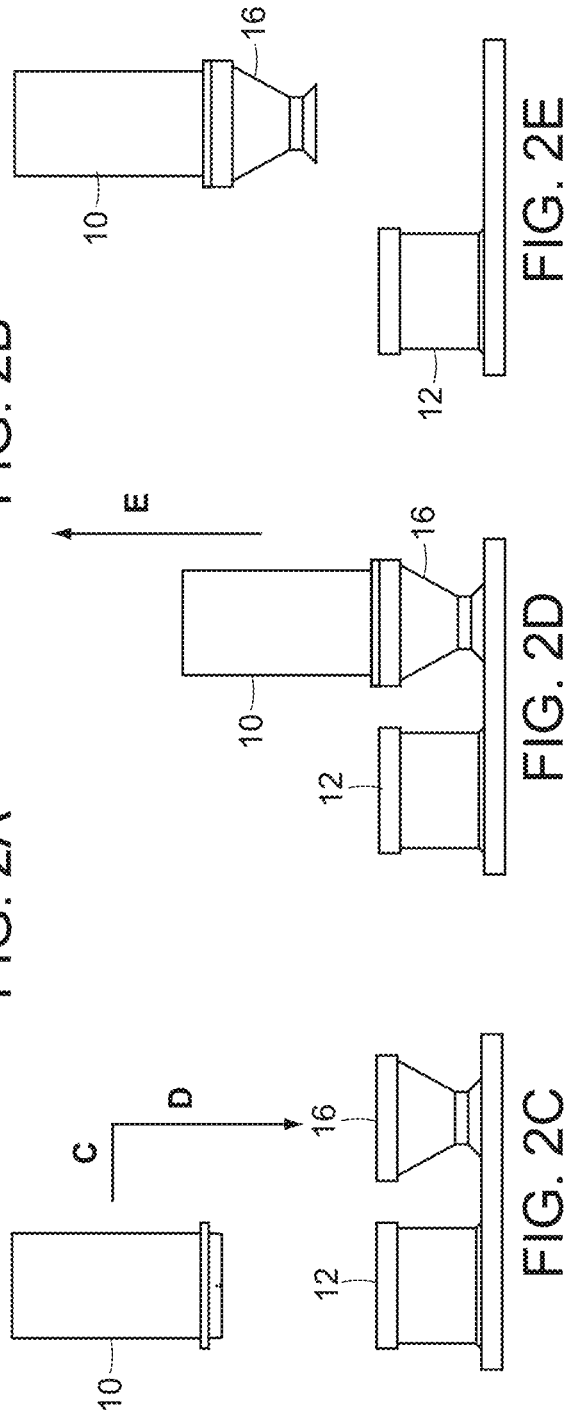

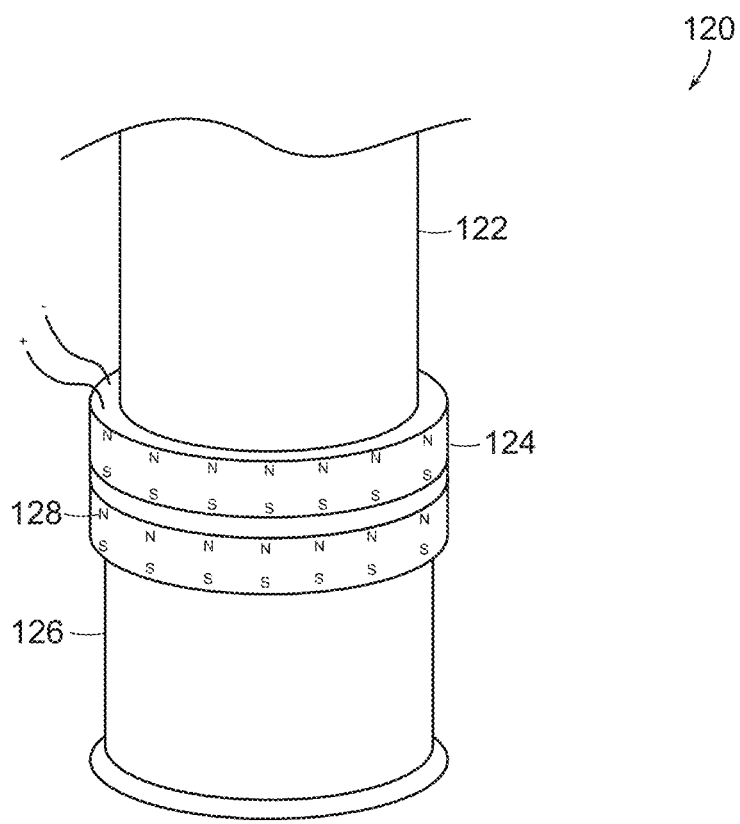
FIG. 14
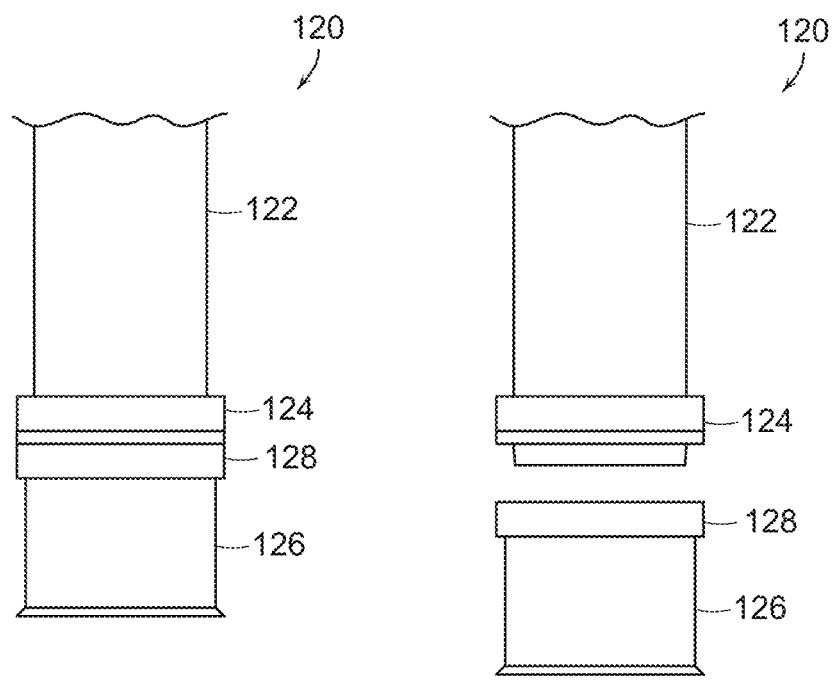
FIG. 15A
FIG. 15B

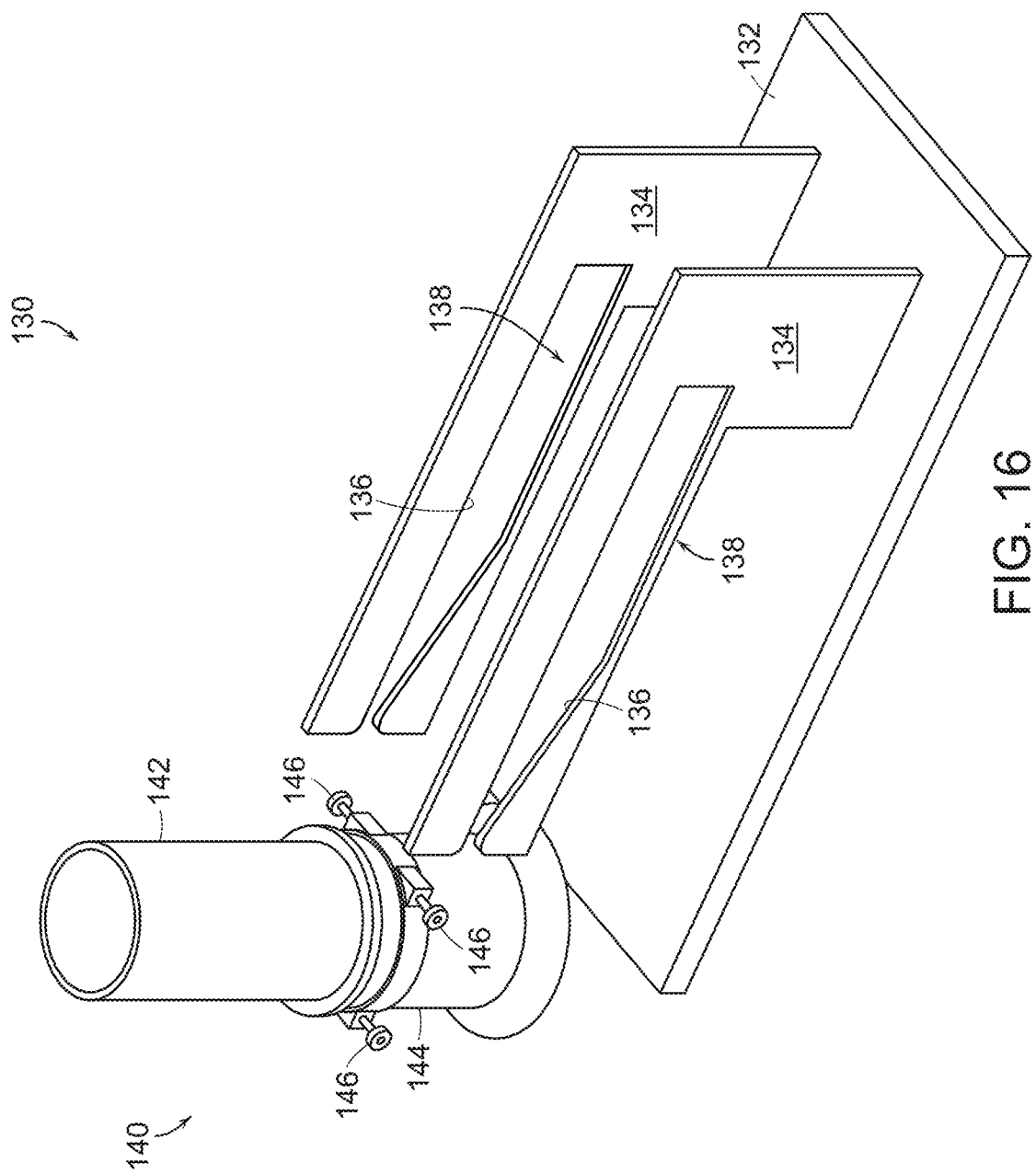

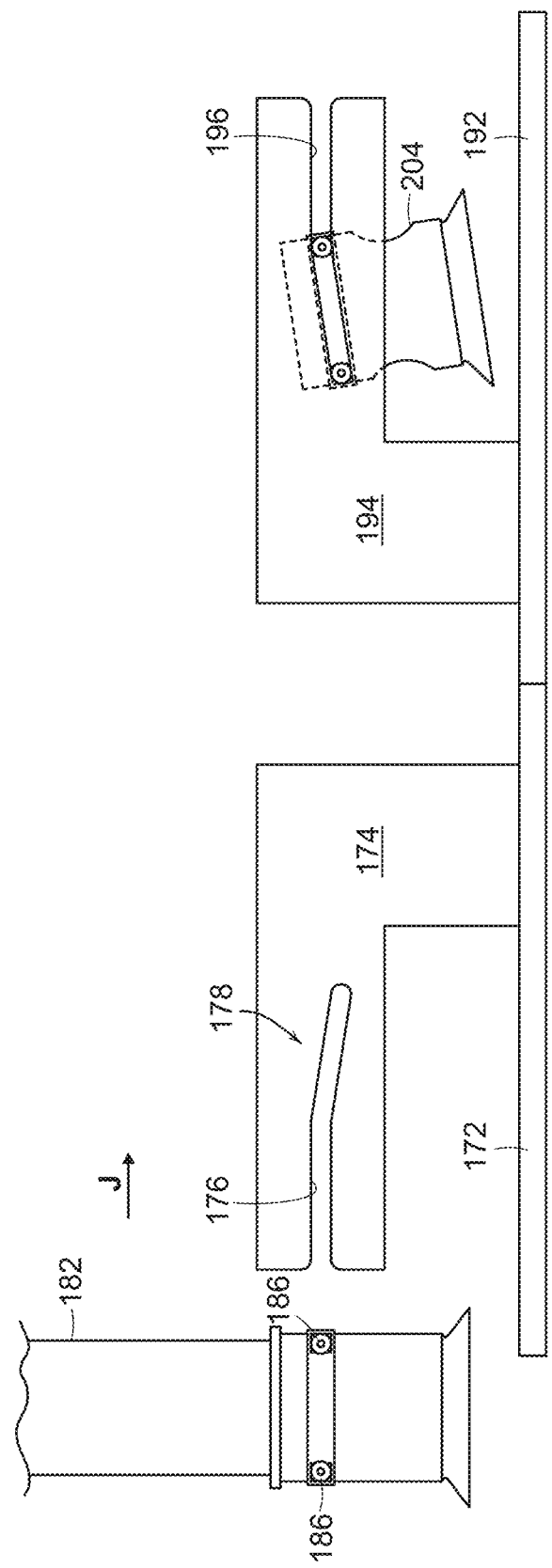

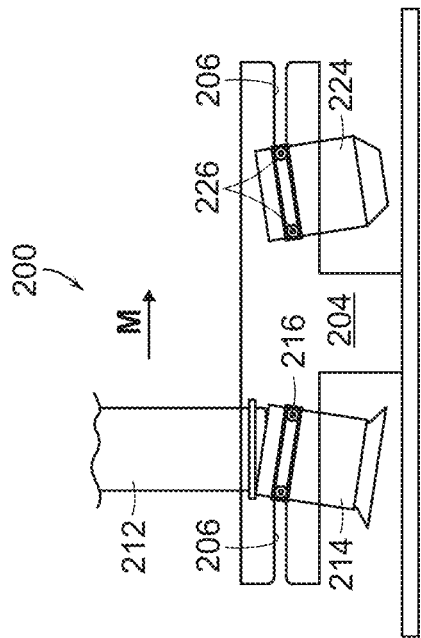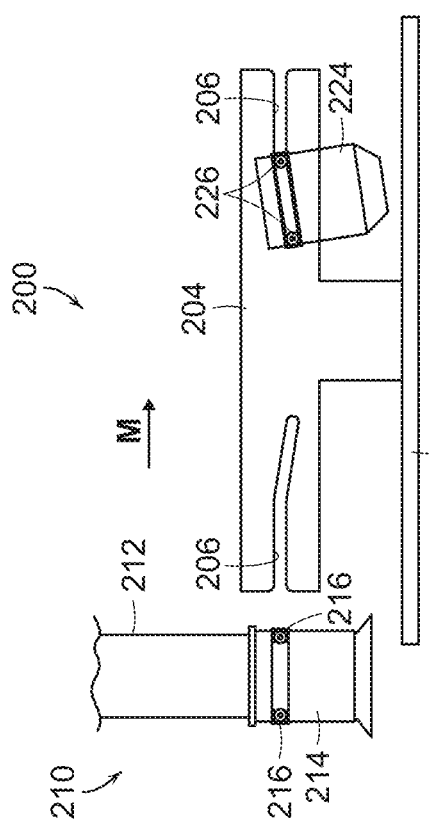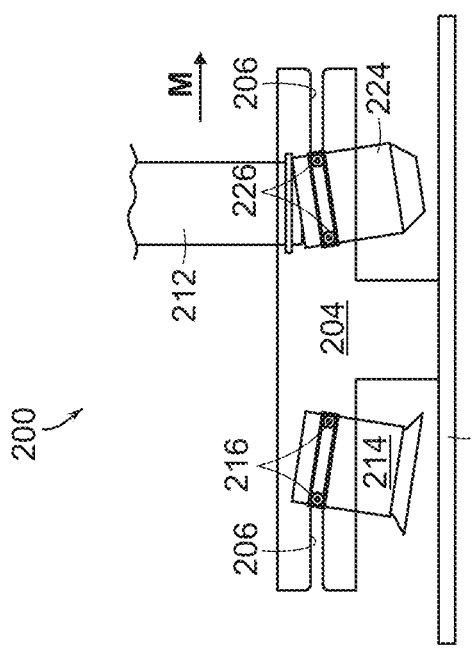

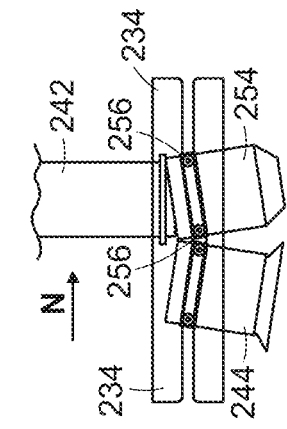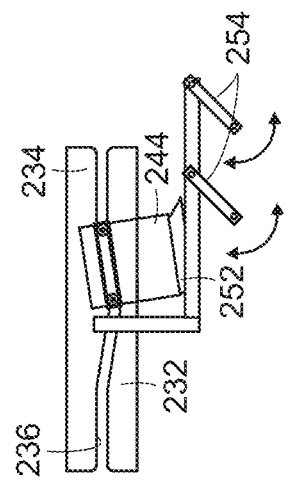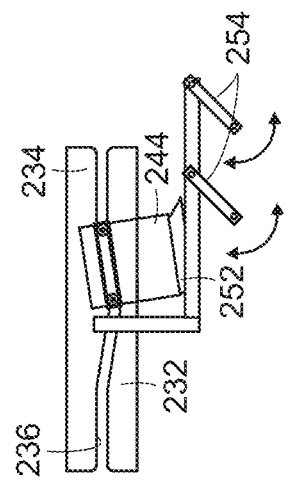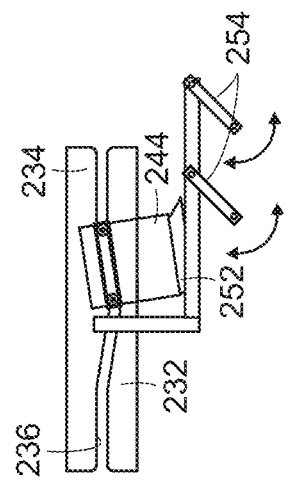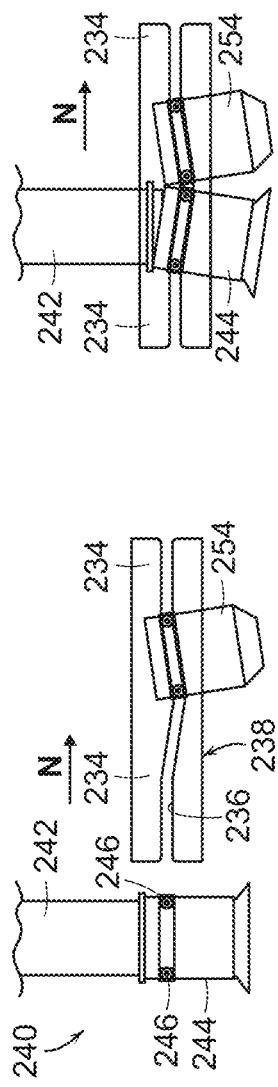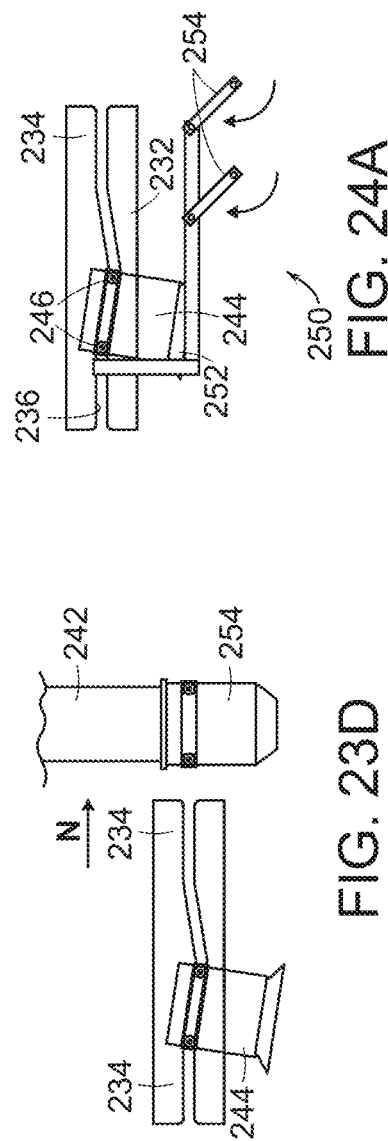

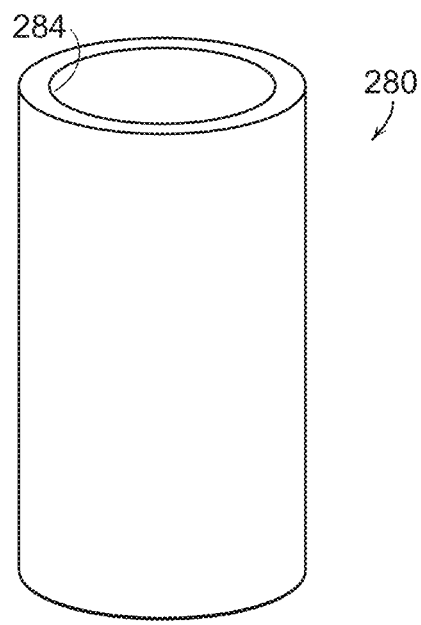
FIG. 27A
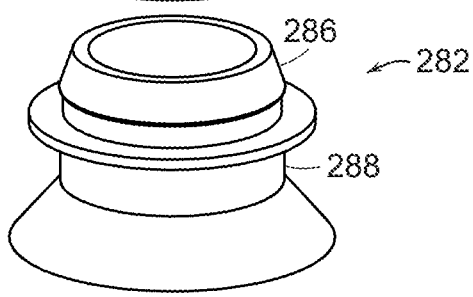
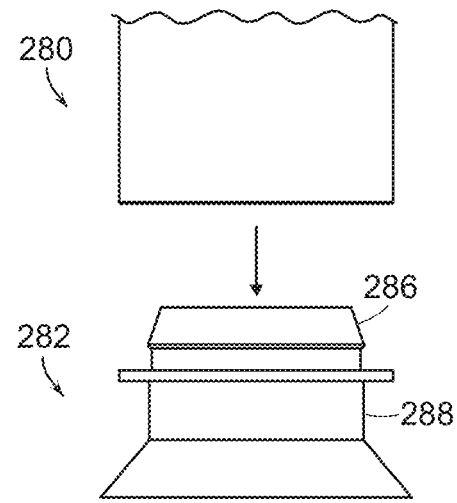
FIG. 27B
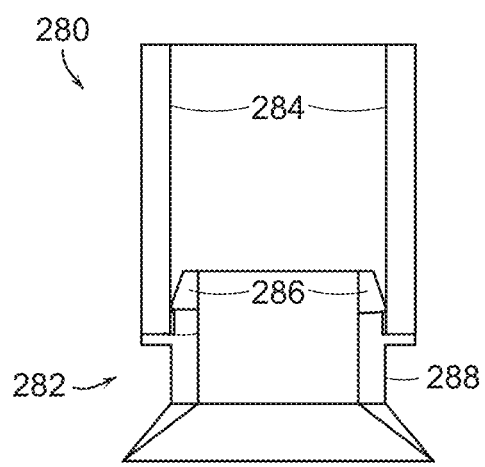
FIG. 27C

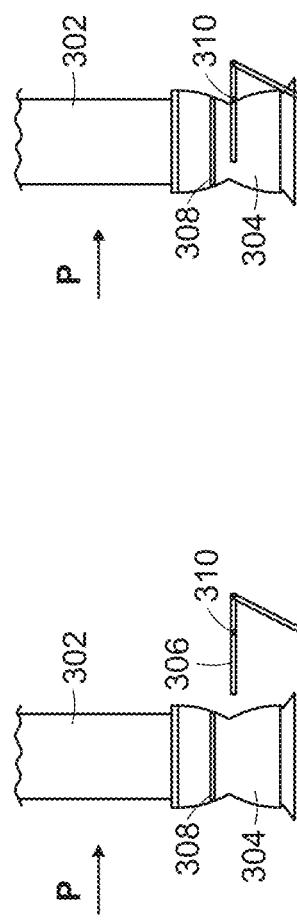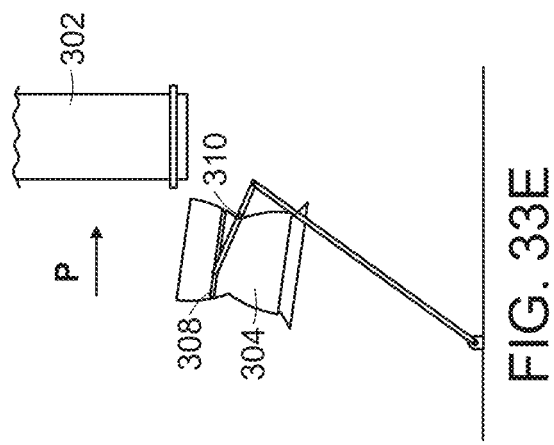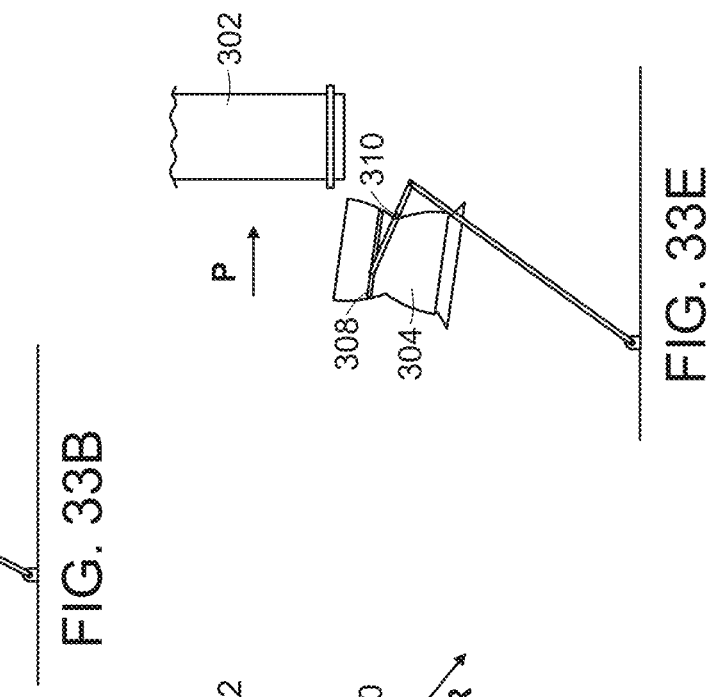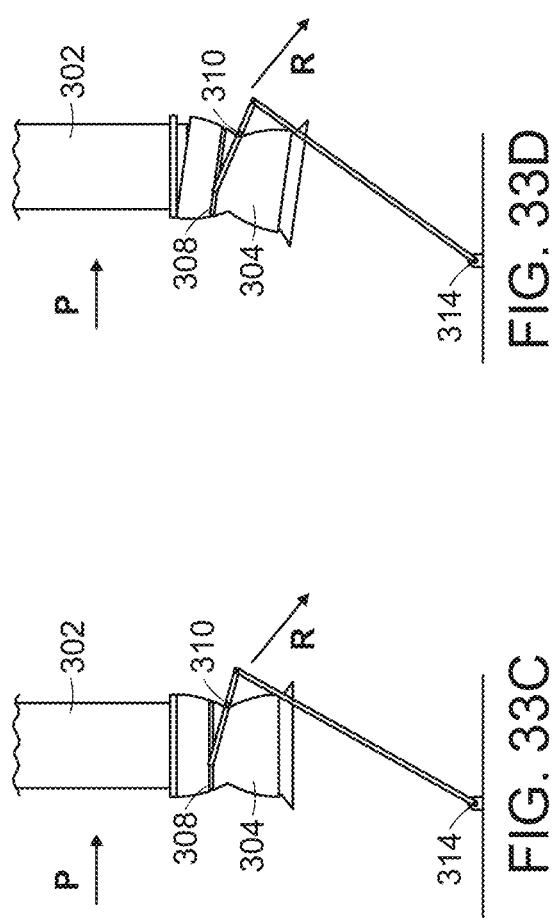

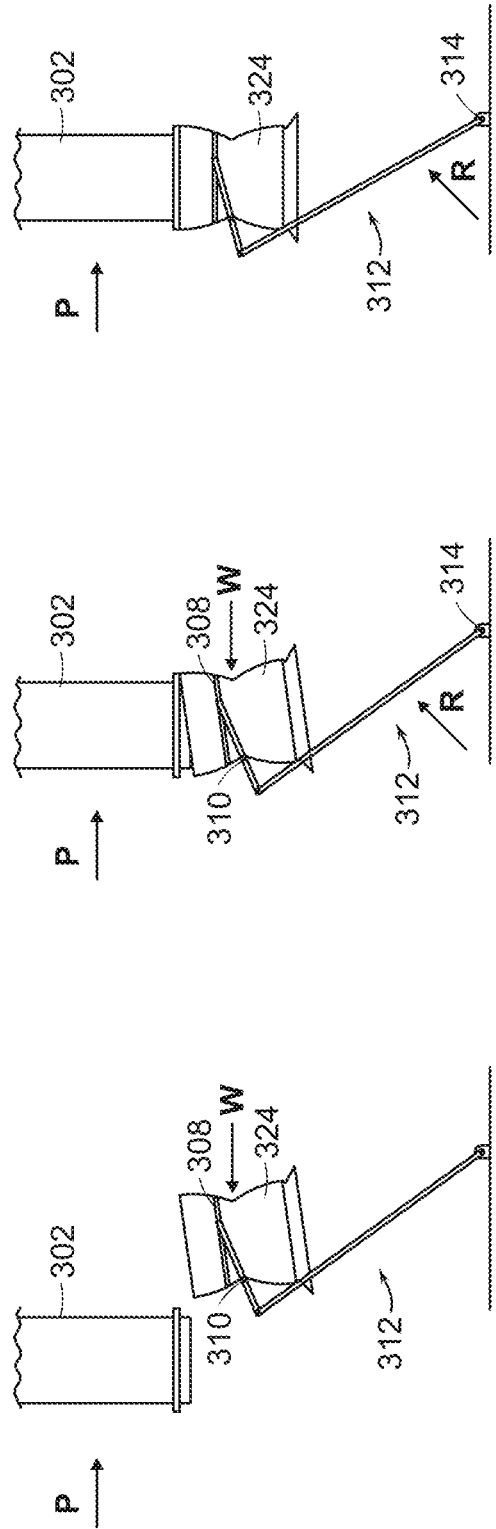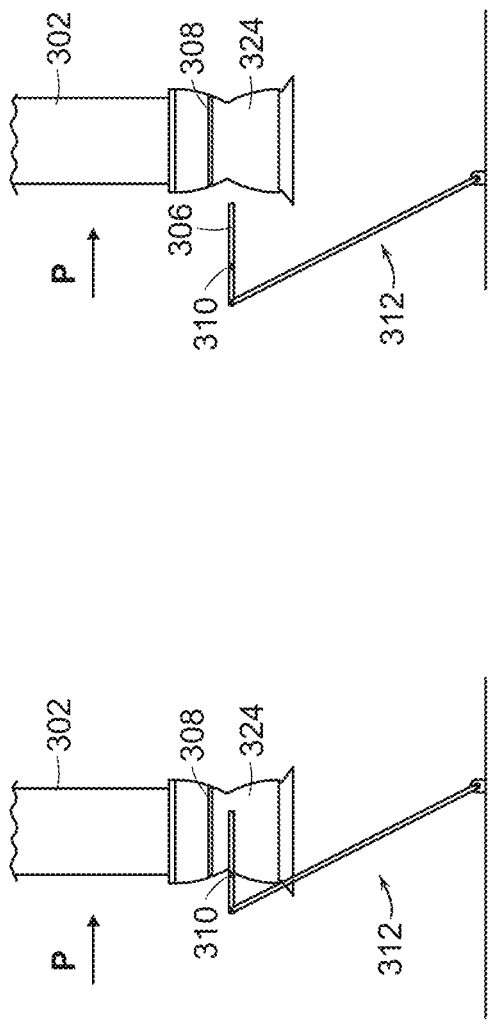

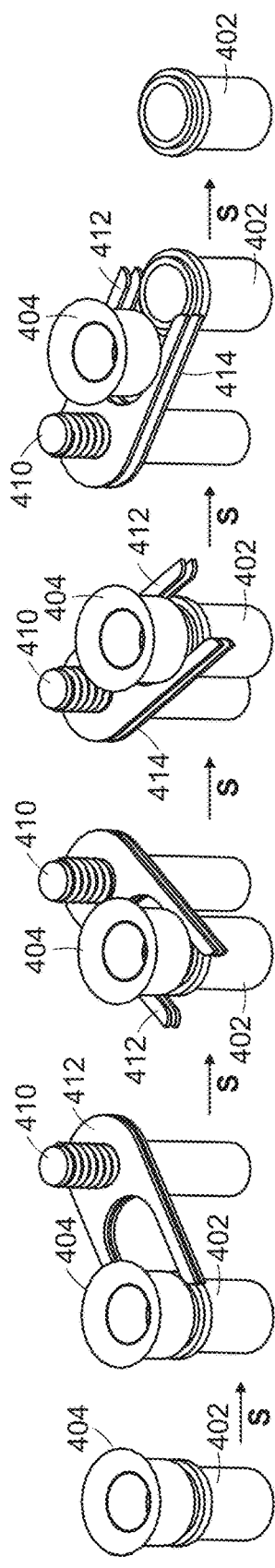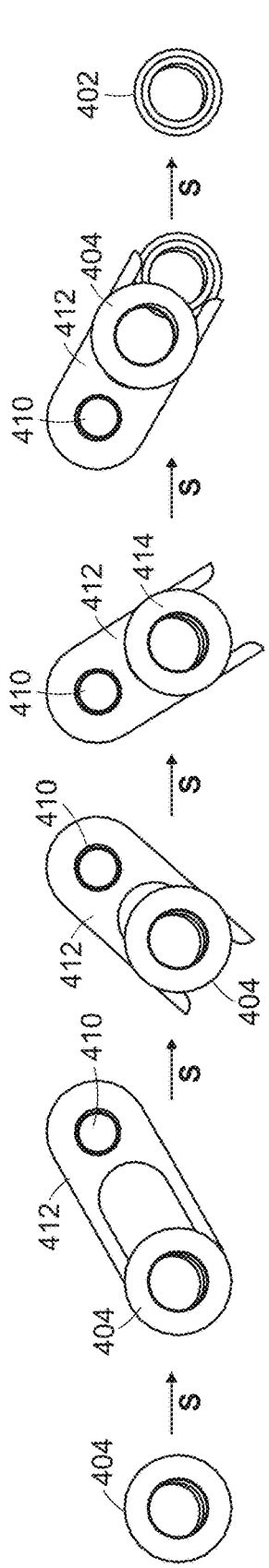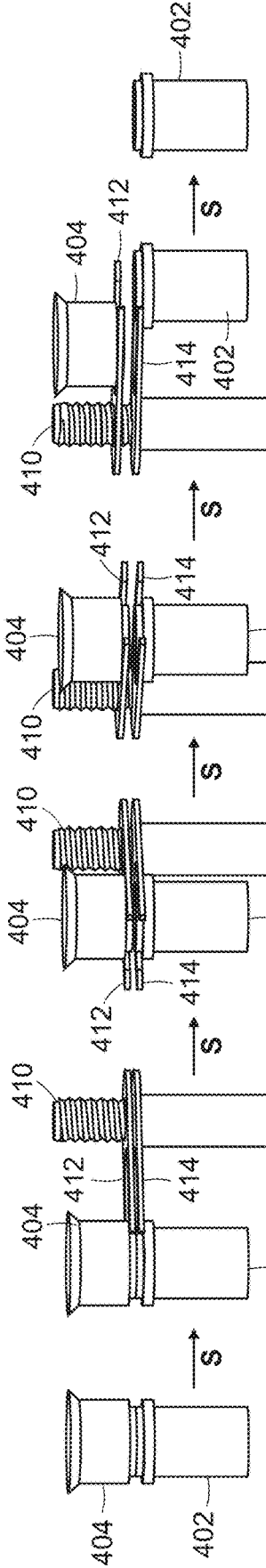

SYSTEMS AND METHODS FOR EFFICIENTLY EXCHANGING END EFFECTOR TOOLS

PRIORITY

The present application is a continuation of U.S. patent application Ser. No. 16/523,245, filed Jul. 26, 2019, now U.S. Pat. No. 11,865,700, issued Jan. 9, 2024, which claims priority to U.S. Provisional Patent Application Ser. No. 62/739,562, filed Oct. 1, 2018, as well as to U.S. Provisional Patent Application Ser. No. 62/711,087, filed Jul. 27, 2018, the disclosures of which are hereby incorporated by reference in their entireties.

BACKGROUND

The invention generally relates to programmable motion systems and relates in particular to end effectors for programmable motion devices (e.g., robotic systems) for use in object processing such as object sortation.

End effectors for robotic systems may be employed, for example, in certain applications to select and grasp an object, and then move the acquired object very quickly to a new location. Such end effectors should be designed to quickly and easily select and grasp an object from a jumble of similar or dissimilar objects, and should be designed to securely grasp an object during movement. Certain end effectors, when used on different objects of different physical sizes, weights and materials, may have limitations regarding how securely they may grasp an acquired object during rapid movement, particularly rapid acceleration and deceleration (both angular and linear).

Many end effectors employ vacuum pressure for acquiring and securing objects for transport and/or subsequent operations by articulated arms. Other techniques for acquiring and securing objects involve electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

In many applications, it is desirable for the programmable motion device to change tools automatically. For that purpose there are automatic tool changers, such as those offered by ATI Industrial Automation, Inc. of Apex North Carolina and Schunk GmbH & Co. of Germany (each of which uses radially locking bearings). Available tool changers are generally designed to accommodate a wide range of applications, including those where the tools may be complex, bulky, or heavy. Some tools may also require pass-through passages for compressed air, electrical signals, or vacuum. The tool changer might also provide rigid high-precision mounting of the tool on the end effector, so that the robot's load and precision specifications will not be compromised.

Tool changers also generally require tool racks that hold the tools and facilitate the mounting and dismounting of tools from the end effector. The tool changers and tool racks generally assume that dismounting occurs by moving the tool into the rack, engaging the tool by the rack, actuating a latch mechanism to release the tool, and then moving the end effector away from the tool. Mounting a tool reverses this process—the end effector moves to match the two halves of the tool change device, the tool is released by the rack, the latch is actuated, and the end effector then moves the tool out of the rack. These mounting and dismounting motions are generally precise and slow, in accord with the precise tolerances of the tool changer.

A disadvantage of commercially available tool changers is that they are slow. The introduction of long delays can reduce the value of an automated solution, in some cases to the point that the automated solution is not viable. Thus there is a need for tool changing devices that achieve greater speed, and an opportunity to achieve that speed by designing tool changers for those applications with more liberal requirements. There remains a further need therefore, for end effector systems that permit programmable motion systems to quickly and efficiently change end effector tools.

SUMMARY

In accordance with an embodiment, the invention is directed to a method of changing a tool on a programmable motion device. The method includes the steps of moving an attachment portion of an end effector of the programmable motion device in a continuous motion; while the attachment portion of the end effector moves in the continuous motion, engaging one of: the attachment portion of the end effector with the tool, or the tool attached to the attachment portion of the end effector with an exchange system, and continuing to move the attachment portion of the end effector in the continuous motion to change a connection status of the attachment portion of the end effector while the attachment portion of the end effector moves in the continuous motion.

In accordance with another embodiment, the invention is directed to a method of exchanging a tool on a programmable motion device. The method includes the steps of moving an attachment portion of the end effector in a continuous motion, removing a first tool from the attachment portion of the end effector while the attachment portion of the end effector moves in the continuous motion, and attaching a second tool to the attachment portion of the end effector while the attachment portion of the end effector device moves in the continuous motion.

In accordance with yet another embodiment, the invention is directed to a method of changing a tool on a programmable motion device. The method includes the steps of moving an attachment portion of an end effector of the programmable motion device in a linear motion, while the attachment portion of the end effector moves in the linear motion, engaging one of: the attachment portion of the end effector with the tool, or the tool attached to the attachment portion of the end effector with an exchange system, and continuing to move the attachment portion of the end effector in the linear motion to change a connection status of the attachment portion of the end effector while the attachment portion of the end effector moves in the linear motion.

In accordance with a further embodiment, the invention is directed to a system for changing a tool on a programmable motion device. The system includes an engagement system for moving an attachment portion of an end effector of the programmable motion device in a continuous motion, and while the attachment portion is moving, engaging the tool with one of an attachment portion of the end effector, or an exchange station to thereby change a connection status of the attachment portion of the end effector while the attachment portion of the end effector moves in the continuous motion.

BRIEF DESCRIPTION OF THE DRAWINGS

The following description may be further understood with reference to the accompanying drawings in which:

FIGS. 2A-2E show illustrative diagrammatic detailed views of the end effector of FIGS. 1A and 1B moving toward a disengagement station (FIG. 2A), moving the end effector away from the disengagement station (FIG. 2B), leaving the first tool and moving the end effector toward a second tool (FIG. 2C), moving the end effector toward the second tool (FIG. 2D), and engaging and removing the second tool (FIG. 2E) in accordance with the prior art;

FIG. 14 shows an illustrative diagrammatic view of an end effector system in accordance with another embodiment that includes an electromagnet;

FIGS. 15A and 15B show illustrative diagrammatic side views of the end effector system of FIG. 14 with the components connected (FIG. 15A) and with the components not connected (FIG. 15B);

FIG. 16 shows an illustrative diagrammatic view of an end effector tool exchange device in accordance with an embodiment of the present invention that includes rollers;

FIGS. 20A and 20B show illustrative diagrammatic views of an end effector exchange system including multiple end effector exchange devices in accordance with a further embodiment of the present invention, wherein an end effector having a first end effector tool approaches a first exchange device (FIG. 20A) from which it is disengaged, and the end effector later engages a second end effector tool (FIG. 20B);

FIGS. 22A-22D show illustrative diagrammatic views of an end effector exchange system including multiple end effector exchange devices in accordance with a further embodiment of the present invention involving a single exchange device, wherein a first end effector tool approaches a first exchange device (FIG. 22A), the first end effector tool is engaged by the exchange system (FIG. 22B), the end effector tool disengages from the end effector (FIG. 22C), and the end effector tool becomes fully disengaged from the end effector (FIG. 22D);

FIGS. 23A-23D show illustrative diagrammatic views of an end effector exchange system including multiple end effector exchange devices in accordance with yet a further embodiment of the present invention involving a single track, single exchange device, wherein a first end effector tool approaches a first exchange device (FIG. 23A), the first end effector tool is engaged by the exchange system (FIG. 23B), the end effector tool disengages from the end effector (FIG. 23C), and the end effector tool becomes fully disengaged from the end effector (FIG. 23D);

FIGS. 24A and 24B show illustrative diagrammatic views of a portion of an end effector exchange system that includes an end effector advancing mechanism;

FIG. 27A shows an illustrative diagrammatic view of an end effector that includes a non-magnetic friction fit coupling for attaching to an end effector tool;

FIG. 27B shows an illustrative diagrammatic side view of the end effector of FIG. 27A;

FIG. 27C shows an illustrative diagrammatic side sectional view of the end effector of FIGS. 27A and 27B coupled to the end effector tool;

FIGS. 33A-33E show illustrative diagrammatic side views of the end effector system of FIG. 31 disengaging an end effector tool using the bracket wherein the end effector and tool approach the bracket (FIG. 33A), engage the bracket (FIG. 33B), begin to disengage the tool (FIG. 33C), further disengage the tool (FIG. 33D), and become separated from the tool (FIG. 33E);

FIGS. 34A-34E show illustrative diagrammatic side views of the end effector system of FIG. 31 engaging an end effector tool using the bracket wherein the end effector approaches the tool held by the bracket (FIG. 34A), begins to engage the tool (FIG. 34B), further engages the tool (FIG. 34C), fully engages the tool (FIG. 34D), and carries the attached tool away from the bracket (FIG. 34E);

FIGS. 40A-40F show illustrative diagrammatic views of an end effector and tool approaching the exchange system of FIG. 36 (FIG. 40A), initially engaging the exchange system (FIG. 40B), further engaging the exchange system (FIG. 40C), beginning to separate the end effector tool from the end effector (FIG. 40D), further separating the end effector tool from the end effector (FIG. 40E), and showing the end effector tool separated from the end effector;

FIGS. 41A-41F show illustrative diagrammatic top views of the end effector and tool approaching the exchange system of FIG. 36 (FIG. 41A), initially engaging the exchange system (FIG. 41B), further engaging the exchange system (FIG. 41C), beginning to separate the end effector tool from the end effector (FIG. 41D), further separating the end effector tool from the end effector (FIG. 41E), and showing the end effector tool separated from the end effector (FIG. 41F);

FIGS. 42A-42F show illustrative diagrammatic side views of the end effector and tool approaching the exchange system of FIG. 36 (FIG. 42A), initially engaging the exchange system (FIG. 42B), further engaging the exchange system (FIG. 42C), beginning to separate the end effector tool from the end effector (FIG. 42D), further separating the end effector tool from the end effector (FIG. 42E), and showing the end effector tool separated from the end effector (FIG. 42F);

The drawings are shown for illustrative purposes only.

DETAILED DESCRIPTION

Applicants have discovered that there are many applications where tools are considerably simpler and lighter than those used on certain precision manufacturing programmable motion systems, and further, that in such other applications, the requirements on the tool-changer may be relaxed. For example, in some logistics applications, such as processing items for shipping or E-commerce order fulfillment, it may be necessary to change vacuum cups from one size to another. A typical vacuum cup requires no pass-throughs of electrical, pneumatic, or hydraulic passages, other than the vacuum. Further, the precision of the mount need not be high. Even in a manufacturing application, there are cases where the tools to be exchanged are simple and the requirements for the tool changer may be relaxed.

Figure 1A:
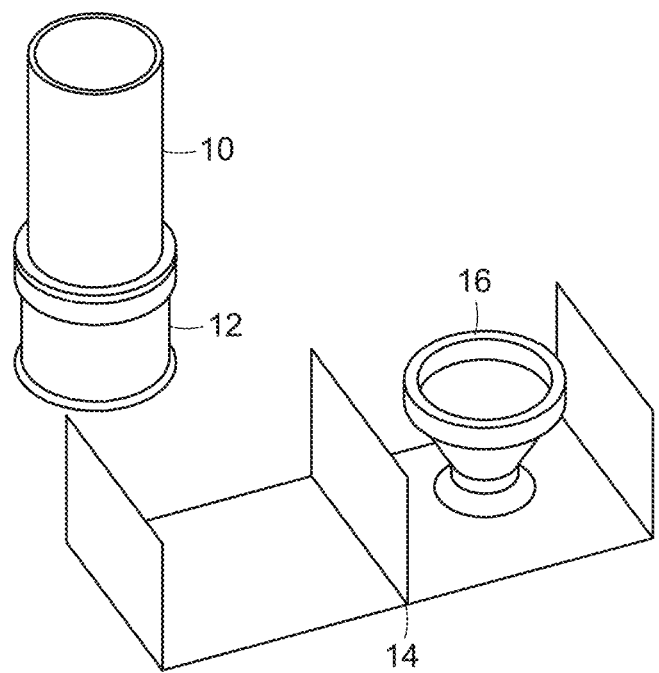
FIGS. 1A and 1B show illustrative diagrammatic views of an end effector of a programmable motion device disengaging a first tool (FIG. 1A) and engaging a second tool (FIG. 1B)
Figure 1B:
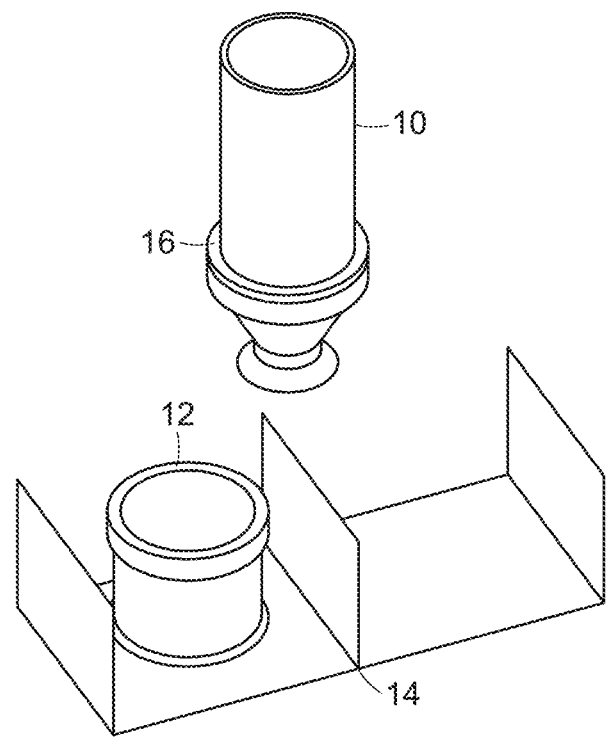

In programmable motion devices it is sometimes desirable to change end effector tools during processing (between moving objects). The process of changing end effector tools may generally involve (with reference to FIG. 1A) moving an end effector 10 of a programmable motion device that contains a tool 12 toward a storage area 14. The storage area 14 may also include another tool 16 that may be retrieved in place of the end tool 12, as shown in FIG. 1B. The process, however, of exchanging the tool 12 for the tool 16 may require considerable steps.

For example (and with reference to FIGS. 2A-2E), the process may involve, at least, moving the attachment portion 10 of the effector that contains the attached tool 12 in a first direction as generally shown at A in FIG. 2A. The process may later involve moving the attachment portion 10 of the effector in a second direction as generally shown at B in FIG. 2B once the first tool 12 is released from the attachment portion 10 of the effector. The process may then involve moving the attachment portion 10 of the effector in at least two further directions as generally shown at C and D in FIG. 2C. Finally, the process may involve again changing directions, and moving the attachment portion 10 of the effector in a direction as generally indicated at E in FIG. 2D, until the attachment portion 10 reaches a position at which it is ready for further processing.

Such a typical tool change motion, therefore, involves fine vertical in-and-out motions to dismount tool 12, and further fine vertical in-and-out motions to mount tool 16. Each fine motion includes a reversal, and there is a further reversal between the mount and dismount motions, so the process involves multiple reversals and fine motions, leading to a very time consuming operation. The arrangement is typical but not universal. In some cases the approaching motion might be horizontal, and the departing motion vertical, or vice versa. Even though such a motion is not a reversal, it presents the same problems. The path includes a sharp corner, which can only be produced by coming to a stop or a near-stop, which is a time-consuming fine motion.

Not only does the above process described with reference to FIGS. 2A-2E involve many changes of direction as well as fine motion control, the process also involves many steps of disengaging/engaging the tool 12 and the tool 16 both from/to the attachment portion 10 of the effector, as well as to/from the storage area 14 while the effector is stopped. For example, the tool 12 must be disengaged from the attachment portion 10, and engaged by the storage area 14 as shown in FIG. 2B. The process may also involve disengaging the tool 16 from the storage area 14 and engaging the tool 16 by the attachment portion 10 of the effector as shown in FIG. 2D.

The process of changing tools of the effector of the programmable motion device therefore involves many changes in direction of the effector, as well as many complex fine control engagement and disengagement steps of the tools 12, 16 from and to the attachment portion 10 of the effector and the storage area 14.

Figure 3A:
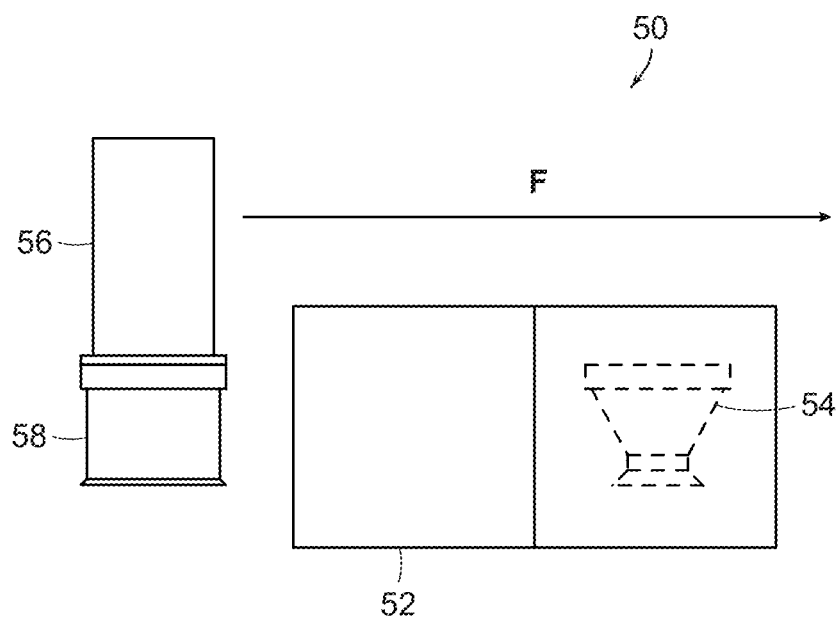
FIGS. 3A and 3B show illustrative diagrammatic views of an end effector of a programmable motion device disengaging a first tool (FIG. 3A) and engaging a second tool (FIG. 3B) in accordance with an embodiment of the present invention.
Figure 3B:
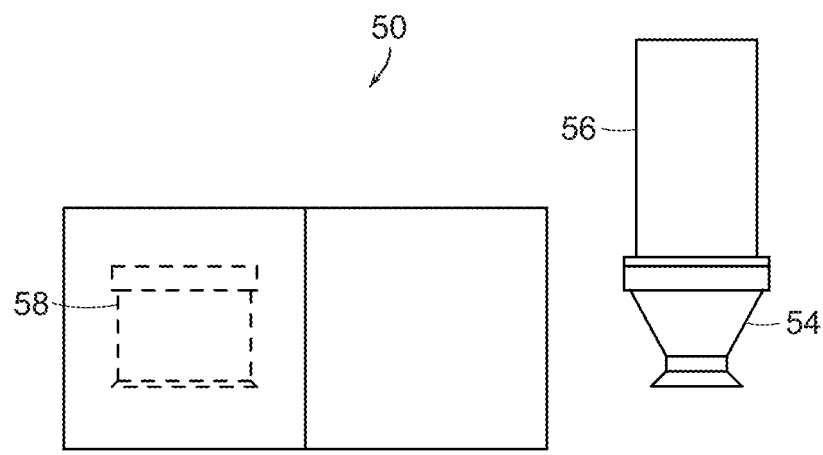

The exchanging system in accordance with various embodiments of the present invention (and with reference to FIGS. 3A and 3B) may, for example, be used with a programmable motion system for moving objects for processing, such as sortation and order fulfillment. The exchange system 50 includes an exchange device 52 that may contain an end effector tool 54. When an attachment portion of the effector 56 of a programmable motion device moves in a direction as indicated at F in FIG. 3A, an end effector tool 58 that is attached to the attachment portion of the effector 56 will become detached from the attachment portion of the effector, and in its place, the end effector tool 54 will become attached to the attachment portion effector 56 as shown in FIG. 3B, all while the attachment portion moves in the direction as shown at F. In various embodiments, the movement may be linear and/or may be continuous. As shown in FIGS. 3A and 3B, the effector moves through a serial pair of holders. As it passes through the first half, the present tool 58 is dismounted. As it passes through the second half, the new tool 54 is mounted.

The invention generally provides a set of mechanisms and methods to achieve a rapid exchange of tools in various embodiments. Previous tool exchange devices require the programmable motion device to make at least two fine motions, meaning slow and precise motions. The first fine motion approaches the holder and dismounts the present tool. The second fine motion approaches and mounts the desired tool.

The invention eliminates the fine motions of the programmable motion device. Instead, the programmable motion device, including the effector, remains in substantially uniform motion, and the tool-unmounting and tool-mounting motions are accomplished relative to the effector, as it flies by the holder. The term tool refers to the removable part of the system that is to be exchanged. The term effector refers to the distal link of the programmable motion device, on which the tool is mounted. The term holder refers to the mechanism that holds a tool and facilitates the tool exchange process. The term rack refers to several holders arranged as a unit to hold a variety of tools for selection by the programmable motion device.

The multiple tools and the exchanging system of certain embodiments of the invention may be used with a wide variety of programmable motion devices that are employed for a variety of purposes, such as, for example, object order fulfillment, or object sortation for materials handling and shipping.

The tool change systems of the invention may be used with a wide variety of programmable motion systems and applications. The systems and applications disclosed herein, are in no way limiting of the systems and applications that may benefit from the invention. In applications such as order fulfillment for example, objects are collected into heterogeneous sets and need to be processed into appropriate groupings. In particular, individual objects need to be identified (e.g., by perception systems) and then routed to object-specific locations. The described system reliably automates the grasping and movement of such objects by employing both a robotic arm and versatile gripping systems. The perception units (e.g., cameras or scanners) may look for a variety of codes such as indicia, e.g., barcodes, QR codes, radio frequency tags, Stock Keeping Unit (SKU) codes, Universal Parcel Codes (UPC), low wavelength IR (LWIR), as well as invisible barcodes and digital watermarks such as Digimarc DWCode, etc. Sorting for order fulfillment, for example, is one application for automatically identifying objects from a heterogeneous object stream. Barcode scanners have a wide variety of uses including identifying the Stock Keeping Unit of an article, or tracking parcels.

Such an order fulfillment system automates part of the sorting process in conjunction with a robotic pick and place system, and in particular, the step of grasping and carrying objects. A programmable motion device such as a robotic arm, for example, picks an object from a bin, places the object in front of (or drops an object into) a scanner, and then, having obtained identification information for the object (such as a barcode, QR codes, UPC codes, other identification codes, information read from a label on the object, or size, weight and/or shape information), routes the object toward the appropriate bin or shelf location by either moving the object itself, or placing the object in or on a conveyance system. Since certain scanners employ cameras or lasers to scan 1D or 2D symbologies printed on labels affixed to objects, the barcodes must be visible to the scanner's sensors for successful scanning in order to automatically identify items in a heterogeneous stream of arbitrary objects, as in a jumbled set of objects found in a bin. Further applications for grasping systems of the invention include sortation for a wide variety of applications, including order fulfillment, collection of objects for shipping, and collection of objects for inventory purposes, etc.

An important aspect is the ability to identify identification or mailing information for the object (such as a barcode, QR codes, UPC codes, other identification codes, information read from a label on the object, or size, weight and/or shape information) of objects by employing a programmable motion device such as a robot arm, to pick up individual objects and place them in front of one or more scanners or to drop or place the object into a scanner. In accordance with other embodiments, the programmable motion device may include a parallel arm robot (Delta-type arm) or a linear indexing pick and place system. Certain convention scanning systems, for example, may be unable to see labels or barcodes on objects that are presented in a way that this information is not exposed or visible. Tool changing systems of the invention may be used with programmable motion devices such as articulated arms, parallel arm robots (Delta-type arms), or linear indexing pick and place systems.

Figure 4:
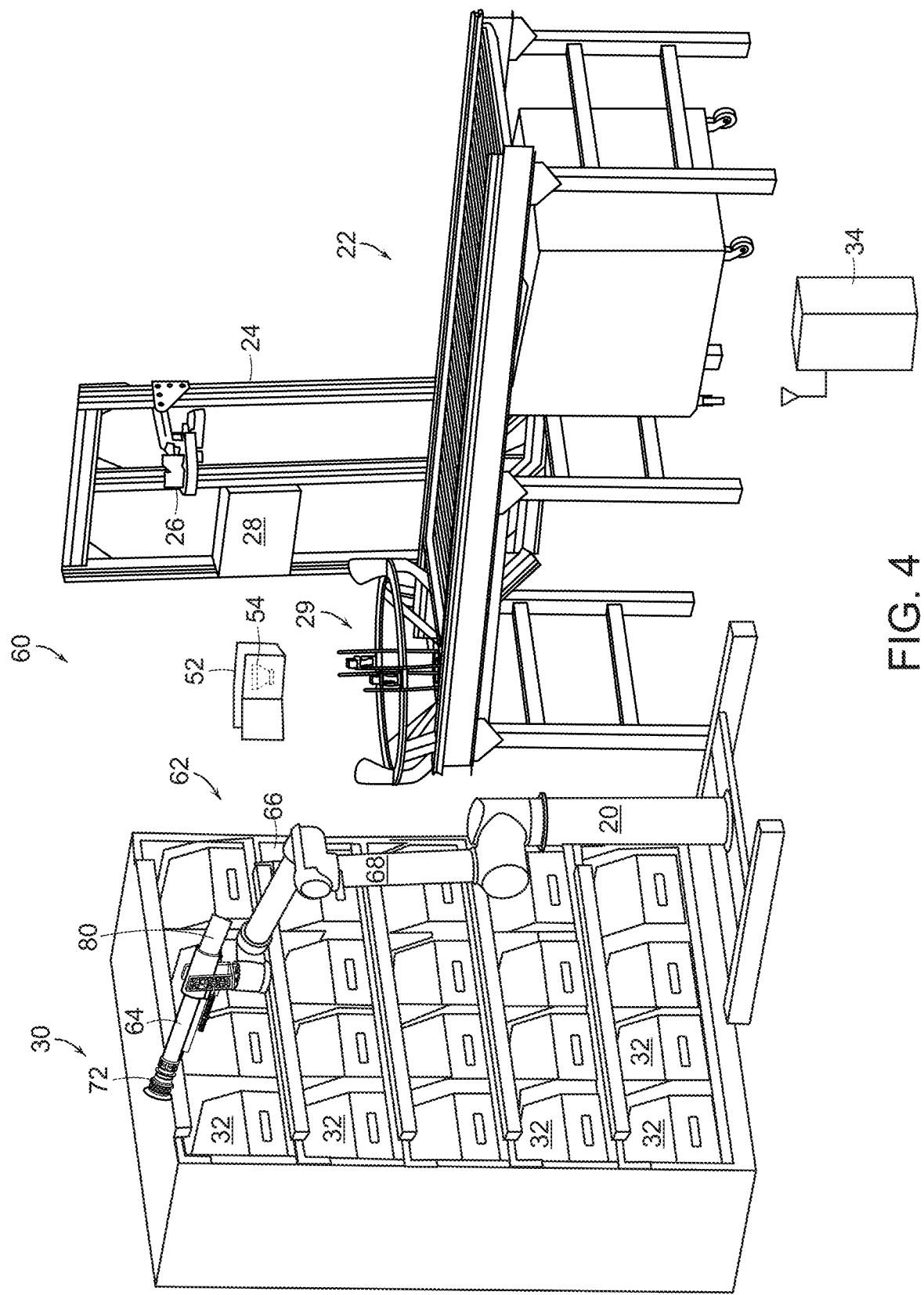
FIG. 4 shows an illustrative diagrammatic view of a programmable motion device system including a system for changing end effector tools in accordance with an embodiment of the present invention.

Important components of an automated processing system that includes a tool changing system of the invention are shown in FIG. 4. FIG. 4 shows a programmable motion system 60 that includes an articulated arm 62 that includes an end effector 64 having a tool 72 and articulated sections 66, 68 and 20. The end effector 64 is able to access a tool changing system 52, and the invention provides that the end effector may change tool 72 for another tool, e.g., 73, by moving through the tool changing system 52 as discussed in more detail below.

Generally, the articulated arm 62 selects objects from an input area such as a conveyor 22 that are either in a bin on the conveyor 22, or are on the conveyor itself. A stand 24 includes an attached perception unit 26 that is directed toward the conveyor from above the conveyor 22. The perception unit 26 may include, for example, a 2D or 3D camera, or a scanner such as a laser reflectivity scanner or other type of bar-code reader, or a radio frequency ID scanner. The perception unit 26 is positioned to acquire perception data regarding objects that are provided on a conveyor 22 or in a bin that is on the conveyor 22. Based on the perception data, the system 60 determines one or more grasp locations in an object, and directs the end effector 64 on the articulated arm 62 to grasp the object.

Figure 5:
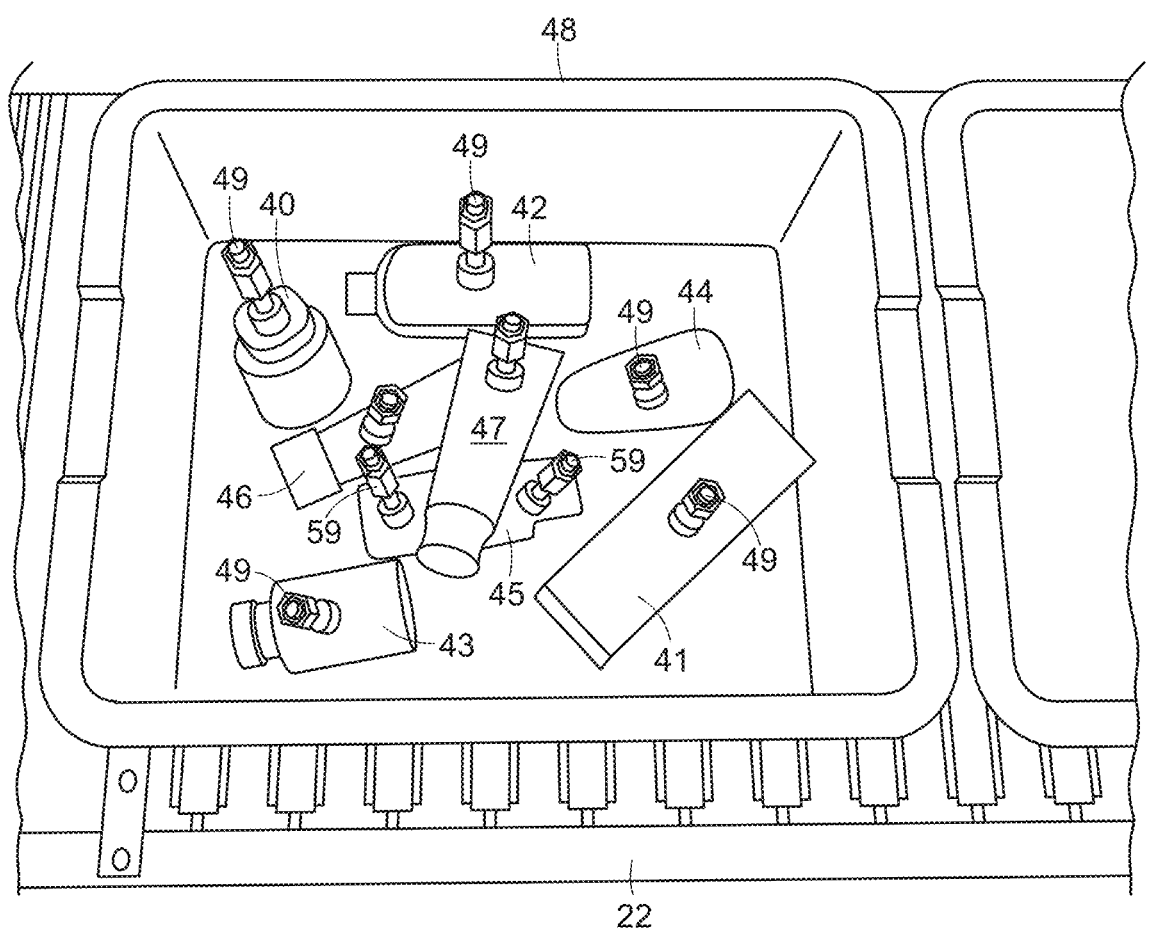
FIG. 5 shows an illustrative diagrammatic view of an image from a primary perception system of the system of FIG. 4 showing a view into a bin with grasp locations overlaid on the image.

Images taken by the perception unit 26 may be displayed on a touch input screen 28 so that persons in the environment may interact with the system 60, e.g., by confirming, rejecting or proposing, possible grasp locations on objects, based on which the system 60 may undergo machine learning (e.g., in processor 34) with regard to the objects. FIG. 5, for example, shows objects 40-47 in a bin 48 on the conveyor 22. Associated with each object are possible grasp locations and orientations that the gripper may use to grasp the objects. While certain grasp locations 49 are good, others, such as 59 are not good grasp locations for a variety of reasons, such as for example, that the object is presently blocked by other objects. Either with or without prompts, a human may enter information through the interactive touch input screen regarding which grasp locations proposed by the system are good, which grasp locations proposed by the system are bad, and/or which grasp locations not proposed by the system would be advised.

Figure 6:
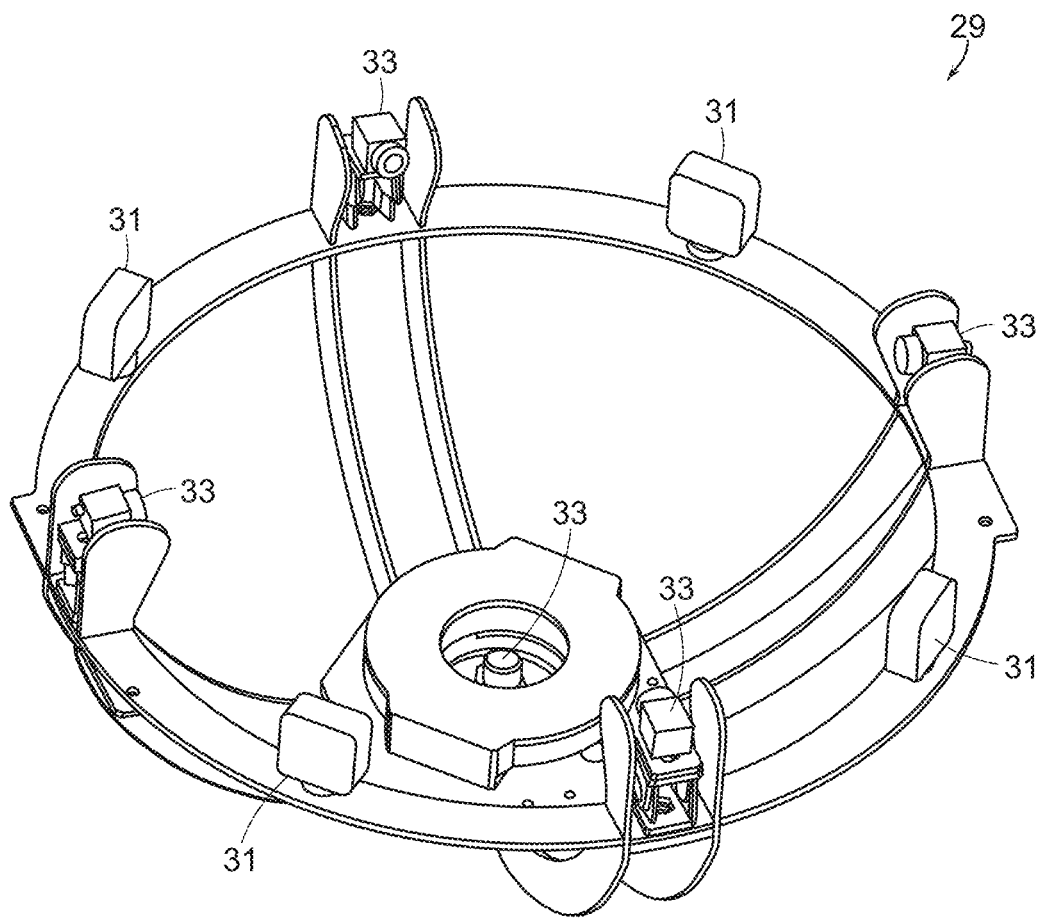
FIG. 6 shows an illustrative diagrammatic view of a secondary perception system of the system of FIG. 4 showing a plurality of secondary perception units.

The system 60 provides that when an object has been grasped by the end effector 64 of the articulated arm 62, the end effector 64 may present the object to a perception station 29. As further shown in FIG. 6, the perception station 29 includes a plurality of light sources 31 (e.g., LEDs, or fluorescent, phosphorescent or incandescent lights), as well as a plurality of perception units 33 (e.g., scanners or cameras) for reading barcodes, radio frequency tags, Stock Keeping Unit (SKU) codes, Universal Parcel Codes (UPC), low wavelength IR (LWIR) information or invisible bar-codes and digital watermarks. While the perception unit 26 may have detected any such label or code upon grasp planning if the label or code was facing the perception unit 26, the additional perception units 33 at the perception station 29 provide views of all remaining sides of the object when the end effector 64 positions the object within the perception station 29.

Having identified a code or indicia, the processing system 34 then pulls routing information regarding the object, and the articulated arm 62 then moves the object using the end effector 64 to an appropriate location 32 of a bank of sortation locations 30. The end effector 64 further includes an acquisition unit tool 72 (such as a vacuum unit, e.g., a vacuum cup) for contacting and grasping the objects. In an embodiment, the acquisition unit tool 72 may be in the form of a flexible bellows, and may include a vacuum line 80 attached to the end effector 64 for providing a vacuum source at the mouth of the flexible bellows.

Figure 7:
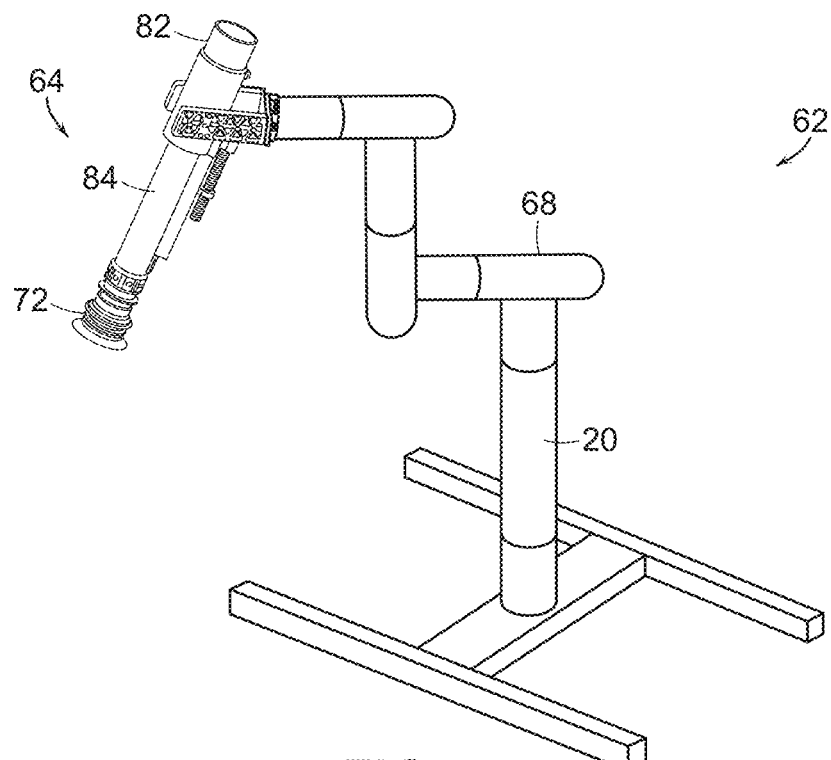
FIG. 7 shows an illustrative diagrammatic view of a programmable motion device for use in a system in accordance with another embodiment of the present invention that includes an acquisition unit and coupling system that includes a linear force accommodation system.
Figure 8:
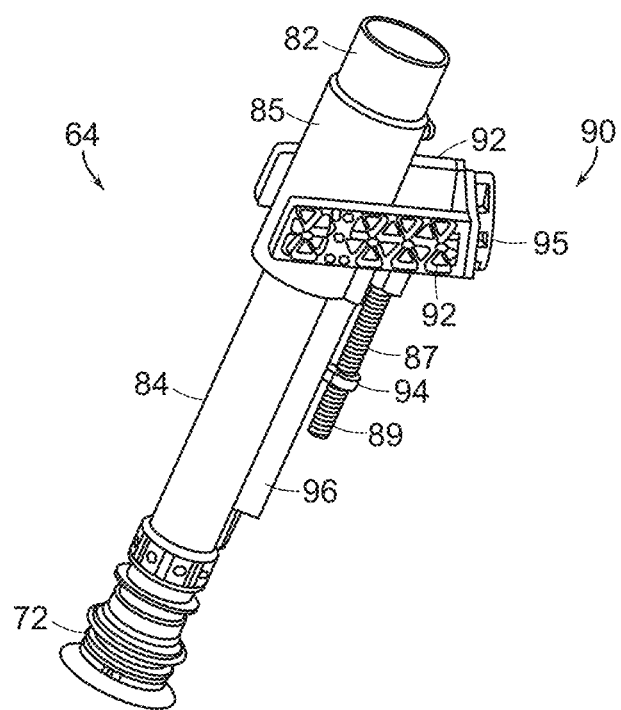
FIG. 8 shows an illustrative diagrammatic enlarged view of the end effector of the system of FIG. 7.

As further shown in FIGS. 7 and 8, the acquisition unit tool 72 is coupled to a conduit 84, the other end of which 82 is coupled to the vacuum line 80 (shown in FIG. 4). The conduit 84 is adapted to linearly slide into and out of an end effector base 85 relatively small amounts. The end effector 64 provides the vacuum through the conduit to the acquisition unit tool 72. The end effector 64 is attached to the articulated arm via a coupling mechanism 90 that includes clamp arms 92. A slidable anchor 94 is attached to the conduit 84 such that as the conduit 84 slides in and out of the end effector base 85, the anchor moves along a track 96. When the anchor 94 (and the conduit 84) moves toward the base 85, the upper spring 87 is compressed, and then the anchor 94 moves away from the base 85, the lower spring 89 is compressed. The end effector 64 thereby permits the end acquisition unit tool 72 to move toward and away from the base 85 against the forces of springs in either direction to accommodate axial forces that are applied to the acquisition unit tool 72 during use. The coupling mechanism 90 includes an attachment plate 95 for coupling to the robotic arm. The coupling mechanism may also include a low profile load plate for monitoring load forces on the acquisition unit tool 72.

The system 60 may therefor further provide a plurality of end effector tools in addition to end effector tool 72 that are suited for grasping different objects. In certain embodiments, the end effector tools are vacuum cups that provide passage of a vacuum therethrough. As an example, the different end effectors may each be a different size, and be suited for grasping different objects having differently sized flat areas (for grasping).

In accordance with certain embodiments, therefore, the invention provides a programmable motion system including a dynamic end effector system. The dynamic end effector system includes a plurality of acquisition units and coupling means. The plurality of acquisition tools are provided at an exchange station within an area accessible by the programmable motion device. The coupling means is for coupling any of the plurality of acquisition tools to an end effector of the programmable motion device such that any of the acquisition tools may be automatically selected from the exchange station and used by the programmable motion device without requiring any activation or actuation by the exchange station and without requiring any intervention by a human. While a human may place a new actuation tool into the exchange system, and may then inform the system as to which actuation unit is placed in the system and where it is placed, this is not required. The system may originally be set up such that the system is programmed to know which actuation tools began in which positions (and thereafter track any movement via exchanges). In other embodiments, the vacuum cup tools may have unique physical or magnetic features that may be detected by the exchange station or by the end effector. The programmable motion system may therefore process the objects, and between moving an object, the system may quickly and efficiently exchange a current end effector tool with a new end effector tool as needed.

Figure 9:
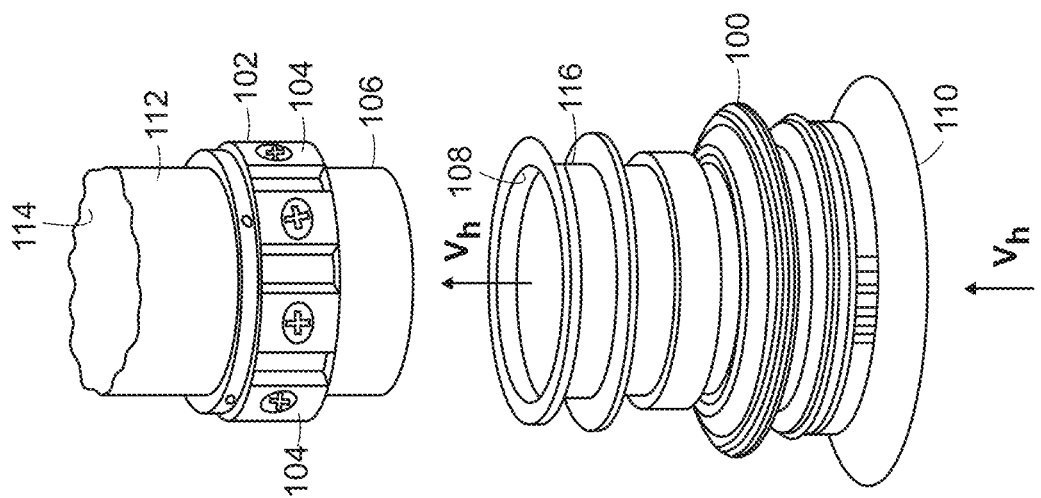
FIG. 9 shows an illustrative diagrammatic exploded view of an end effector system of a programmable motion device in accordance with an embodiment of the present invention.
Figure 13:
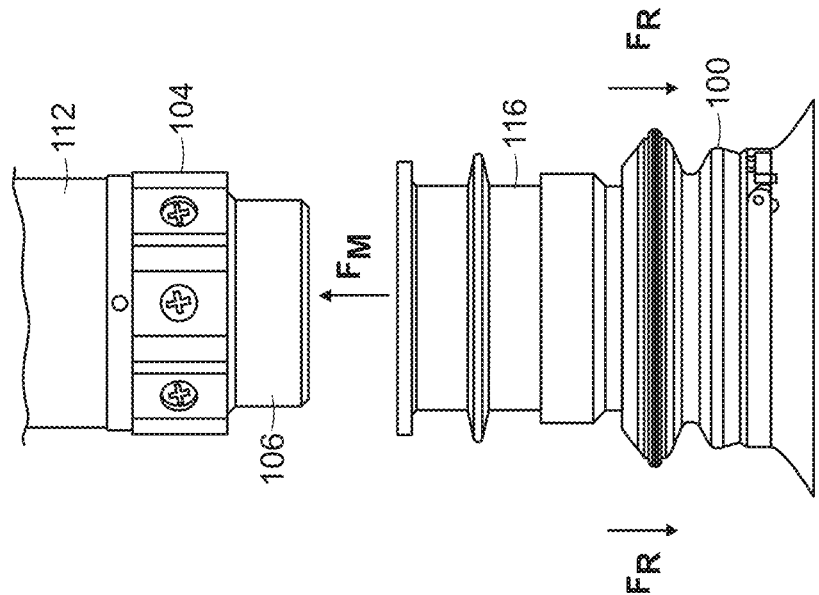
FIG. 13 shows an illustrative diagrammatic view of the end effector system of FIG. 9 showing a removal force overcoming the vacuum force.

Systems of certain embodiments of the present invention provide that an acquisition tool, such as a vacuum cup (e.g., a flexible bellows type vacuum cup), through which a high vacuum may be designed to flow, may be exchanged for another vacuum cup during use, by the programmable vacuum device. In particular, and with reference to FIG. 9, a high flow vacuum may be provided to flow through an acquisition unit tool 100 from a base 110 up through an opening 108. When coupled to an end effector that includes a coupling unit 102 (having magnets 104), a collar 106 and a conduit of the end effector 112, the high flow vacuum is maintained through the end effector, and in particular, through the interior 114 of the conduit 112. Again, the coupling unit 102 couples the end effector 112 to the tool 100 by having the magnetic field created by the magnets 104 pull the ferromagnetic top portion 116 of the tool 100 toward the coupling unit 104, such that the collar 106 of the end effector is engaged within the interior of the acquisition unit tool 100 when the tool 100 is engaged with the end effector 112. Both before and after coupling, a high flow vacuum ($V_h$) is permitted to flow through the units as shown.

Figure 11:
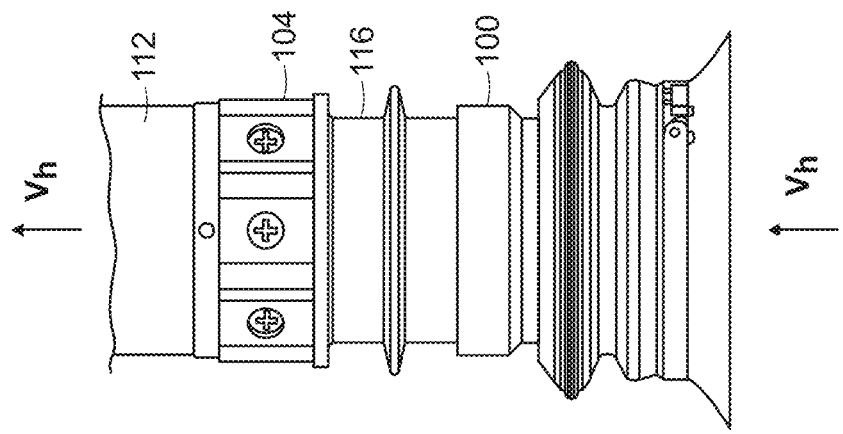
FIG. 11 shows an illustrative diagrammatic view of the end effector system of FIG. 9 with the components connected showing the vacuum passing therethrough.
Figure 10:
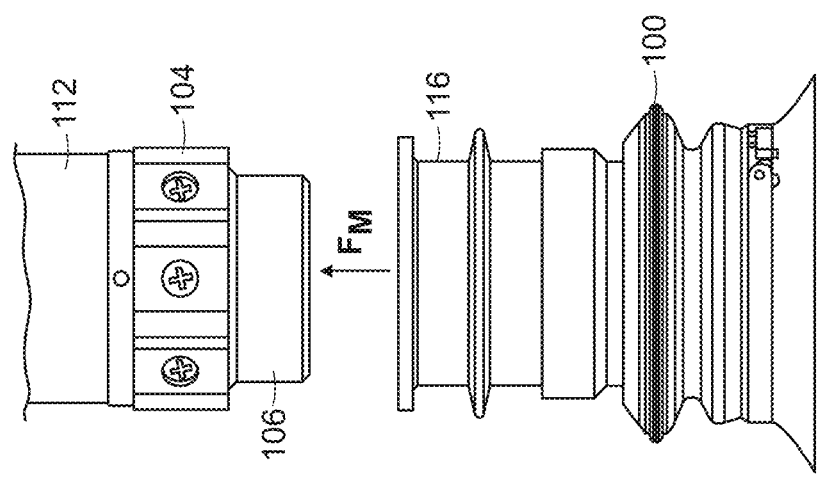
FIG. 10 shows an illustrative diagrammatic view of the end effector including the tool of FIG. 9 diagrammatically the attractive magnetic force between the components.
Figure 12:
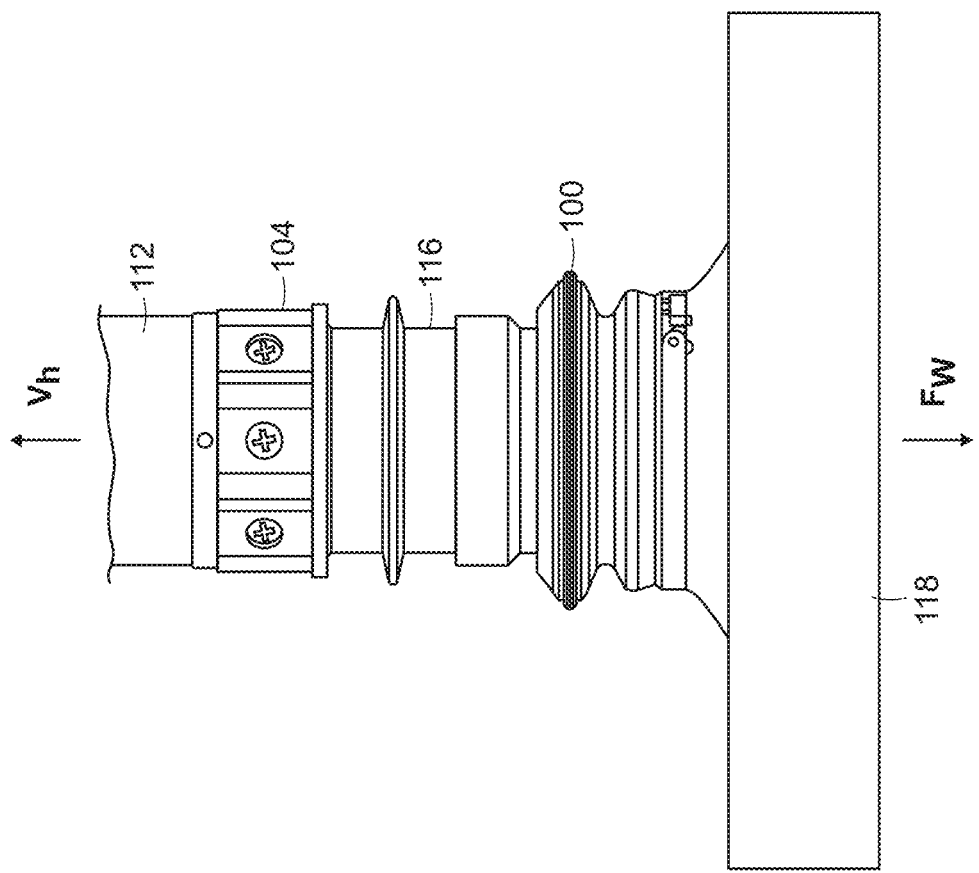
FIG. 12 shows an illustrative diagrammatic view of the end effector system of FIG. 9 with a vacuum engaging an object.

The coupling of the different vacuum cups to an end effector via the magnets also presents fewer limitations on the lifting dynamics. In particular, and with reference to FIGS. 10-13, the coupling unit 104 attached to the conduit 112 is drawn toward the ferromagnetic top 116 of the vacuum cup 100 by a magnetic field Fm as shown in FIG. 10. Because the object when lifted does not hang from the vacuum cup (but rather is drawn by the vacuum $V_h$), the strength of the magnetic field is not determined by the load of grasping and lifting. In particular, and with reference to FIGS. 11 and 12, the object is lifted by the force of the vacuum (e.g., a high flow vacuum) $V_h$, which as discussed above, flows through both the vacuum cup 100 and the conduit 112. It is the vacuum $V_h$ that is used to grasp an object 118 as shown in FIG. 12. Although the grasping is not directly reliant on the magnetic field $F_m$, the strength of the magnetic field $F_m$ may become a factor if the weight of the object 118 (or its effective movement force due to acceleration) is closely matched to the lifting force created by the vacuum force of $V_h$, to lift the object 118. This is due to atmospheric pressure both being applied to the object and being applied to the vacuum cup (and in particular to any radially outwardly extending flanges) while a vacuum exists within the cup. Adjusting the strength of the magnetic field may minimize this. Due to the flared shape of the vacuum cup as shown therefore, there is atmospheric pressure that acts to separate the cup from the end effector. Provided the magnetic force suffices to balance that atmospheric pressure, and the weight and dynamic load of the cup's inertia, then if the weight of the object is too great for the lifting force created by the vacuum force of $V_h$, then the object is simply not lifted. Adjusting the shape of the vacuum cup may also help minimize this, for example, by providing for parallel walled cups or cups that include radially inwardly sloping walls toward the object engagement surface.

In accordance with further embodiments of the invention, it may be desirable to design the vacuum cup such that any seal between the cup and an object will become compromised in the event that too large a weight is attempted to be lifted (protecting the magnetic coupling from being breached or protecting the articulated arm from overload). Such vacuum cups may, for example, permit some portions of the cup to open or otherwise break the seal between the cup and the object, thereby releasing the object from the vacuum cup.

In accordance with an embodiment, the present invention provides a linear dismount motion involving the use of an electromagnet or other actuator, which provides the motive force, allowing other mechanical elements in the effector or the holder to constrain the tool motion. A further embodiment is shown in FIG. 14 that employs a permanent magnet as an unpowered holding force, combined with an electromagnet which can overwhelm the permanent magnet's field and release the tool.

In particular, FIGS. 14, 15A and 15B show at 120 an embodiment of the present invention that includes an attachment portion of an end effector 122 that includes an electromagnet 124. The system 120 also includes a tool 126 that includes a permanent magnet 128. Since the magnets are positioned to have reverse polarity at their interface, when the electromagnet is energized, the tool 126 is held firmly against the effector 122 (as shown in FIG. 15A), and when the electromagnet is de-energized, the tool 126 is released from the effector 122 (as shown in FIG. 15B).

In further embodiments, the tool 126 may be held firmly against the effector 122 without the electromagnet being energized (by virtue of the metal in the electromagnet engaging the permanent magnet 128). Further, the releasing of the tool 126 may be accomplished by actively reversing the polarity of the electromagnet to push the permanent magnet 128 and the tool 126 away from the effector 122.

The use of a magnetic attachment between the tool and the end effector may be employed with a wide variety of tool exchange systems. Further, there are several possible mechanisms to produce the desired relative motions, such as mechanical constraint, magnetic fields, and various combinations. The best combination varies with the nature of the tool, the application, and the mechanism by which the tool is retained on the effector, whether it be magnetic, a bayonet mount, or some other type.

For example, the tool may include protrusions such as two sets of wheels for engaging a fixed exchange holder. FIG. 16 for example, shows an exchange system 130 that includes a holder 132 having a pair of slotted arms 134, and each slotted arm 134 includes a slot 136. Each slot includes a slot opening, and a deeper interior section 138 into which a tool may be dropped. In particular, a gripper assembly 140 that includes an effector 142 to which a tool 144 is attached, may include rollers (or wheels or guides) 146 on the tool 144. When the gripper assembly 140 is positioned above the section 138, the electromagnet releases (or pushes) the tool 144 away from the effector 142 as discussed above. The effector 142 then continues moving between the arms 134 and out of the exchange system 130.

Many schemes have been identified to arrange the desired motion of the tool relative to the effector. FIG. 17A-17D show a scheme in which the electromagnet is employed to drop a tool into, or retrieve a tool from, an exchange station.

In further embodiments, the tool motion may occur by being rigidly attached to a mobile part of the holder as discussed below.

Figure 17A:
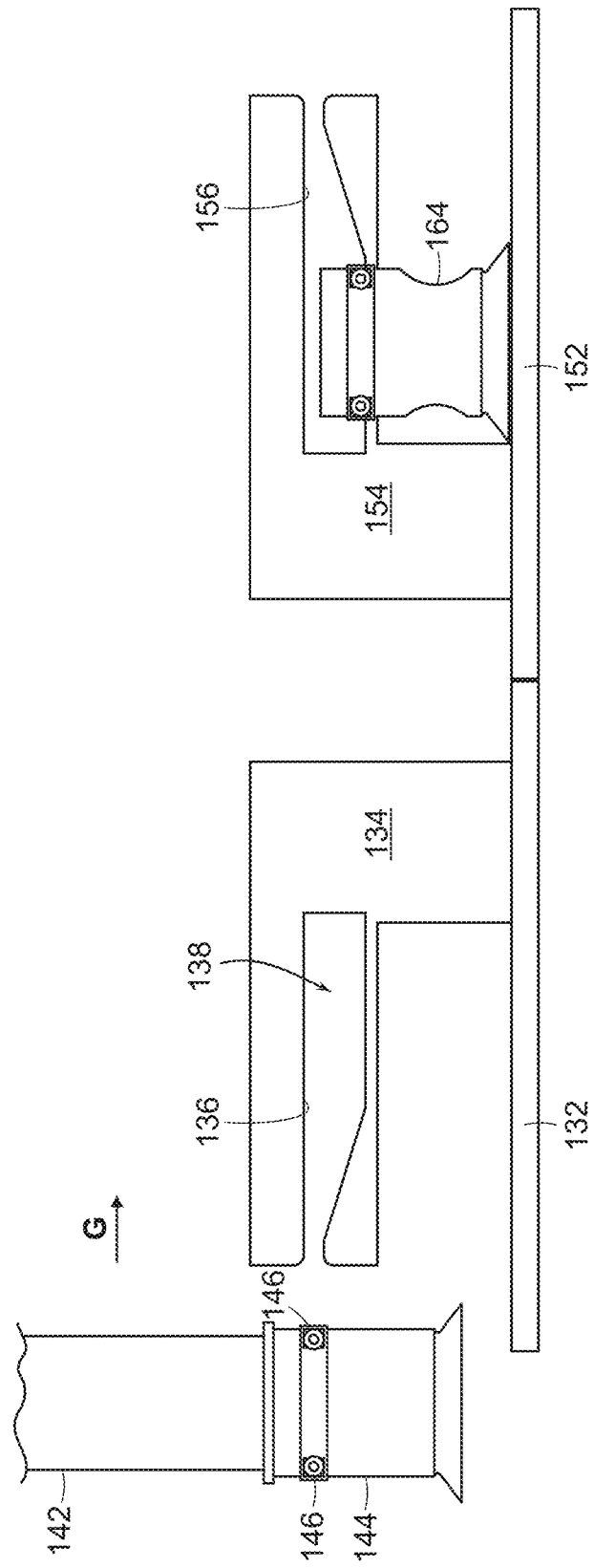
FIGS. 17A-17D show illustrative diagrammatic views of an end effector exchange system including multiple end effector tool exchange devices, wherein a first end effector tool is received by a first exchange device (FIG. 17A), the first end effector tool is disengaged from the end effector (FIG. 17B), the end effector then engages a second end effector tool (FIG. 17C), and the end effector is then coupled to the second end effector tool (FIG. 17D)
Figure 17B:
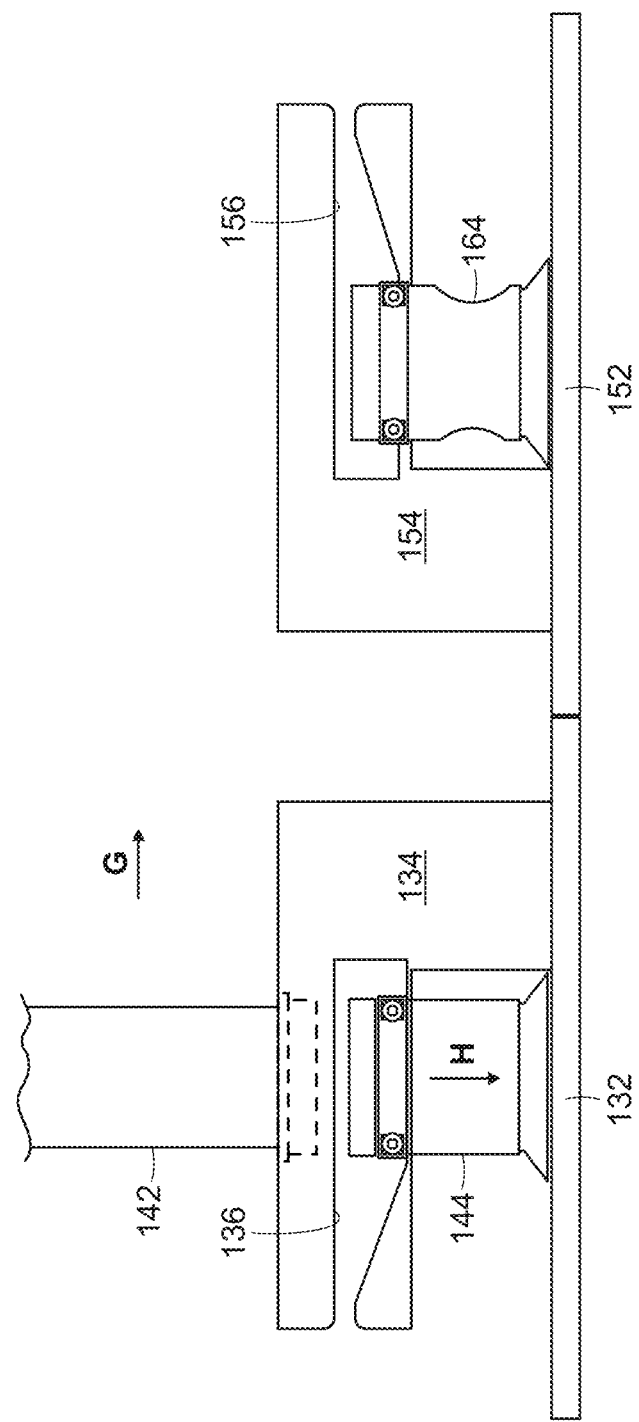

In particular, and as shown in FIGS. 17A-17D, an effector 142 of a gripper assembly moves together with a tool 144. The movement (as shown at G) may be linear, and may be discontinuous or (preferably) continuous. As shown in FIG. 17A, the programmable motion device is configured to move the gripper assembly toward the exchange system 130 such that the wheels 146 (or guides) are aligned to travel along the underside of the upper portion of the slot 136. When the effector 142 is above the deeper interior section 138 the electromagnet releases the tool 144 from the effector 142, and the tool 142 falls (as shown at H) such that the wheels (or guides) 146 catch on the lower portion of the slot 136 as shown in FIG. 17B. The tool 142 is thereby disengaged by the effector 142 yet is held in the disengaged state by the exchange station 132.

Figure 17C:
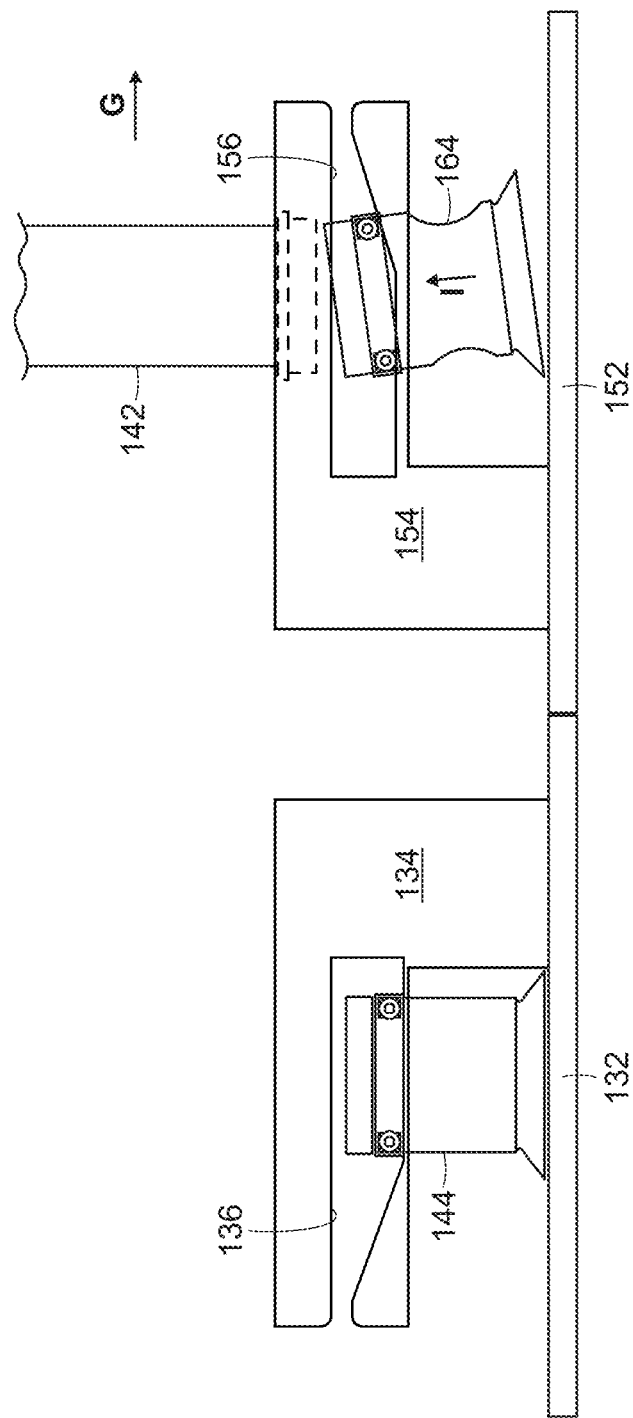
Figure 17D:
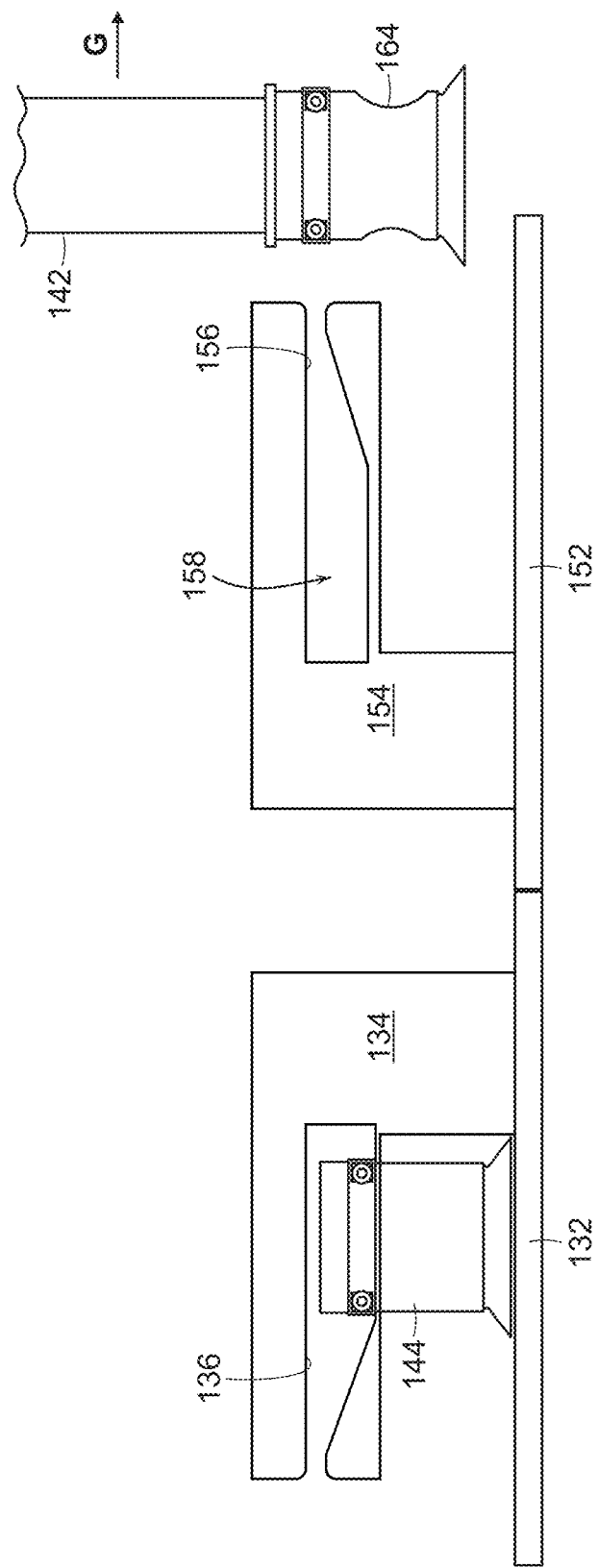

The effector 142 then continues to move in the direction as shown at G, and when the effector 142 is positioned above a new tool 164, the electromagnet is then again energized, and the tool 164 is drawn toward the effector 142 and drawn along the direction of travel G of the effector 142. In particular, since the underside of the slot 136 is ramped in the direction of travel G, the leading edge of the upper portion of the tool 144 becomes raised (as shown in FIG. 17C), and contacts the effector 142 at a leading edge thereof. The remaining portion of tool 144 then quickly engages with the effector 142 as shown at I. The tool 144 becomes attached to the effector 142 for grasping purposes as discussed above as shown in FIG. 17D.

Figure 18:
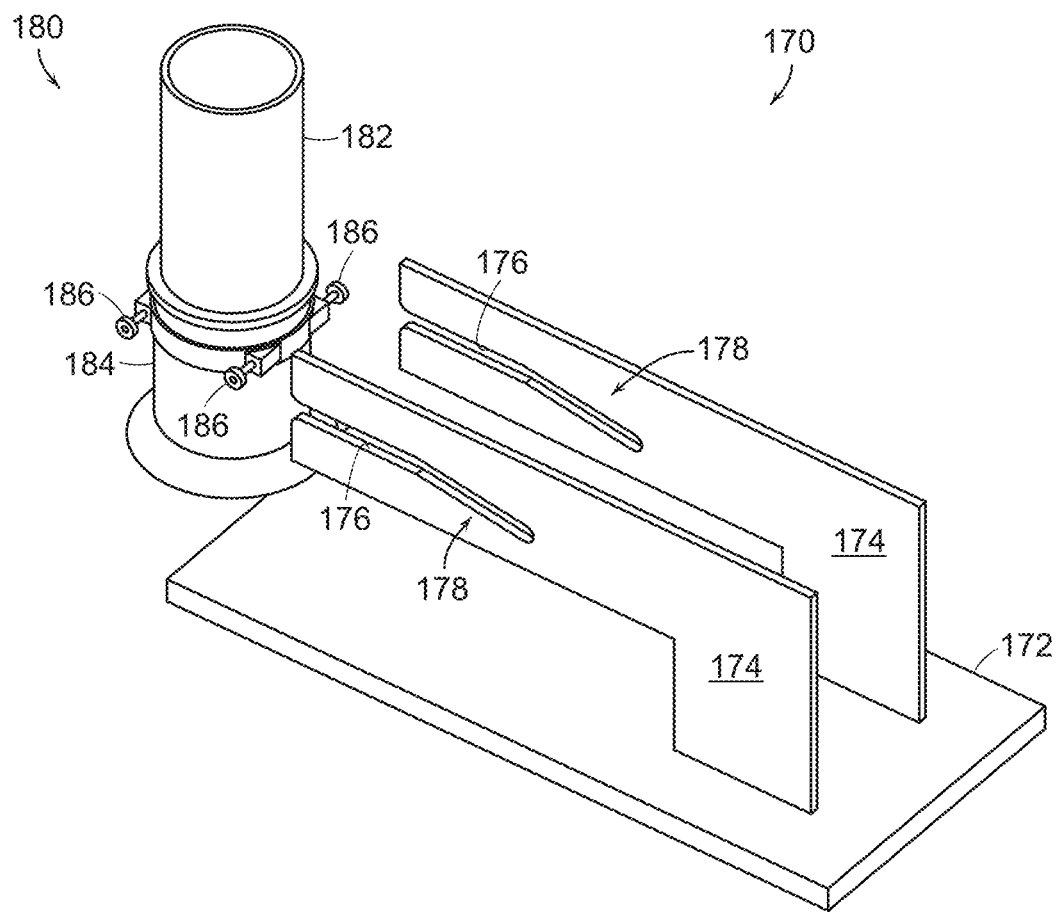
FIG. 18 shows an illustrative diagrammatic view of an end effector exchange device in accordance with another embodiment of the present invention involving sets of engagement wheels.

FIG. 18 show another system 170 in accordance with another embodiment of the invention. The system 170 includes an exchange device 172 that includes a pair of slotted arms 174, each including an elongated slot 176, one section of which 178 is curved downward. A gripper assembly 180 that includes an effector 182 to which a tool 184 is attached, include rollers (or wheels or guides) 186 on the tool 184. When the gripper assembly 180 moves the tool 184 through the exchange device 172 in a direction as shown at J, the rollers 186 enter and are guided by the slot 176. When the rollers 186 are guided through the curved section 178, the tool 184 is pulled off of the effector 182. The effector 182 then continues moving between the arms 174 and out of the exchange system 170.

Again, the tool has two pairs of guide wheels that engage a curving slot on the holder. The holder is fixed. As the effector moves through the holder, the curving slot forces the tool to tilt downward, releasing it from the effector. The motion to mount the tool would be the reverse. Additional mechanisms may be provided to ensure that the tool completes its travel and releases cleanly from the effector. This embodiment is shown in further detail in FIGS. 19A-19D. In this scheme, the tool's separation is forced by contact with the holder, but the holder is immobile.

Figure 19A:
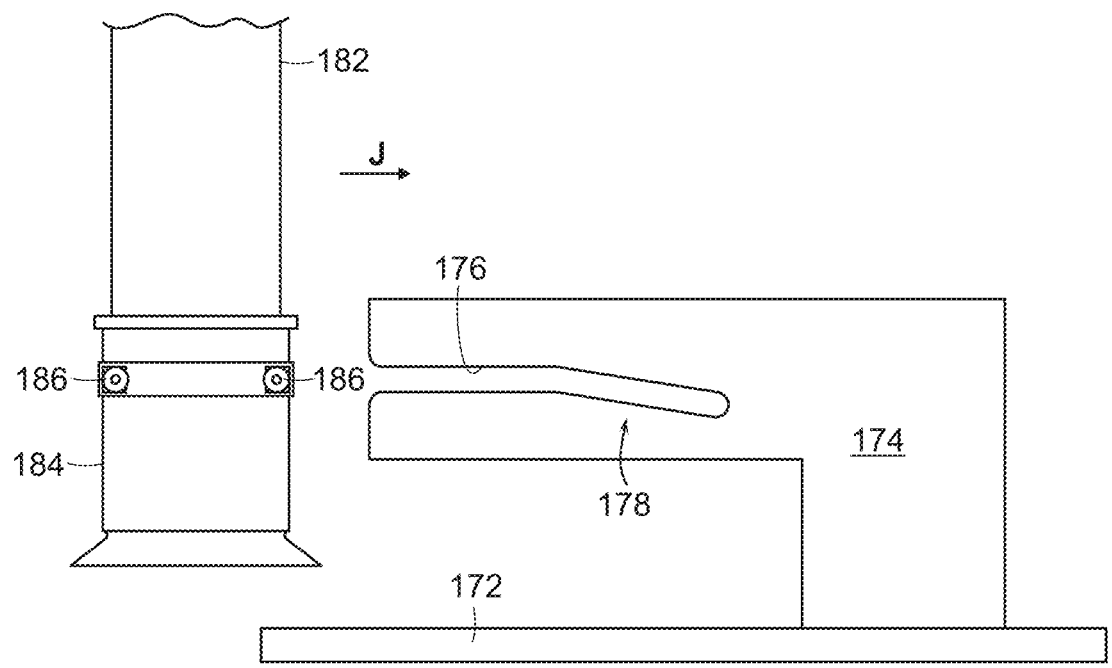
FIGS. 19A-19D show illustrative diagrammatic views of an end effector exchange system including multiple end effector exchange devices in accordance with another embodiment of the present invention, wherein a first end effector tool approaches a first exchange device (FIG. 19A), the first end effector tool is engaged by the exchange system (FIG. 19B), the end effector tool disengages from the end effector (FIG. 19C), and the end effector tool becomes fully disengaged from the end effector (FIG. 19D)
Figure 19B:
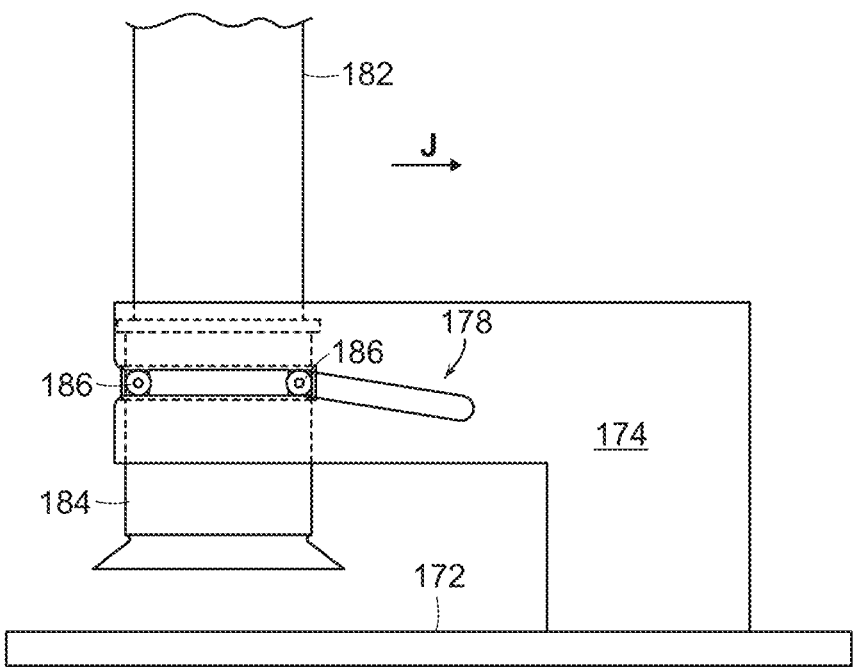
Figure 19C:
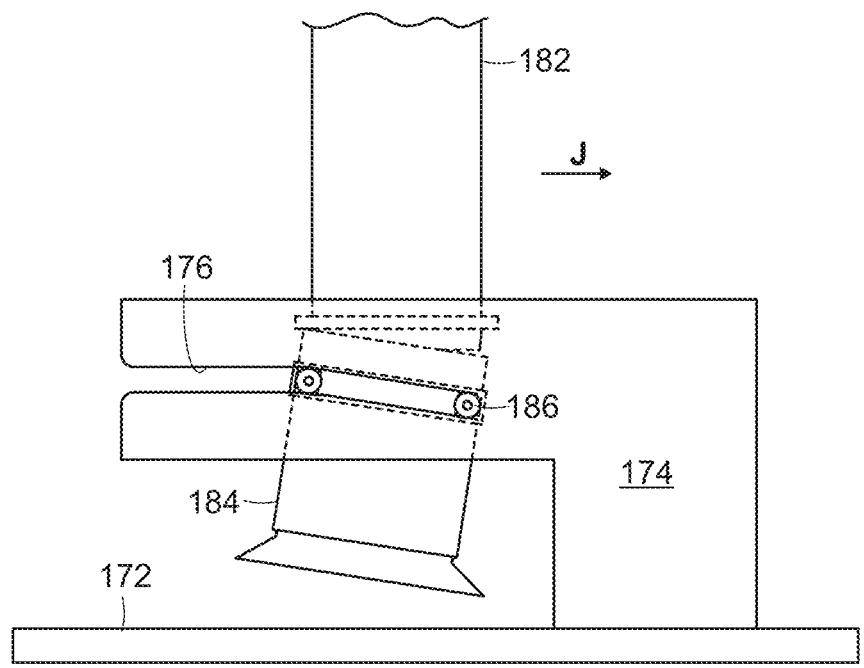
Figure 19D:
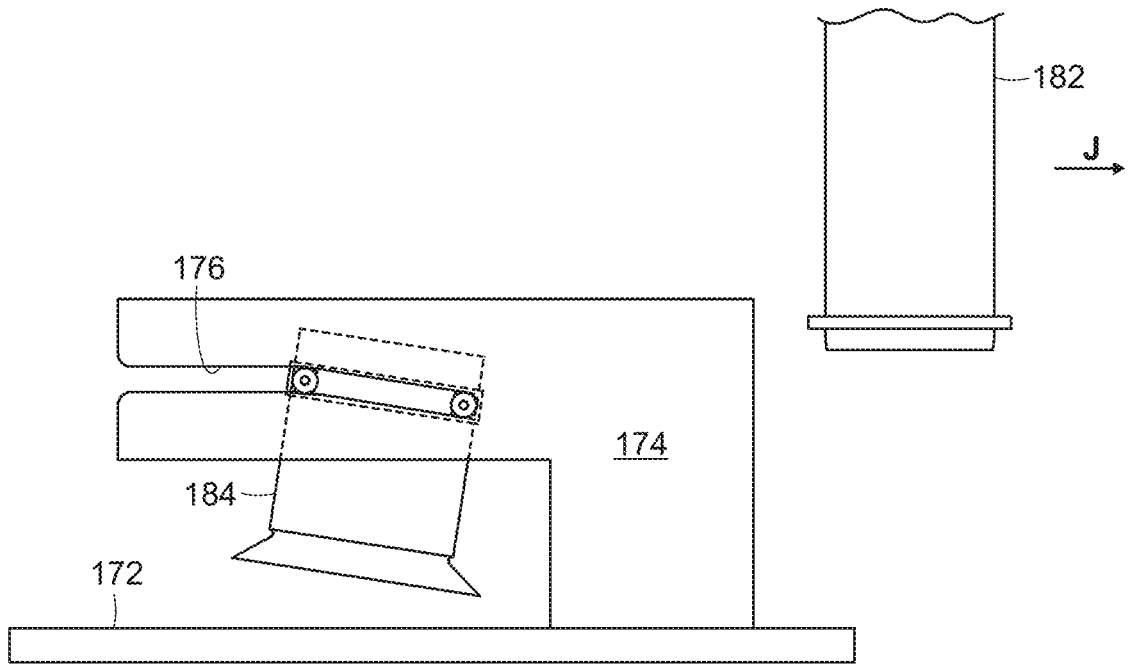

In particular, FIG. 19A shows the gripper assembly moving toward the exchange device 172 in the direction J such that the wheels 186 align with the slots 176 of the slotted arms 174 of the exchange device 172. FIG. 19B shows the gripper assembly wheels 186 entering into the slot 176. As shown in FIG. 19C, when the wheels 186 are pulled downward by the curved section 178, the tool 184 is pulled away from the effector 182. As shown in FIG. 19D, the effector 182 continues to move in the direction J, and is thereafter free of the tool 184, which remains with the exchange device 172.

While certain tool and effector attachments may be provided by mechanical coupling (as discussed below with reference to FIGS. 25A-30D), in the case of a magnetic coupling, the holder applies a magnetic field that pulls the tool off of the effector which remains in a fixture just below the effector, as the effector moves on. The mounting operation uses a reverse motion and the magnetic field is used to pull the tool and/or effector toward one another. The magnetic field is produced by a combination of permanent magnets and electromagnets, any of which may be mounted on the tool, the effector, or the holder, as in the embodiment shown in FIG. 14. A magnetic shunt may also be used in combination with a permanent magnet.

Figure 20B:
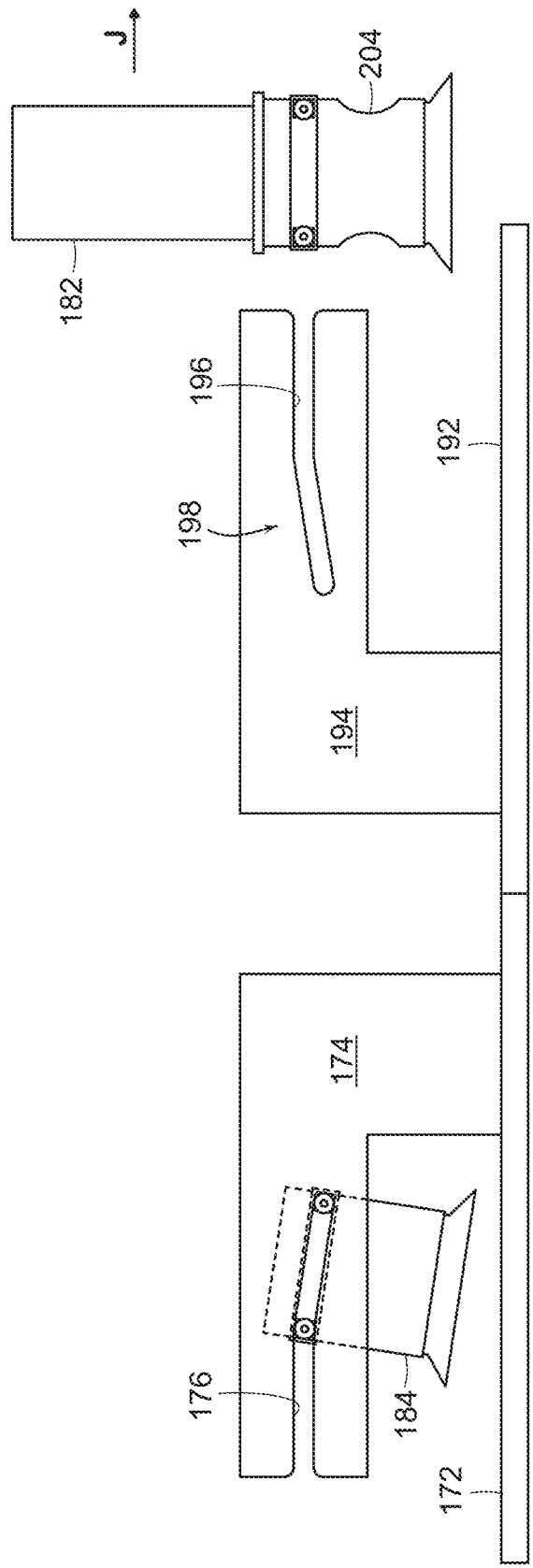

The mounting of a tool onto an effector may be achieved by moving the effector in the reverse direction. In particular, and with reference to FIGS. 20A and 20B, the gripper assembly 180 moves in the direction as indicated at J, and as the gripper assembly moves through the exchange device 172, the tool 184 is removed from the effector 182 (as shown in FIG. 20A), and remains with the exchange device 172 (as shown in FIG. 20B) as discussed above. As also shown in FIG. 20A, another exchange system 190 including another exchange device 192 may be positioned adjacent the exchange device 172 such that the effector 182 will move toward another tool 204 that is positioned within slots 196 of slotted arms 194 of the exchange device 192. With reference to FIG. 20B, when the effector 182 moves over the tool 204, the tool 204 is drawn to the effector 204 (due to any of the magnetic attachment processes discussed above where magnetic coupling is employed). While the motion of the effector 182 is continuous in some embodiments, it need not be linear in further embodiments.

Figure 21:
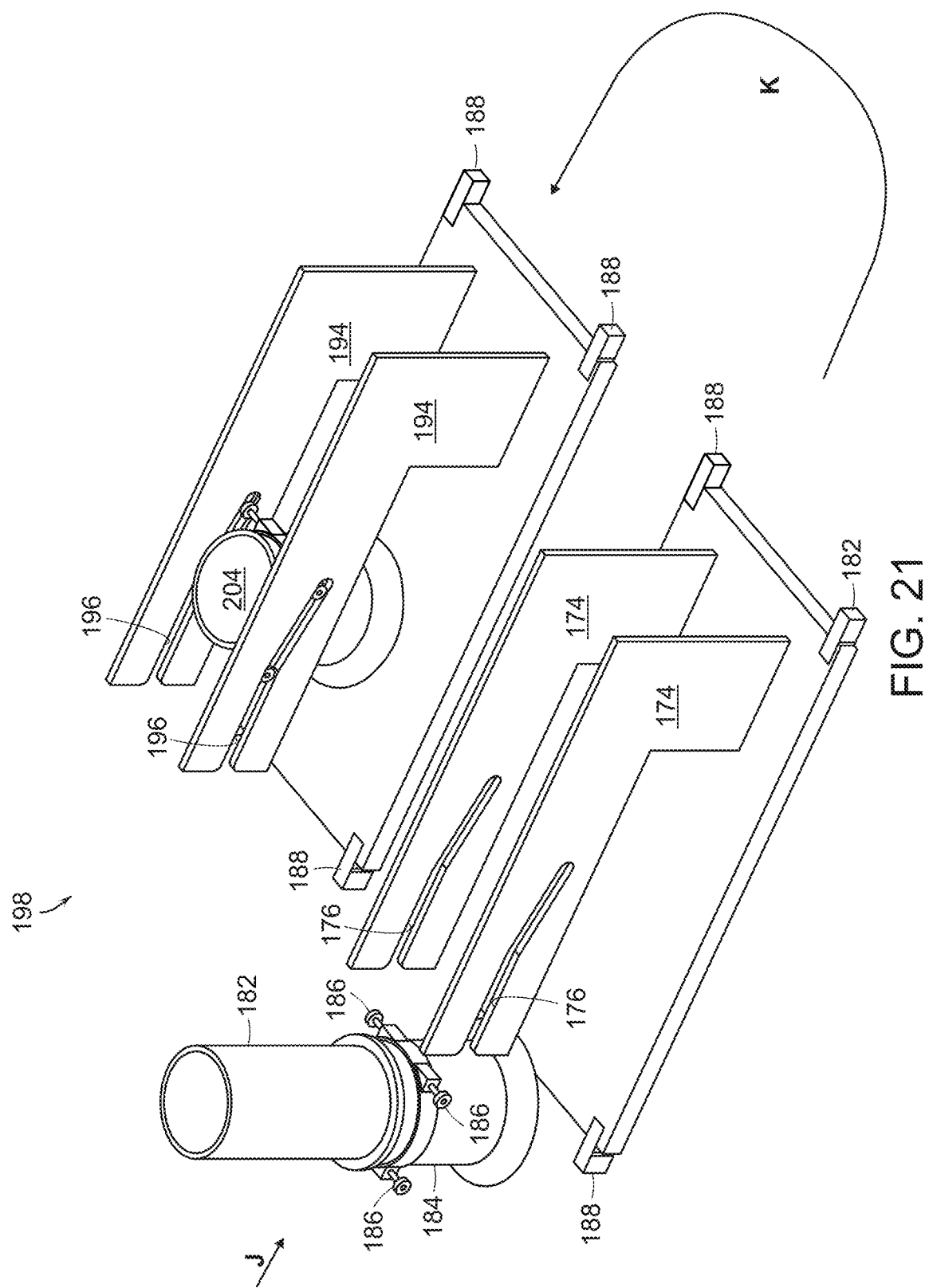
FIG. 21 shows an illustrative diagrammatic view of an end effector exchange device in accordance with another embodiment of the present invention that involves non-linear motion of the end effector.

For example FIG. 21 shows a system 198 in which the gripper assembly 180 moves in the direction as indicated at J, and as the gripper assembly moves through the exchange device 172, the tool 184 is removed from the effector 182 (as shown in FIG. 20A), and remains with the exchange device 172 as discussed above. In the system 198, however, the effector 182 may reverse directions (without stopping) as shown at K, and be directed toward the exchange device 192. As the effector 182 then travels through the exchange device 192 (as discussed above) in a direction as indicated at L, the effector 182 will engage and become attached to the tool 204 (as discussed above).

The use of the separate units 132, 152, 172, 192 permits different tools (and units) to be assembled adjacent one another dynamically during processing. This permits new tools (and units) to be made available by a human, such that the programmable motion system may be able to select a newly made available unit. The units may also be releasably securable in their respective locations, e.g., by locks 188, which may be used in any of the above and below disclosed systems. Systems may also be employed to track and identify which units (and tools) are located in which of a variety of exchanging locations.

In sum, the embodiments discussed herein illustrate several schemes: the first scheme, where the holder is fixed, but still engages the tool mechanically, the second scheme, where the tool is forced from the effector by a magnetic field, and the third scheme (discussed below), where a mobile element of the holder engages the tool mechanically. Combinations of these schemes are also possible. For example, a magnetic field might be employed to facilitate or actuate the motions of scheme one or scheme two, and exchange devices may employ any combination of tool loading and unloading schemes. The effectiveness of systems of the invention depend, in part, on how the holders are combined into a rack, and how the rack is placed in the workspace, to minimize the delays associated with changing tools.

FIGS. 22A-22D show a pair of tool holders arranged in series and mounted on a single exchange device, to dismount one tool and mount another, all in one motion. The effector 212 arrives with tool 214 mounted thereon and leaves with tool 224 mounted thereon. In particular, the system 200 involves the gripper assembly 210 moving in the direction as indicated at M as shown in FIG. 22A, and as the gripper assembly moves through the exchange device 202, the tool 214 is removed from the effector 212 (as shown in FIG. 22B), and remains with the exchange device 202 (as shown in FIG. 22C) as discussed above. As further shown in FIG. 22D, another part of the exchange device 202 includes another tool 224 in a curved portion 208 of a slot 206 suspended by wheels 226 such that as the effector 212 moves toward the tool 224 that is positioned within slots 206 of slotted arms 204 (as shown in FIG. 22C), the effector 212 engages and picks up the tool 224 (as shown in FIG. 22D). The attachment to the effector 212 is due to any of the magnetic attachment processes discussed above, or by mechanical attachment processes discussed below. This serial pair arrangement (as well as the previously discussed systems with respect to FIGS. 17A-17D, 20A and 20B) provides the function illustrated in FIGS. 3A and 3B. In many cases this would be an ideal arrangement, requiring no reversals of motion by the effector.

FIGS. 23A-23D show system 230 that involves a gripper assembly 240 moving in the direction as indicated at M as shown in FIG. 23A, and as the gripper assembly moves through the exchange device 232, the tool 214 is removed from the effector 242 (as shown in FIG. 22B), and remains with the exchange device 232 (as shown in FIG. 22C) as discussed above. As further shown in FIG. 23D, another part of the exchange device 232 includes another tool 254 in a curved portion 238 of a slot 236 suspended by wheels 256 such that as the effector 242 moves toward the tool 254 that is positioned within slots 236 of slotted arms 234 (as shown in FIG. 23C), the effector 242 engages and picks up the tool 254 (as shown in FIG. 23D). The attachment to the effector 242 is due to any of the magnetic attachment processes discussed above, or by mechanical attachment processes discussed below. This serial pair arrangement (as well as the previously discussed systems with respect to FIGS. 17A-17D, 20A, 20B and 22A-22D) provides the function illustrated in FIGS. 3A and 3B.

Again, in certain applications, the effector might need to return to its original pose after a tool change, so that a reversal of motion is required anyway. In that case, the two holders can be mounted in parallel, with the reversal occurring between the dismount and the mount, as shown in FIG. 21. A similar arrangement could be mounted vertically, where for some applications it might better suit workspace constraints and preferred motions of the programmable motion device.

The zero-reversal embodiments discussed above are well suited to a task where successive tool changes occur in opposite directions, which might be described as a reciprocal task motion. For example, if the robot moves between work area A and work area B, requiring tool A for work area A, and tool B for work area B, then the rack could be placed between the two work areas, and every tool change would be a straight motion.

In other applications, however, one may wish to have every tool change occur in the same direction, e.g., always when passing from work area A to work area B. Certain of the embodiments discussed above may not support that. Half of the tool changes would require a pair of reversals in order for the effector to fly through the rack in the correct direction. In certain applications, the exchange devices 202 of FIGS. 22A-22D and 232 of FIGS. 23A-23D, may be configured to rotate about their center along a vertical axis. In other applications, the tool itself may be moved from one side of the exchange device to another.

For example, FIGS. 24A and 24B show an embodiment that allows all tool change motions to occur in the same direction. It is similar to the serial pair of holders discussed above, except that after the tool exchange process has completed, the held tool is advanced from the back holder to the front holder. FIG. 24A shows a possible advancing mechanism, that involves a linkage mechanism 250. In particular, the linkage mechanism 250 includes an L-shaped bar 252 that is coupled to a pair of rotating linkage members 254 that move the L-shaped bar 252 against the wheels 246 of the tool 244 to move the tool 244 from a front curved portion of the exchange device 232 to a rear curved portion of the exchange device 232.

Figure 25A:
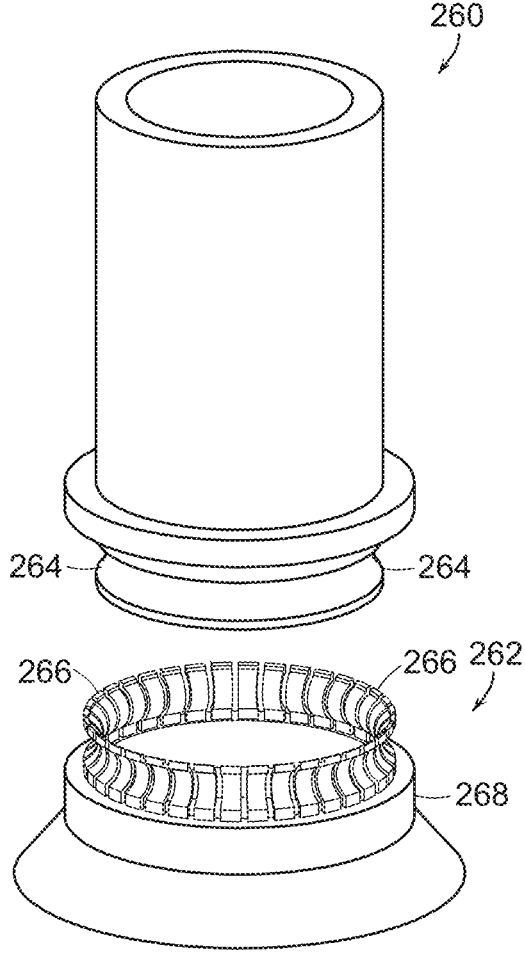
FIG. 25A shows an illustrative diagrammatic view of an end effector that includes a non-magnetic coupling for attaching to an end effector tool.
Figure 25B:
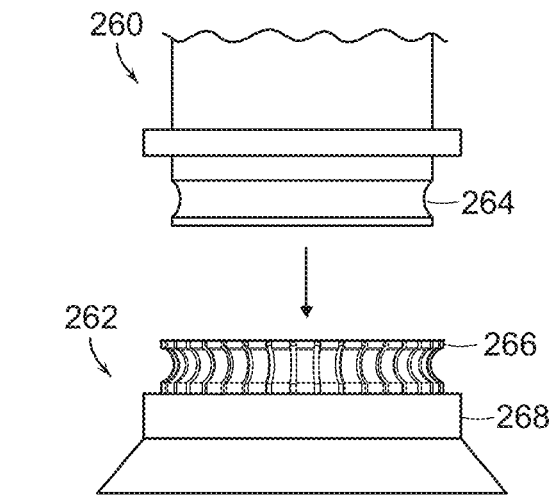
FIG. 25B shows an illustrative diagrammatic side view of the end effector of FIG. 25A.
Figure 25C:
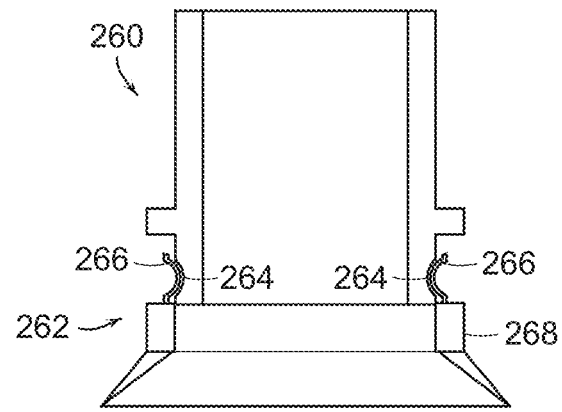
FIG. 25C shows an illustrative diagrammatic side sectional view of the end effector of FIGS. 25A and 25B coupled to the end effector tool.
Figure 26A:
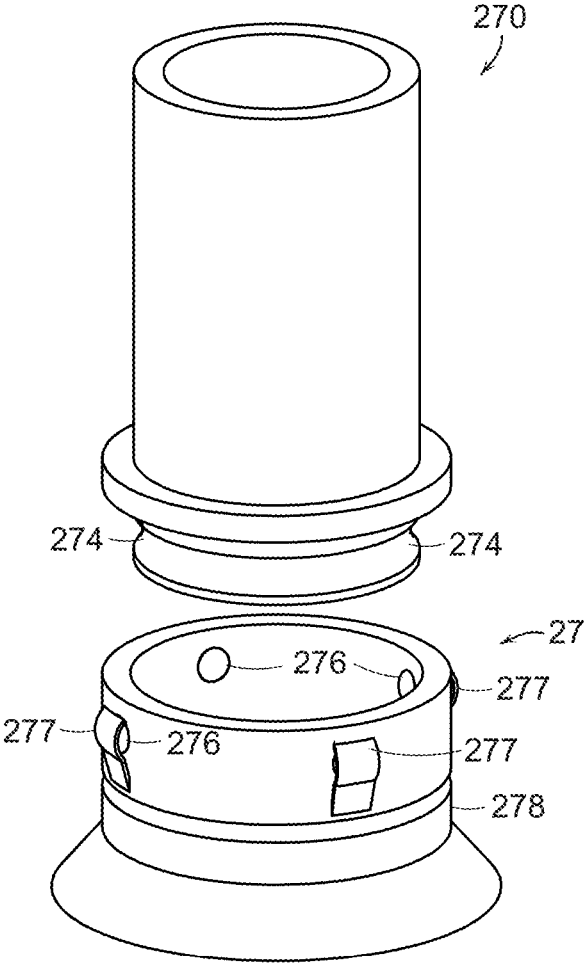
FIG. 26A shows an illustrative diagrammatic view of an end effector that includes a non-magnetic coupling that includes balls in sockets for attaching to an end effector tool.
Figure 26B:
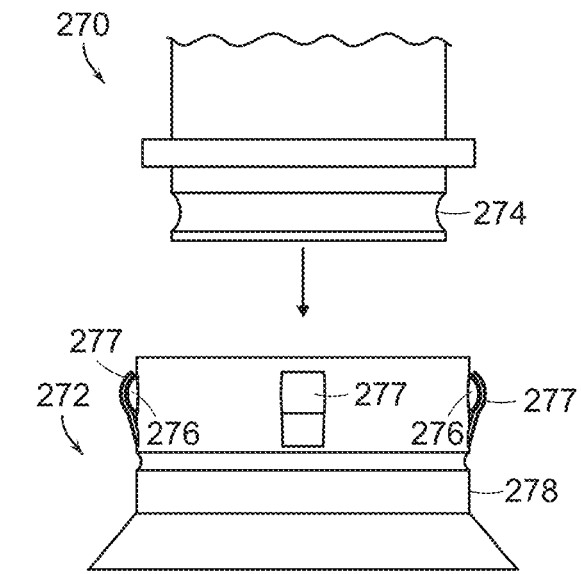
FIG. 26B shows an illustrative diagrammatic side view of the end effector of FIG. 26A.
Figure 26C:
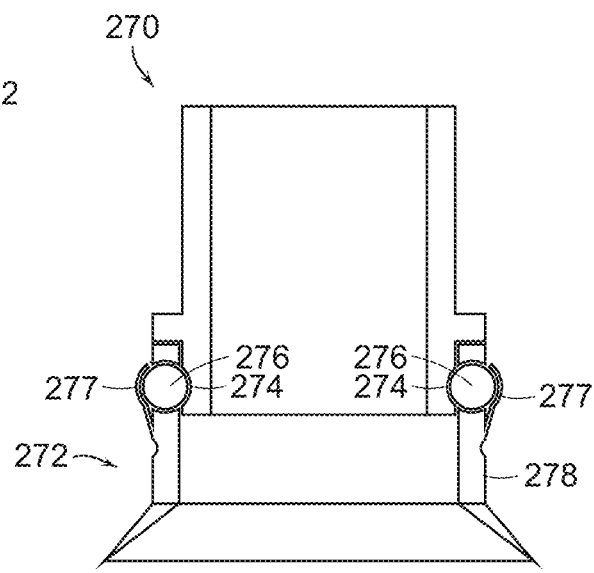
FIG. 26C shows an illustrative diagrammatic side sectional view of the end effector of FIGS. 26A and 26B coupled to the end effector tool.

Systems in accordance with various embodiments of the present invention may include magnetic coupling of the tool to the end effector as discussed above and below, or mechanical coupling of the tool to the end effector. FIGS. 25A-25C and 26A-26C, and 27A-27C, for example, show three different embodiments of the present invention that employ mechanical coupling. FIGS. 25A, 26A and 27A show isometric views of the parts de-coupled, FIGS. 25B, 26B and 27B show side views of the parts de-coupled, and FIGS. 25C, 26C and 27C show side sectional views of the parts coupled.

FIGS. 25A-25B show an embodiment that uses retaining clips that engage a curved surface. In particular, an effector 260 may include an inwardly curved surface 264 that may engage a plurality of curved retaining clips 266 on a tool 262. The tool 262 may also have a mounting surface 268 on which a capture mechanism may be attached as discussed further below. In accordance with further embodiments, the effector 260 may include retaining clips, and the tool 262 may include a curved surface against which the retaining clips may become engaged.

FIGS. 26A-26C show an embodiment that uses spring-biased balls that engage a curved surface. In particular, an effector 270 may include an inwardly curved surface 274 that may engage a plurality of position biased balls 276 (e.g., biased by springs 277) on a tool 272. The tool 272 may also have a mounting surface 278 on which a capture mechanism may be attached as discussed further below. In accordance with further embodiments, the effector 270 may include position biased balls, and the tool 272 may include a curved surface against which the position biased balls may become engaged.

FIGS. 27A-27C show an embodiment that uses a friction fit between an effector 260 and a tool 262. In particular, an effector 280 may include an inner wall 284 that is designed to engage a flexible seal 286 on a tool 282. In particular, the inner wall 284 may have a diameter that is slightly smaller than an outer diameter of the flexible seal 286. The effector 280 and the collar portion 287 of the tool 282 may be formed of a rigid material such as metal, and the seal 286 may be formed of a flexible material such as a plastic that is just flexible enough to conform to the inner wall 284 and form the seal. The tool 282 may also have a mounting surface 288 on which a capture mechanism may be attached as discussed further below. In accordance with further embodiments, the effector 280 may include a flexible seal, and the tool 282 may include an inner surface against which the seal may become engaged.

Figure 28:
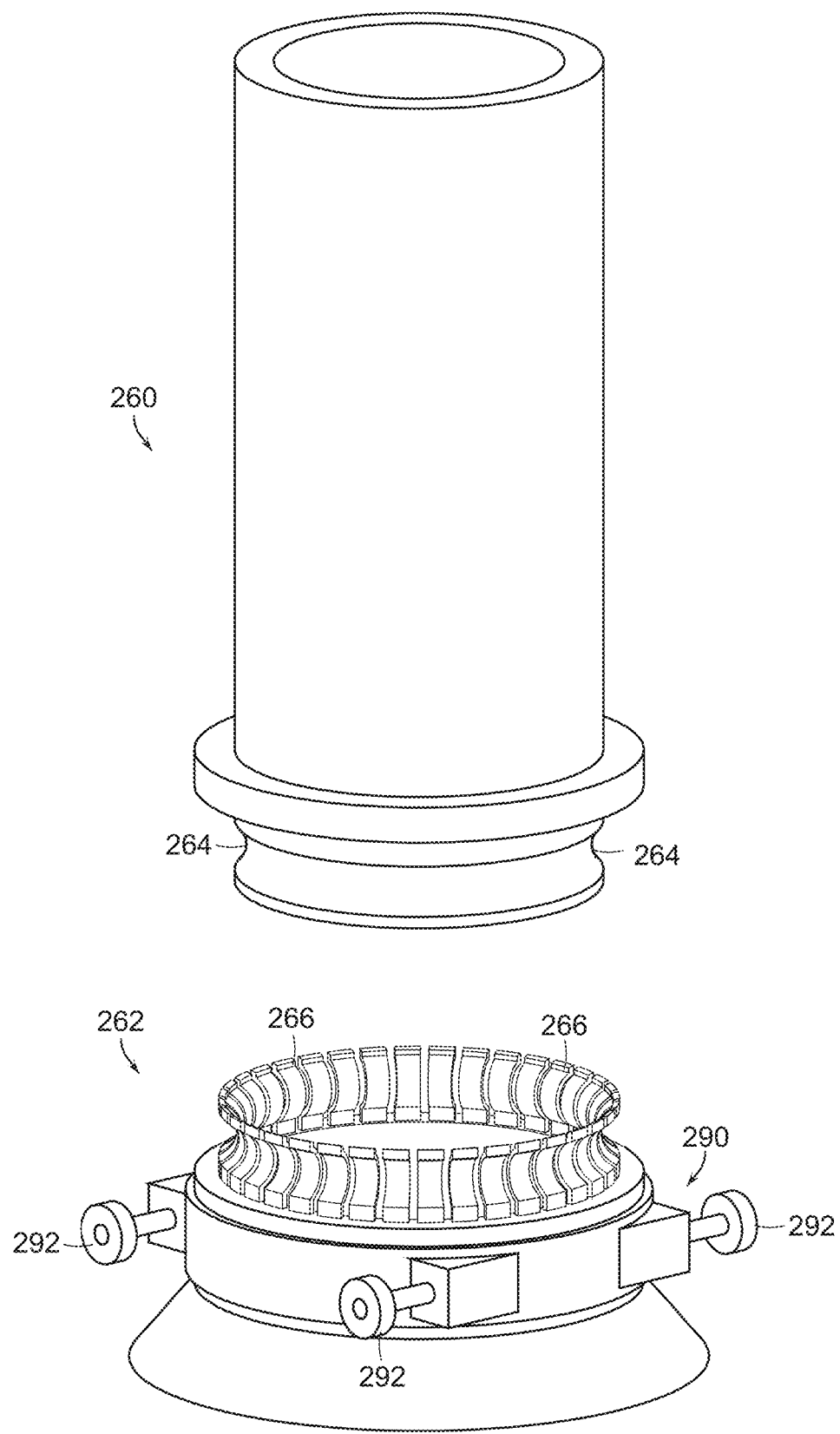
FIG. 28 shows an illustrative diagrammatic view of an end effector system that includes an attachment mechanism connected to the end effector tool.

FIG. 28 shows the effector 260 and tool 262 of FIGS. 25A-25C with an attachment mechanism 290 attached to the tool 262. The attachment mechanism 290 includes a plurality of (e.g., four) rollers 292 that are freely rotatable on axles. The attachment mechanism may be attached to any of the mounting surfaces 268, 278, 288 of the tools 262, 272, 282; the attachment mechanism is shown in FIGS. 28-30D for illustrative purposes.

Figure 29A:
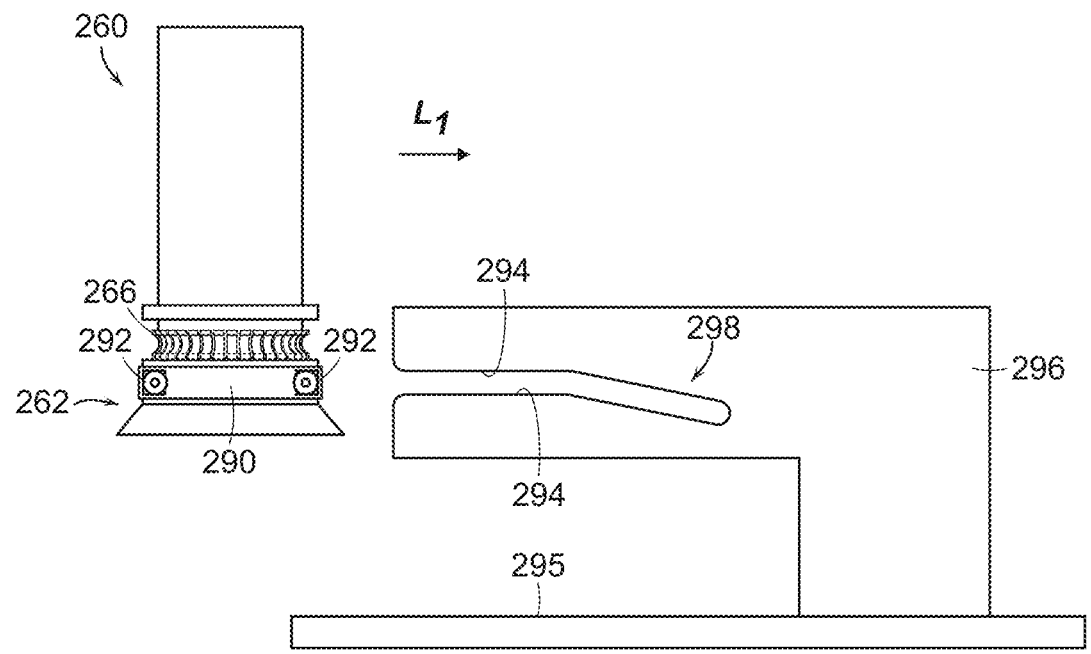
FIGS. 29A-29D show illustrative diagrammatic side views of the end effector and tool of FIG. 28 approaching (FIG. 29A) an end effector tool exchange system and entering (FIG. 29B) the end effector tool exchange system, disengaging the end effector tool (FIG. 29C), and leaving the end effector tool with the end effector tool exchange system (FIG. 29D)
Figure 29B:
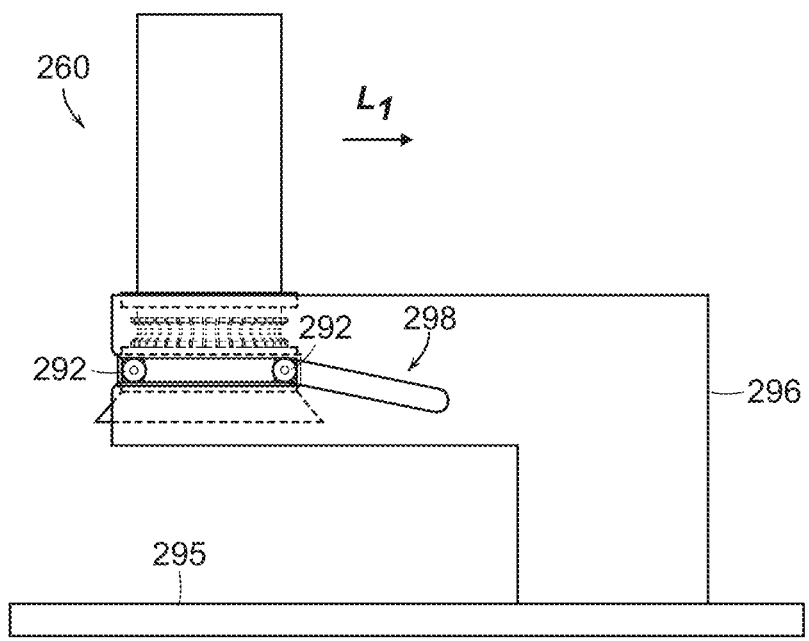
Figure 29C:
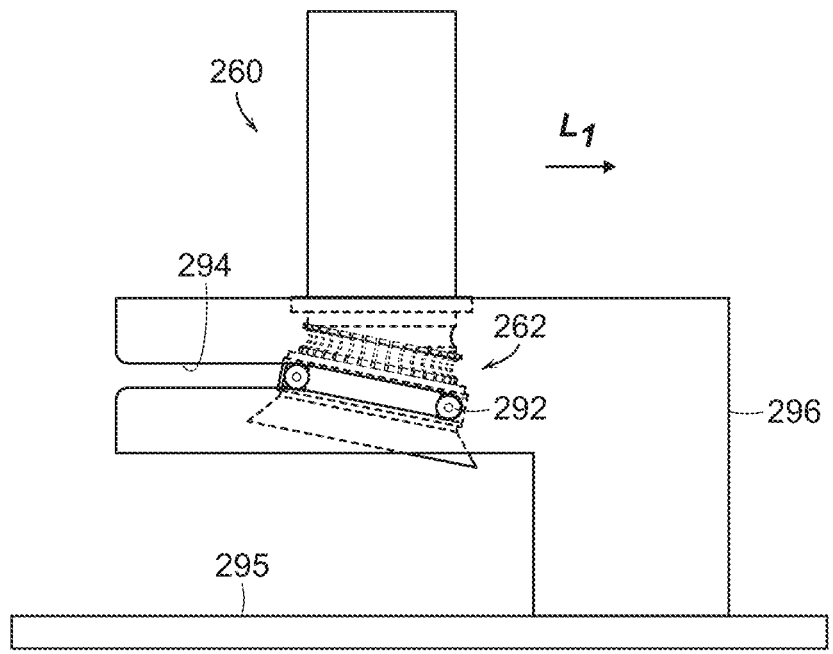
Figure 29D:
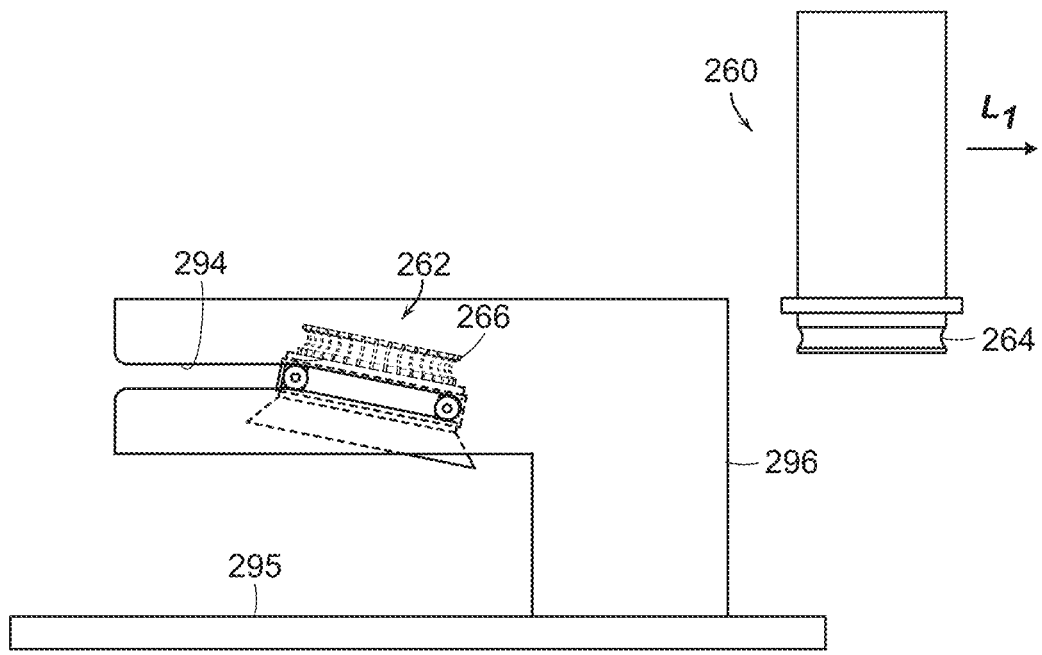

FIGS. 29A-29D show the effector 260 disengaging with the tool 262. In particular, FIG. 29A shows the effector 260 with the attached tool 262 approaching an exchange device 295 similar to the exchange devices of FIG. 21, wherein the exchange device includes a pair of slotted arms 296, each including slots 294 having downwardly sloping portions 298 (one such arm is shown in FIGS. 29A-29D). The effector 260 moves in a direction as indicated at $L_1$ (FIG. 29A), and the rollers 292 on the attachment mechanism 290 become engaged in the slot 294 of the slotted arms 296 (FIG. 29B). The effector 260 continues to move in the linear direction $L_1$, and the tool 262 becomes disengaged from the effector 260 as the tool enters the downwardly sloping portion 298 (FIG. 29C). The effector 260 still continues to move in the linear direction $L_1$ and the tool 262 remains within the portion 298 of the slots 294 (FIG. 29D).

Figure 30A:
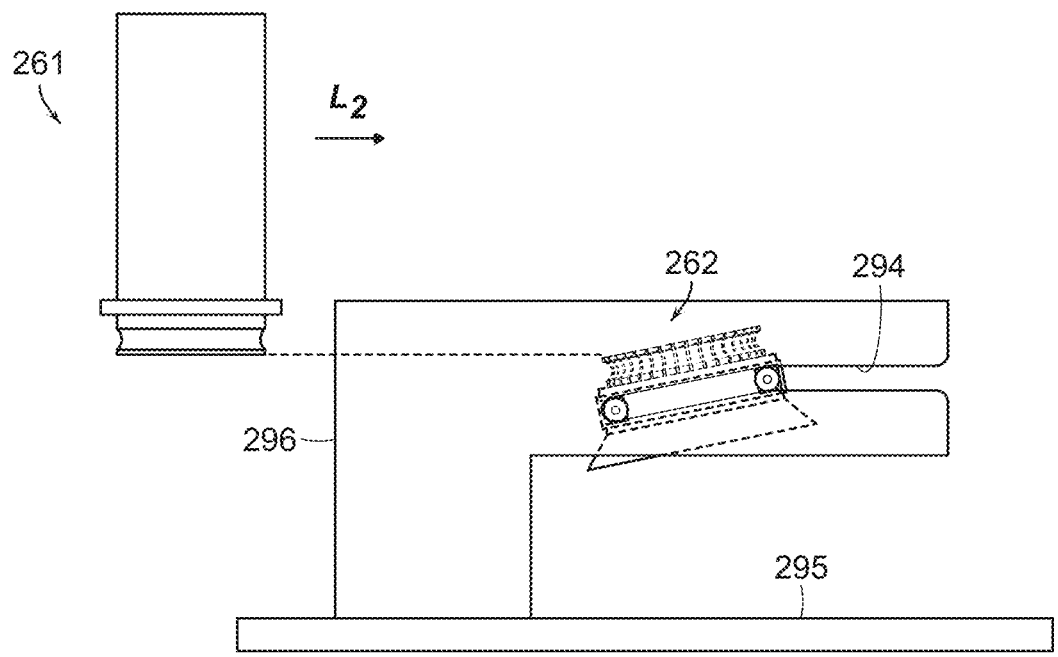
FIGS. 30A-30D show illustrative diagrammatic side views of the end effector of FIG. 28 approaching (FIG. 30A) an end effector tool exchange system and engaging (FIG. 30B) an end effector tool, coupling to the end effector tool (FIG. 30C), and leaving the effector tool exchange system with the end effector tool (FIG. 30D)
Figure 30B:
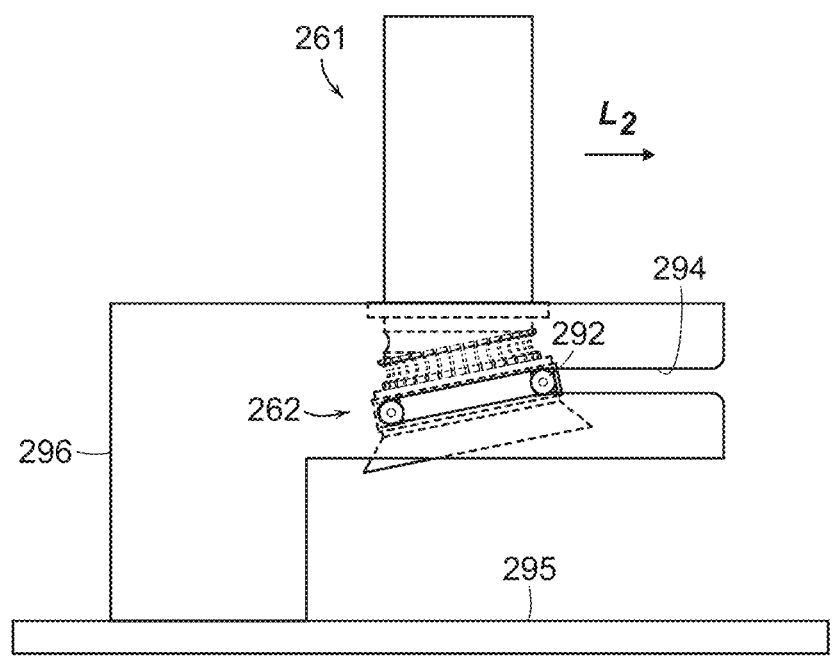
Figure 30C:
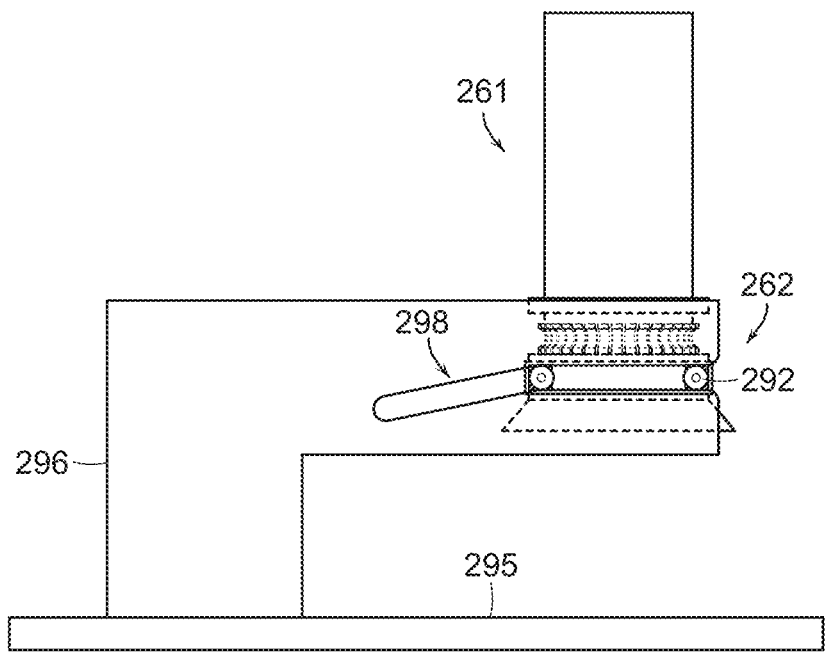
Figure 30D:
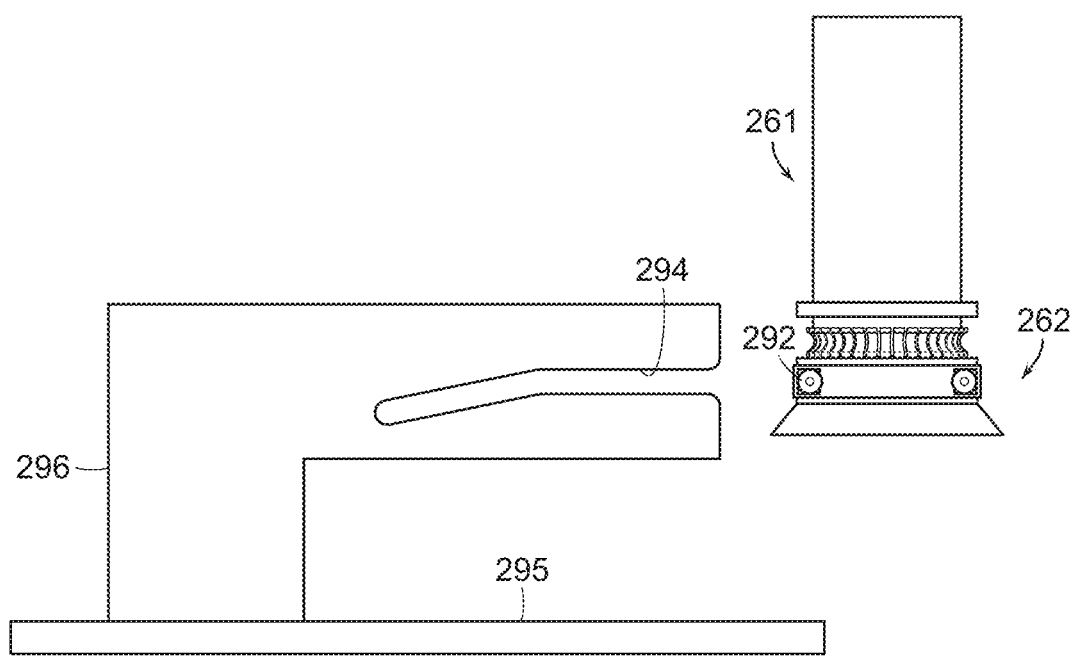

The process of attaching a different effector 261 to the tool 262 (or attaching the effector 260 to a different tool) may generally be provided by reversing the direction. In particular, FIG. 30A shows the effector 261 approaching the exchange device 296 in a linear direction as indicated at $L_2$. The exchange device 295 may either be turned around (from FIGS. 29A-29D), or the direction $L_2$ may be opposite the direction $L_1$. The effector 261 then engages the tool 262 (FIG. 30B), and continues to move in the direction $L_2$ while becoming attached to the tool 262 (FIG. 30C). The effector 261 then leaves the exchange device 296 with the tool 262 attached to the effector 261, while still moving in the direction $L_2$ (FIG. 30D). The effector may therefore engage a tool while continuously moving in a linear direction, and may disengage a tool while continuously moving in a linear direction.

Figure 32:
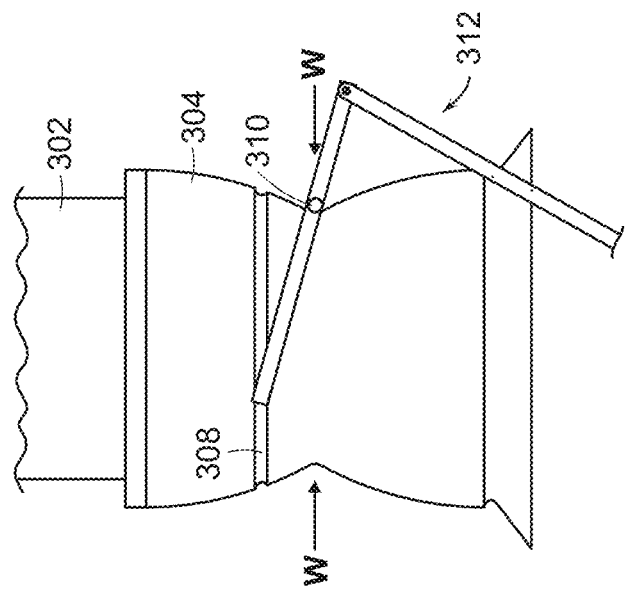
FIG. 32 shows an illustrative diagrammatic side view of the end effector system of FIG. 31.
Figure 31:
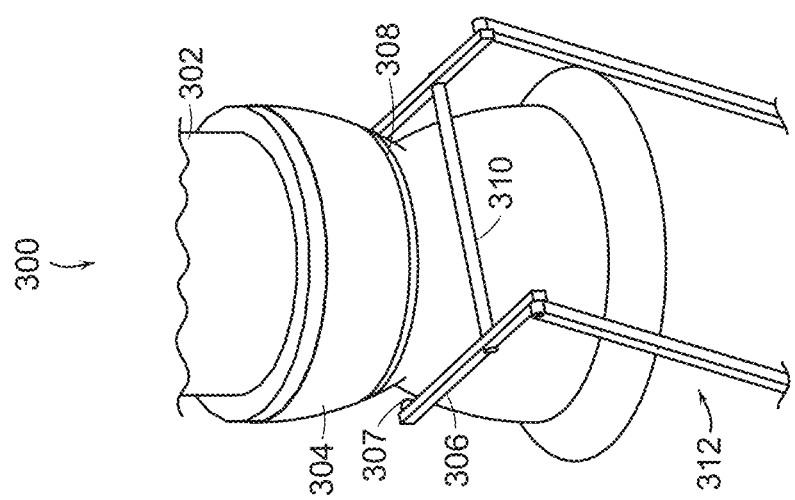
FIG. 31 shows an illustrative diagrammatic view of an end effector system in accordance with a further embodiment of the present invention engaging a bracket.

An important component of certain embodiments of the invention is the mechanism of the holder that engages the tool and mounts or dismounts the tool. A further embodiment shown in FIGS. 31-34E uses a tool 304 with a waist (shown at W) that engages a bracket 312 that is part of the holder. FIG. 31 shows the tool 304 and bracket 312 in an oblique view. FIG. 32 shows the tool 304 and bracket 312 in a side view. The tool 304 is a vacuum cup mounted on a cylindrical body, with a waist 308 circling the cylinder. The tool 304 has a detent groove 308 that engages detent balls 307 on the bracket 312. In FIG. 31, the bracket 312 is horizontal, as if the detent balls 307 are about to engaged the groove 308. In FIG. 32, the bracket 312 has tilted and the detent balls 307 have settled into the detent groove 308. The bracket 312 includes arm portions 306 on which the detent balls 307 are provided, as well as a bracket roller 310, which engages the waist W as the tool moves toward the bracket 312.

During the tool-dismounting process, the bracket's motion is constrained to force the phases, as shown in FIGS. 33A-33E. First, the tool 304 slides into the bracket (as shown in FIG. 33A), with small corrective motions occurring by a passive suspension mechanism. The bracket roller 310 settles into the waist (as shown in FIG. 33B). As the effector 302 and tool 304 continue forward, the bracket 312 pivots about a bracket pivot 314 and the arm portions 306 of the bracket pivot about the bracket roller 310 until the detent balls 307 engage the detent groove 308 (as shown in FIG. 33C), so that the bracket is firmly attached to the tool 304. As the effector 302 continues to move in a straight line (as shown at P), the bracket 312 and tool 304 move as a coupled unit, pivoting about the bracket pivot 314 (as shown at R), where the trailing edge of the tool 304 is in contact with the effector 302 (as shown in FIG. 33D). Lastly, the bracket 312 reaches the limit of its travel, and the tool 304 has tilted to the point that the effector 304 continues traveling in the direction P, while the tool remains behind in the holder (as shown in FIGS. 33A-33D).

The tool-mounting process simply reverses the motion. For example, FIGS. 34A-34E show the effector 302 moving toward a new tool 324 (as shown in FIG. 34A), engaging a forward edge of the tool 324 (as shown in FIG. 34B), and then rotating the bracket 312 about the bracket pivot 314 (as shown at R in FIGS. 34C and 34D). The force of the forward motion P of the tool 324 then urges the detent balls 307 to become released from the groove 308 and the arm portions 306 pivot about the bracket roller 310 (as shown in FIG. 34D) to release the tool 324 from the bracket 312. The effector 302 then continues moving in the direction P with the new tool 324 attached thereto (as shown in FIG. 34E).

It is generally important that the contact forces between the tool and the effector be small to facilitate a smooth uninterrupted motion of the effector. In some embodiments, including the embodiment shown in FIGS. 31-34E, it is also important that the mechanism ensures a positive contact force between the tool and the effector, to ensure full travel of the bracket and a clean release of the tool. All of these are addressed by adjusting parameters of the design, and through passive or active elements. The bracket-constraining mechanism as shown can be modeled as two four-bar linkages, but there are many different designs for constraining the motion of the bracket.

Figure 35:
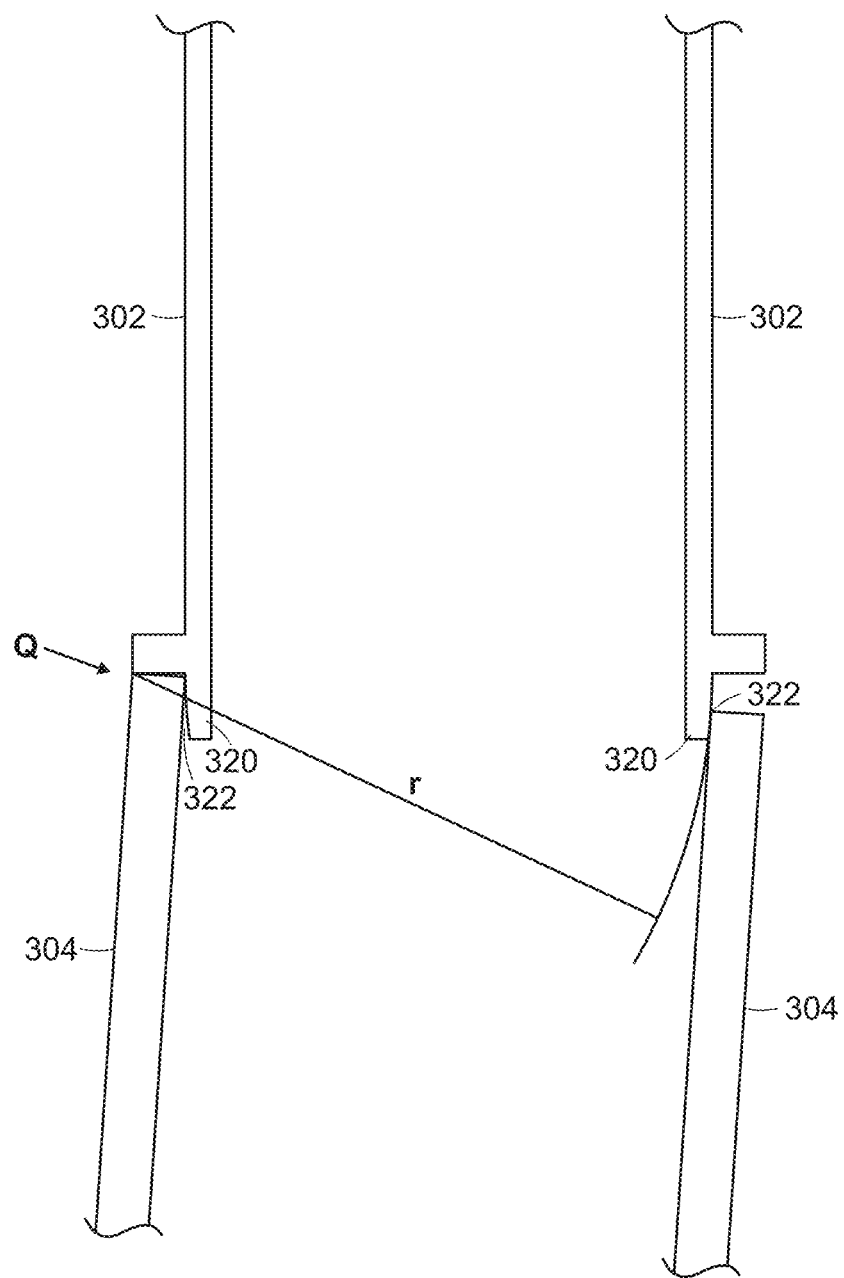
FIG. 35 shows an illustrative diagrammatic side sectional view of the end effector system of FIG. 31 showing the insertion depth.

Many of the embodiments discussed above assume a shallow insertion depth of the effector in the tool. FIG. 35 shows a sectional view of this, where the end 320 of the effector 302 (that enter into the tool 304), are rounded on the outer surface 322 at a radius r. Let r be smaller than the tool inner diameter by some small margin. Then if the effector chamfer profile falls inside a circle of diameter r, centered at the pivot point shown at Q in FIG. 35, the clearance is guaranteed for the mounting and dismounting processes. An advantage of the shallow insertion design is that the tool can be pivoted off of the effector in the dismount process, and left in place as a target for the mount process, as discussed above. In certain applications however, a deeper insertion may be desired, e.g., for imbalanced loads.

Figure 36:
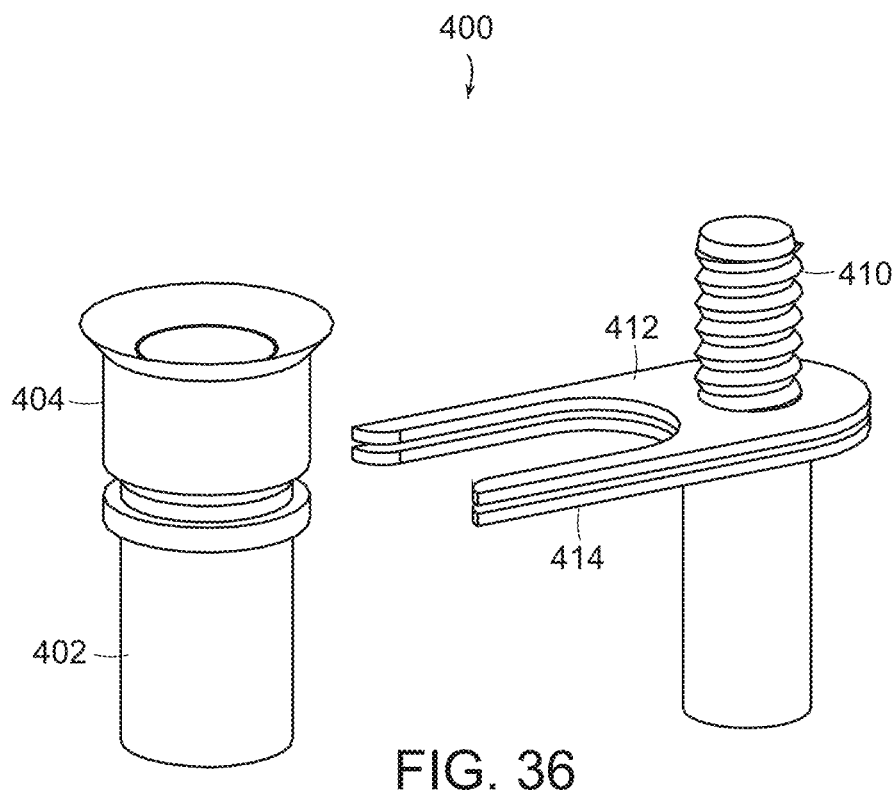
FIG. 36 shows an illustrative diagrammatic view of an end effector system in accordance with another embodiment of the present invention that includes a separated end effector and tool with a rotational engagement/disengagement exchange system.
Figure 37:
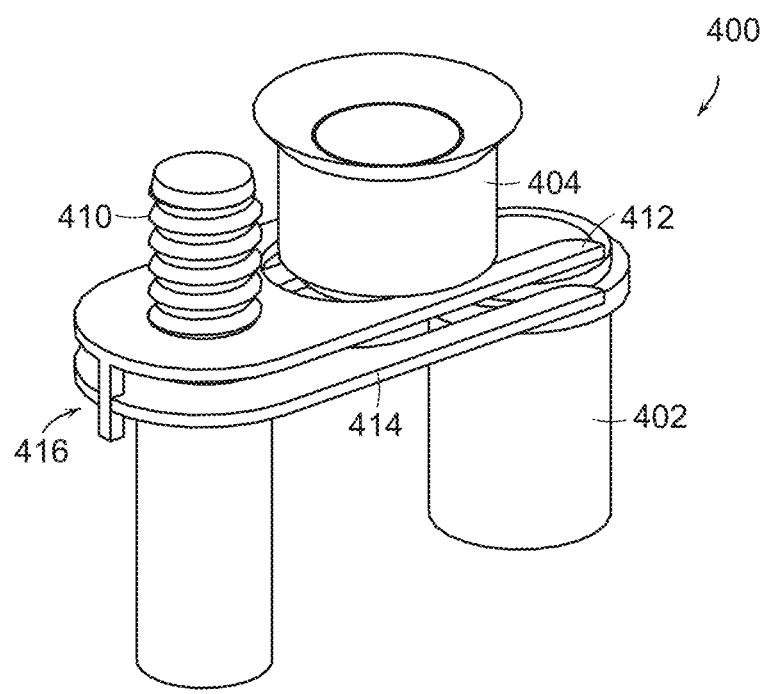
FIG. 37 shows an illustrative diagrammatic view of the end effector system of FIG. 36 that includes end effector and tool coupled together with a rotational engagement/disengagement exchange system.
Figure 38:
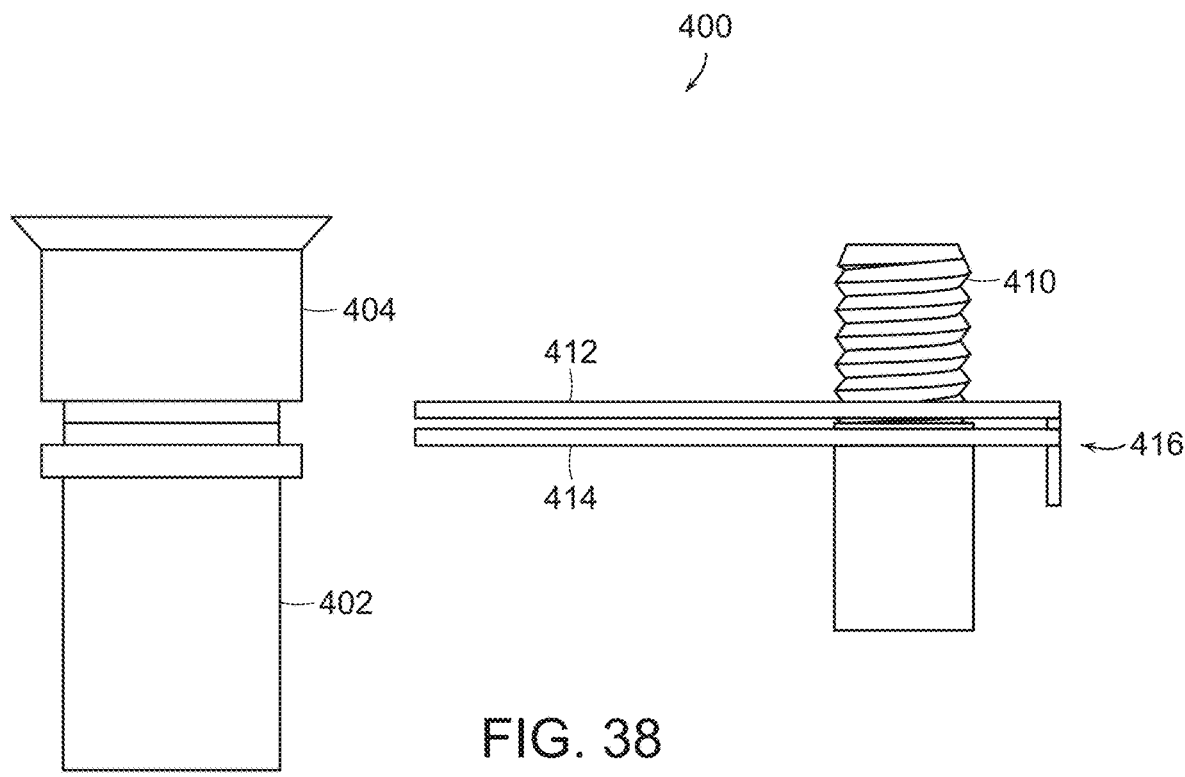
FIG. 38 shows an illustrative diagrammatic side view of the system of FIG. 36.
Figure 39:
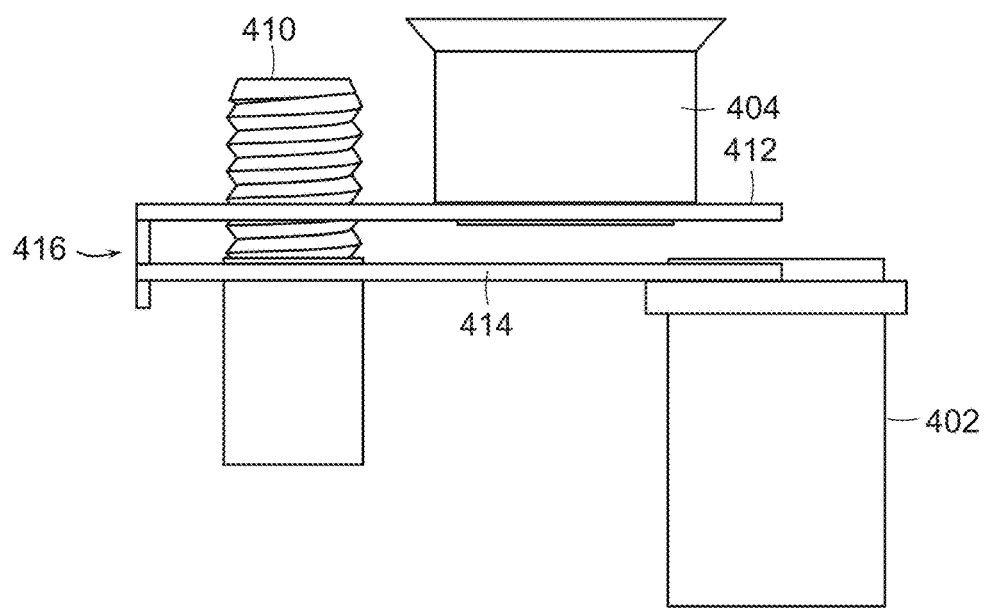
FIG. 39 shows an illustrative diagrammatic side view of the system of FIG. 37.

In the system 400 of FIGS. 36-42F, a linear motion is combined with a rotational movement along a threaded shaft to pull the tool straight upward or downward off of the effector, which might be a more suitable mounting and dismounting action in some instances. Such a system produces a straight line upward or downward pulling motion, relative to the effector, as the effector flies by in a linear motion. FIG. 36 shows an oblique view of the certain elements of the holder system, including threaded shaft 410 and split yoke members 412, 414. FIG. 38 shows a side view of the system 400 as shown in FIG. 36, including an effector 402 engaged with a tool 404. As further discussed below with reference to FIGS. 40A-40F, 41A—41F and 42A—42F, as the effector 402 travels along a linear path, the split yoke members 412, 414 engage the tool 404, and the members 412, 414 rotate with the engaged tool. In particular one yoke member 412 travels along the threads of the threaded member 410 and pulls the tool 404 away from the effector 402. A variable position locking member 416 keeps the yoke member 414 aligned with the yoke member 412. As shown in FIG. 37 (oblique view) and FIG. 39 (side view), one the yoke member 412 travels far enough along the threaded member 410 to lift the tool 404 away from the effector 402. The tool 404 is thereby separated from the effector 402. The mounting process would require the reverse steps.

FIGS. 40A-40F are oblique views of the process. FIG. 40A shows the effector 402 coupled to the tool 404, and FIG. 40F shows the effector 402. As shown in FIGS. 40B—40E, as the effector 402 moves in a linear motion (as shown at S), the yoke member 412 rotates along the threaded shaft 410 to lift the tool 404 away from the effector 402, thereby decoupling the effector from the tool.

FIGS. 41A-41F show overhead views of the system shown in FIGS. 40A-40F, with FIG. 41A showing the effector 402 coupled to the tool 404, and FIG. 41F showing the effector 402 decoupled from the tool. As may be see in FIGS. 41A-41F, the motion of the effector (as shown at S) remains linear. Again, the holder employs a split yoke, and the top yoke 412 pivots on the threaded shaft 410 so that it rises as it pivots, and the bottom yoke's 414 motion is a simple pivot in the horizontal plane. When the effector engages the holder, as the effector flies by, the split yoke is forced to pivot, the top half 412 lifting upwards and forcing the tool off of the effector, while the bottom half 414 engages the effector and helps to balance the lifting motion. FIGS. 42A-42F show side views of the system shown in FIGS. 40A-40F, with FIG. 42A showing the effector 402 coupled to the tool 404, and FIG. 42F showing the effector 402 decoupled from the tool. As may also be see in FIGS. 42A-42F, the motion of the effector (as shown at S) remains linear.

Figure 43:
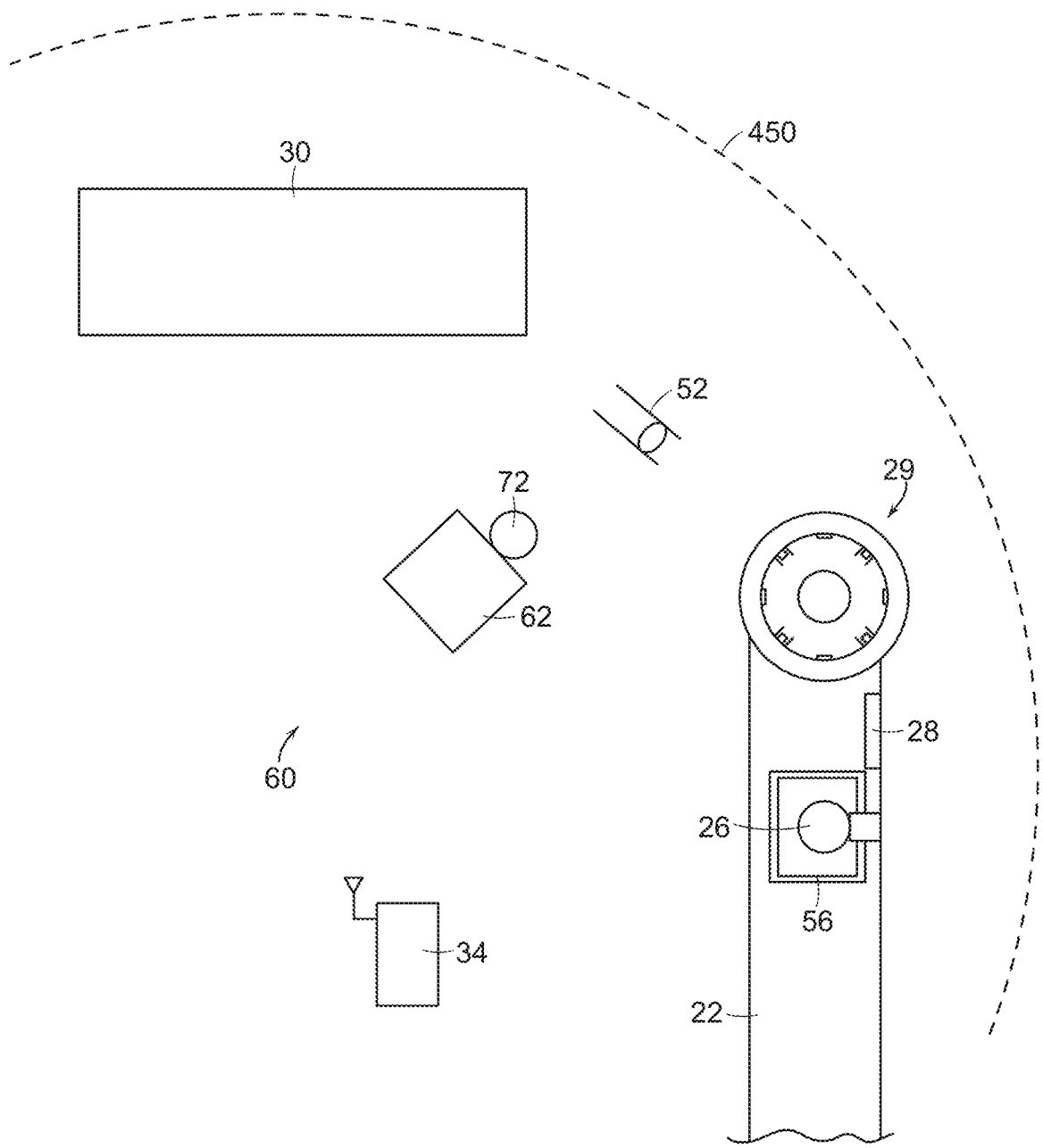
FIG. 43 shows an illustrative diagrammatic top view of a programmable motion system including an end effector exchange system in accordance with an embodiment of the present invention.

FIG. 43 shows a diagrammatic abstract view of a system 60 in accordance with an embodiment of the present invention, showing abstract representations of components from above to show a layout of components. The system 60 includes a programmable motion device 62 (such as a robotic unit) that includes an end effector 72 for grasping and moving objects. The end effector 72 on the programmable motion device 62 may have a reach as far as an arc as generally shown at 450. Within this reach 450, the end effector 72 of the programmable motion device 62 may reach destination bins 30, may reach perception station 29, may reach the conveyor 22 and destination bins 56, and may reach a tool exchanging station 52. The tool exchanging station 52 may be any of the above (or below) exchanging stations. The system may also include a touch input screen 23 as discussed above. The system further provides that the programmable motion device may identify an object in the bin 56 (using the perception unit 26 or by moving the object to the perception station 29), select an appropriate acquisition device from the exchange station 52, acquire the selected acquisition device from the exchange station 52, and then grasp the identified object in the bin 56 for movement to the destination bins 30. The system therefore provides that the programmable motion device may not only access the objects to be processed and the destination bins, but may also access a vacuum cup changer station at which vacuum cups may be changed during processing based on object identification information detected by the perception unit 26 or the perception unit 29.

If an object is identified by the perception unit 29 that requires a different vacuum cup than is currently attached to the end effector, the end effector may place the object back into the bin so that the object may be again grasped, but by a newly attached acquisition device. In certain embodiments, the perception unit 26 may sufficiently identify a next object, and if the vacuum cup on the end effector needs to be changed, the system may exchange a current vacuum cup to a desired one that is known to be a better acquisition unit for grasping the identified object in bin 56.

The system may further seek to identify all objects in a bin 56, may associate each with an optimal vacuum cup, and may then seek to grasp, one at a time, each of the objects associated with a common vacuum cup prior to changing the vacuum cup on the end effector. In each of these embodiments, the system itself identifies the need to change acquisition units, and then changes acquisition units by itself in the normal course of operation.

Figure 44A:
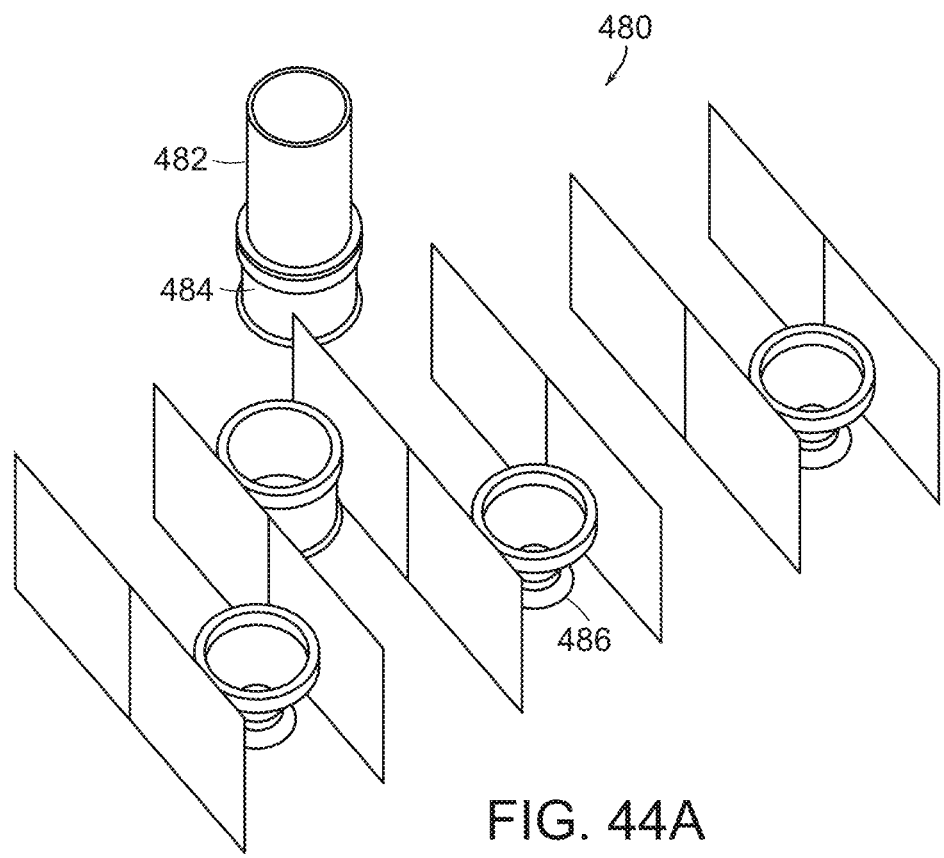
FIGS. 44A and 44B show illustrative diagrammatic views of an end effector tool exchange system in accordance with an embodiment of the present invention that includes a plurality of exchange devices with the end effector approaching with a first tool (FIG. 44A) and leaving with a different second tool (FIG. 44B)
Figure 44B:
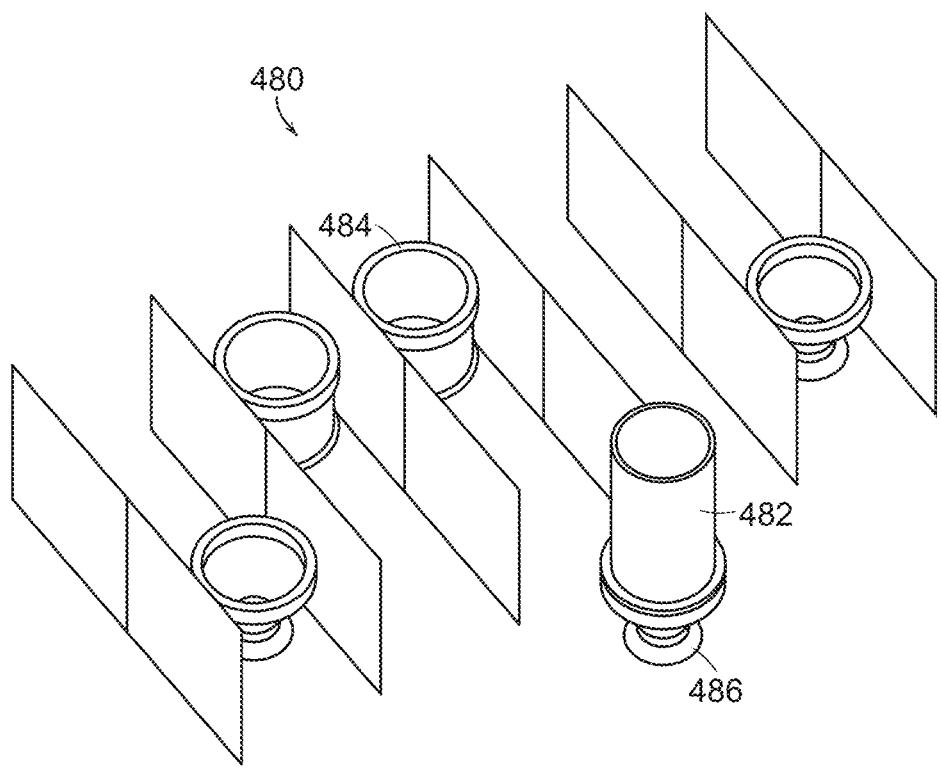

FIGS. 44A and 44B diagrammatically show a plurality of exchange stations 480 (e.g., of any of the above disclosed embodiments) that are positioned such that an effector 482 may move through any of the stations 480, and exchange a tool 484 (FIG. 44A) for another tool 486 (FIG. 44B) in a continuous or linear motion. FIGS. 44A and 44B show an arrangement of holders side by side forming a tool rack, to accommodate a selection of several tools. The arrangement shown is of serial pairs. The entire rack could be mounted on one turntable if desired to accommodate a preferred direction of tool change motion. And/or the entire rack might be actuated to shift the desired holder into the effector's planned path.

Other variants, include a suspension mechanism to allow for smooth mechanical interactions in the presence of small variations in position. Further variations would address possible latching mechanisms or detent mechanisms between the tool and effector, such as ball detents and bayonet mounts.

Figure 45:
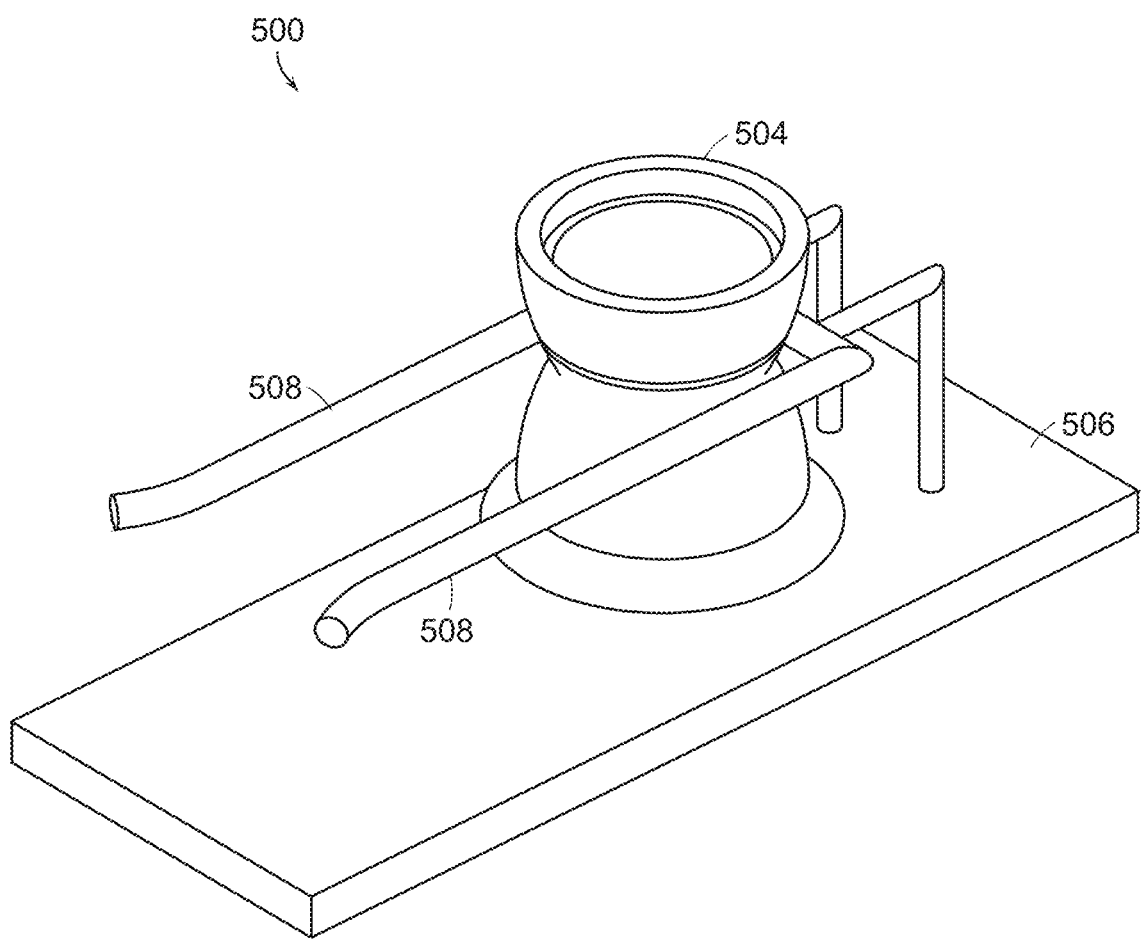
FIG. 45 shows an illustrative diagrammatic view of an end effector exchange system for use with a rotational movement of the end effector.
Figure 46:
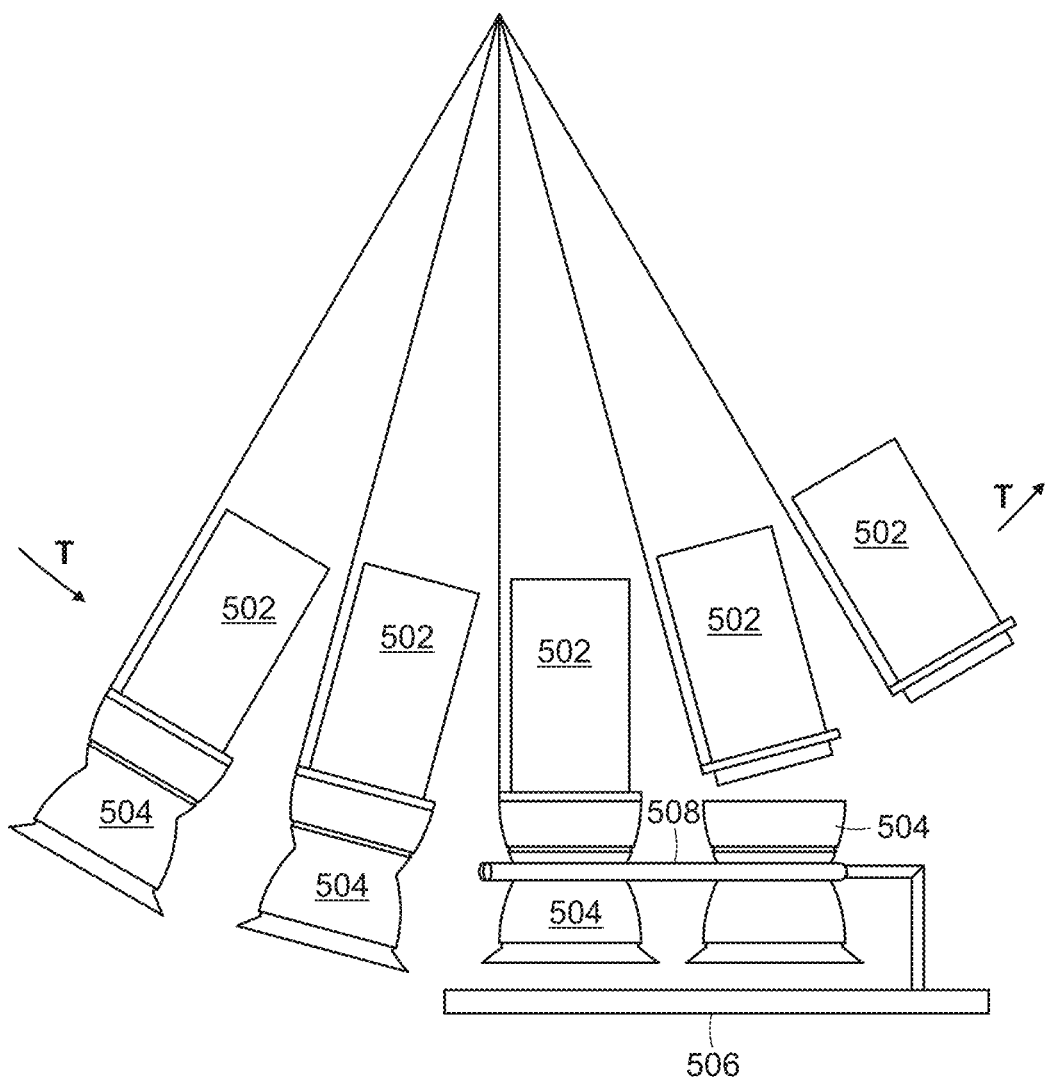
FIG. 46 shows an illustrative diagrammatic side view of the end effector exchange system of FIG. 45 showing the rotational movement of the end effector.

The above embodiments have employed the use of a straight line motion of the effector, but the invention may be adapted to other desired motions. FIGS. 45 and 46 illustrate this point with an embodiment that accommodates a rotational movement of the end effector. FIG. 45, for example, shows an exchange system 500 that includes a pair of retaining arm sections 508 mounted to a base 506. A tool 504 may be retained between the arm sections 508 at a waist section 510 as shown in FIG. 45. FIG. 46 shows diagrammatically how the tool 504 may become decoupled from an effector 502 through a rotational movement as the effector moves past the exchange station.

In particular, the waist 510 of the tool will become engaged by the arm sections 508, and the continuous movement of the effector (as shown at 7) will cause the effector 502 to be pulled away from the tool 504 in much the same way as the tool was pulled from an effector or previously disclosed embodiments. Such a motion might be appropriate for a programmable motion device with few joints, incapable of making a straight line, or in a case where a rotating motion is faster than a straight line. This embodiment is shown in schematic form. As the effector pivots about a horizontal pivot shown at the top of the figure, the tool engages the tool holder and is constrained to move horizontally along the tangent. There are a variety of ways of engaging and constraining the tool's motion, as illustrated in previous embodiments.

In accordance with various embodiments, the invention provides a tool exchange mechanism comprising an effector interface, a tool interface, and a holder mechanism, where the interaction of the effector, tool, and holder produce the tool mounting and dismounting motions relative to the continuously moving effector. The coupling of the tool interface to the effector interface may be magnetic. The coupling of the tool interface to the effector interface may be mechanical, such as by ball detents or a bayonet mount. The holder may include a mobile piece called the bracket that attaches to the tool. The bracket's connection may be mechanical or magnetic. The bracket's motion may be constrained to produce a mounting or dismounting motion of the tool. The holder may include fixed mechanical features that engage the tool, and the mechanical features may constrain the tool's motion to produce a mounting or dismounting motion. The holder may include a permanent magnetic field to mount or dismount a tool, and may include a switched magnetic field, employing some combination of magnetic shunt, permanent magnet, and/or electromagnet. The system may include an additional mobile piece that mechanically engages the effector, while bracing the effector against the forces used to dismount the tool.

In accordance with an embodiment, the invention may provide a pair of tool holder mechanisms, arranged in series, so that a single smooth motion of the effector will pass through both mechanisms, dismounting one tool and mounting another. In further embodiments, two or more tool holder mechanisms, are arranged next to one another, so that the effector may selectively pass through one holder to dismount the tool, then turn and pass through another holder to mount a different tool. In accordance with further embodiments one or more tool holder mechanisms, may be actuated to rotate so as to accommodate the desired motion of the effector, or one or more tool holder mechanisms, actuated to present the desired tool or tool holder to the effector. In accordance with a further embodiment, the system may include an additional mechanism that advances a tool from one holder to the other holder. In accordance with a further embodiment, the tool and effector may be designed so that when mounted, one piece is inserted into the other, at a depth and with a profile such that the tool can be dismounted by pivoting about one of the contact points, without producing a collision.

In certain embodiments, a tool and effector may be designed so that when mounted, one piece is inserted into the other, at a depth and with such a profile that the tool cannot be dismounted by pivoting about one of the contact points, but must be pulled substantially straight.

Those skilled in the art will appreciate that numerous modifications and variations may be made to the above disclosed embodiments without departing from the spirit and scope of the present invention.

What is claimed is:

1. A method of processing objects using a programmable motion device, said method comprising:
   identifying a selected object of a plurality of objects at an input area to provide selected object identification information;
   selecting, based on the selected object identification information, a change of a first vacuum cup at an attachment portion of an end effector of the programmable motion device from the first vacuum cup attached to the end effector to a second vacuum cup that is provided at an exchange station;
   moving the end effector of the programmable motion device to exchange the first vacuum cup with the second vacuum cup while moving the end-effector of the programmable motion device in a continuous motion by moving the attachment portion of the end effector through a first control feature of the exchange system to remove the first vacuum cup from the attachment portion of the end effector, and by moving the attachment portion of the end effector through a second control feature of the exchange system to attach the second vacuum cup to the attachment portion of the end effector;
   providing a vacuum pressure at an opening of the second vacuum cup attached to the end effector; and
   grasping the selected object of the plurality of objects using the vacuum provided at the second vacuum cup attached to the attachment portion of the end effector of the programmable motion device.

2. The method of claim 1, wherein a direction of the continuous motion of the attachment portion of the end effector is linear.

3. The method of claim 2, wherein a direction of the continuous motion of the attachment portion of the end effector is arcuate.

4. The method of claim 1, wherein each of the first vacuum cup and the second vacuum cup includes capture features that engage the first control feature and the second control feature of the exchange system.

5. The method of claim 4, wherein the capture features of the first vacuum cup and the second vacuum cup include protrusions.

6. The method of claim 4, wherein each of the first control feature and the second control feature of the exchange system includes a pair of slotted arms.

7. The method of claim 1, wherein the first control feature of the exchange system separates the first vacuum cup from the attachment portion of the end effector by linear movement.

8. The method of claim 1, wherein each of the first vacuum cup and the second vacuum cup is attachable to the attachment portion of the end effector by a magnetic coupling.

9. The method of claim 1, wherein each of the first vacuum cup and the second vacuum cup is attachable to the attachment portion of the end effector by a mechanical coupling.

10. A method of processing objects using a programmable motion device, said method comprising:
    identifying each of a plurality of objects at an input area to provide object identification information regarding each of the identified objects;
    providing a first vacuum cup at an attachment portion of an end effector of a programmable motion device;
    determining that at least one of the plurality of objects is associated with a second vacuum cup that is different than the first vacuum cup based on the object identification information;
    using the programmable motion device with the first vacuum cup attached to the attachment portion of the end effector to grasp and move at least one object of the plurality of objects that is not associated with the second vacuum cup;
    moving the end effector of the programmable motion device to exchange the first vacuum cup with the second vacuum cup while moving the end-effector of the programmable motion device in a continuous motion by moving the attachment portion of the end effector through a first control feature of the exchange system to remove the first vacuum cup from the attachment portion of the end effector, and by moving the attachment portion of the end effector through a second control feature of the exchange system to attach the second vacuum cup to the attachment portion of the end effector; and grasping and moving the at least one object of the plurality of objects that is associated with the second vacuum cup using the second vacuum cup attached to the attachment portion of the end effector of the programmable motion device.

11. The method of claim 10, wherein a direction of the continuous motion of the attachment portion of the end effector is linear.

12. The method of claim 11, wherein a direction of the continuous motion of the attachment portion of the end effector is arcuate.

13. The method of claim 10, wherein each of the first vacuum cup and the second vacuum cup includes capture features that engage the first control feature and the second control feature of the exchange system.

14. The method of claim 13, wherein the capture features of the first vacuum cup and the second vacuum cup include protrusions.

15. The method of claim 13, wherein each of the first control feature and the second control feature of the exchange system includes a pair of slotted arms.

16. The method of claim 10, wherein the first control feature of the exchange system separates the first vacuum cup from the attachment portion of the end effector by linear movement.

17. The method of claim 10, wherein each of the first vacuum cup and the second vacuum cup is attachable to the attachment portion of the end effector by a magnetic coupling.

18. The method of claim 10, wherein each of the first vacuum cup and the second vacuum cup is attachable to the attachment portion of the end effector by a mechanical coupling.

19. An object processing system for processing objects, said object processing system comprising:

a perception system for identifying a selected object of a plurality of objects at an input area and for providing selected object identification information;

a processing system for selecting, based on the selected object identification information, a change of a first vacuum cup at an attachment portion of an end effector of a programmable motion device from the first vacuum cup attached to the end effector to a second vacuum cup that is provided at an exchange station, said exchange station including a first control feature of the exchange station that removes the first vacuum cup while the attachment portion is moving through the exchange station in a first continuous motion, and a second control feature of the exchange station that attaches the second vacuum cup to the attachment portion of the end effector while the attachment portion of the end effector continues to move in the first continuous motion through the exchange station; and a vacuum source for providing a vacuum pressure at an opening of the second vacuum cup attached to the attachment portion of the end effector to grasp the selected object of the plurality of objects at the input area.

20. The object processing system of claim 19, wherein the first continuous direction of the attachment portion is linear.

21. The object processing system of claim 19, wherein the first continuous direction of the attachment portion is arcuate.

22. The object processing system of claim 19, wherein the first vacuum cup and the second vacuum cup each include capture features that engage the first and second control features of the exchange station.

23. The object processing system of claim 22, wherein the capture features of the first vacuum cup and the second vacuum cup include protrusions.

24. The object processing system of claim 22, wherein the capture features of the first and second control features of the exchange station include a first pair of slotted arms and a second pair of slotted arms.

25. The object processing system of claim 24, wherein the first pair of slotted arms separates the first vacuum cup from the attachment portion of the end effector.

26. The object processing system of claim 24, wherein the second pair of slotted arms joins the second vacuum cup with the attachment portion of the end effector.

27. The object processing system of claim 19, wherein each of the first vacuum cup and the second vacuum cup is attachable to the end effector by a magnetic coupling.

28. The object processing system of claim 19, wherein each of the first vacuum cup and the second vacuum cup is attachable to the end effector by a mechanical coupling.

* * * * *